US011145058B2

(12) United States Patent
Arbel et al.

(10) Patent No.: US 11,145,058 B2
(45) Date of Patent: Oct. 12, 2021

(54) USER INTERFACE CONFIGURED TO FACILITATE USER ANNOTATION FOR INSTANCE SEGMENTATION WITHIN BIOLOGICAL SAMPLES

(71) Applicant: Agilent Technologies, Inc., Santa Clara, CA (US)

(72) Inventors: Elad Arbel, Tel-Aviv (IL); Itay Remer, Tel-Aviv (IL); Amir Ben-Dor, Kfar-Saba (IL)

(73) Assignee: Agilent Technologies, Inc., Santa Clara, CA (US)

( * ) Notice: Subject to any disclaimer, the term of this patent is extended or adjusted under 35 U.S.C. 154(b) by 7 days.

(21) Appl. No.: 16/846,181

(22) Filed: Apr. 10, 2020

(65) Prior Publication Data
US 2020/0327671 A1    Oct. 15, 2020

Related U.S. Application Data

(60) Provisional application No. 62/832,880, filed on Apr. 12, 2019, provisional application No. 62/832,877, filed on Apr. 11, 2019.

(51) Int. Cl.
*G06T 7/00* (2017.01)
*G06T 7/10* (2017.01)
(Continued)

(52) U.S. Cl.
CPC .......... *G06T 7/0012* (2013.01); *G06F 3/0482* (2013.01); *G06F 3/0486* (2013.01);
(Continued)

(58) Field of Classification Search
CPC ......... G06T 7/0014; G06T 7/174; G06T 7/11; G06T 7/10; G06T 7/187; G06T 7/0012;
(Continued)

(56) References Cited

U.S. PATENT DOCUMENTS 10,410,083 B2* 9/2019 Yoshioka ............. G06K 9/6202
2014/0140595 A1* 5/2014 Fomitchov ............. G02B 21/16
382/128
(Continued)

FOREIGN PATENT DOCUMENTS

EP      3465610 A1   4/2019
WO  WO-2020-210733 A1  10/2020
WO  WO-2020-210734 A1  10/2020

OTHER PUBLICATIONS

U.S. Appl. No. 16/846,180, filed Apr. 10, 2020; 132 pages.
(Continued)

*Primary Examiner* — Mia M Thomas
(74) *Attorney, Agent, or Firm* — Adsero IP

(57) ABSTRACT

Novel tools and techniques are provided for implementing digital microscopy imaging using deep learning-based segmentation via multiple regression layers, implementing instance segmentation based on partial annotations, and/or implementing user interface configured to facilitate user annotation for instance segmentation. In various embodiments, a computing system might generate a user interface configured to collect training data for predicting instance segmentation within biological samples, and might display, within a display portion of the user interface, the first image comprising a field of view of a biological sample. The computing system might receive, from a user via the user interface, first user input indicating a centroid for each of a first plurality of objects of interest and second user input indicating a border around each of the first plurality of objects of interest. The computing system might train an AI system to predict instance segmentation of objects of interest in images of biological samples.

20 Claims, 22 Drawing Sheets

(51) Int. Cl.
| | |
|---|---|
| *G06T 7/187* | (2017.01) |
| *G06T 7/11* | (2017.01) |
| *G06T 7/174* | (2017.01) |
| *G06N 20/00* | (2019.01) |
| *G06F 3/0482* | (2013.01) |
| *G06F 3/0486* | (2013.01) |
| *G06K 9/62* | (2006.01) |
| *G06N 3/08* | (2006.01) |

(52) U.S. Cl.
CPC ........... *G06K 9/6202* (2013.01); *G06K 9/628* (2013.01); *G06N 3/08* (2013.01); *G06N 20/00* (2019.01); *G06T 7/0014* (2013.01); *G06T 7/10* (2017.01); *G06T 7/11* (2017.01); *G06T 7/174* (2017.01); *G06T 7/187* (2017.01); *G06T 2207/10056* (2013.01); *G06T 2207/20081* (2013.01); *G06T 2207/20084* (2013.01); *G06T 2207/20104* (2013.01); *G06T 2207/30024* (2013.01); *G06T 2207/30096* (2013.01)

(58) Field of Classification Search
CPC .......... G06N 3/08; G06N 20/00; G06K 9/628; G06K 9/6202; G06F 3/0486; G06F 3/0482
See application file for complete search history.

(56) References Cited

U.S. PATENT DOCUMENTS

| | | | | |
|---|---|---|---|---|
| 2014/0152800 A1* | 6/2014 | Fomitchov | ............. | G02B 21/16 348/79 |
| 2015/0140558 A1* | 5/2015 | Darling | ................ | C12Q 1/6881 435/6.11 |
| 2016/0019695 A1* | 1/2016 | Chukka | ................. | G06T 7/0014 382/128 |
| 2016/0259963 A1* | 9/2016 | Cohen | .................. | G06K 9/6263 |
| 2016/0321495 A1* | 11/2016 | Chukka | ................. | G06T 7/0012 |
| 2017/0309021 A1* | 10/2017 | Barnes | .................. | G06T 7/0012 |
| 2018/0053301 A1* | 2/2018 | Oshima | .................... | G06T 7/246 |
| 2018/0137642 A1* | 5/2018 | Malisiewicz | ........ | G06K 9/4628 |
| 2018/0336682 A1* | 11/2018 | Chukka | ................. | G06T 7/0012 |
| 2020/0327667 A1* | 10/2020 | Arbel | .................... | G06F 3/0486 |
| 2020/0327671 A1* | 10/2020 | Arbel | .................... | G06T 7/0012 |
| 2020/0364857 A1* | 11/2020 | Moen | ........................ | G06T 7/20 |

OTHER PUBLICATIONS

International PCT Application filed as PCT/US2020/027815, filed on Apr. 10, 2020, 128 pages.
International PCT Application filed as PCT/US2020/027816, filed on Apr. 10, 2020, 129 pages.
International Search Report & Written Opinion, International Application No. PCT/US2020/027815, dated Jul. 31, 2020, 15 pages.
International Search Report & Written Opinion, International Application No. PCT/US2020/027816, dated Jul. 31, 2020, 16 pages.
Wong et al, "Understanding data augmentation for classification; when to warp?", dated Sep. 28, 2016, 6 pages.
Yadanar et al, "Automated segmentation and isolation of touching cell nuclei in cytopathology smear images of pleural effusion using distance transform watershed method", dated Jul. 19, 2017, 5 pages.
Borgefors G., "Distance Transformations in Digital Images", dated Jun. 1, 1986, 28 pages.
Chiang et al., "Analysis of in vivo single cell behavior by high throughput, human-in-the-loop segmentation of three-dimensional images", dated Nov. 25, 2015, 19 pages.
Medyukhina et al., "Automated seeding-based nuclei segmentation in nonlinear optical microscopy", dated Oct. 1, 2013, 16 pages.

* cited by examiner

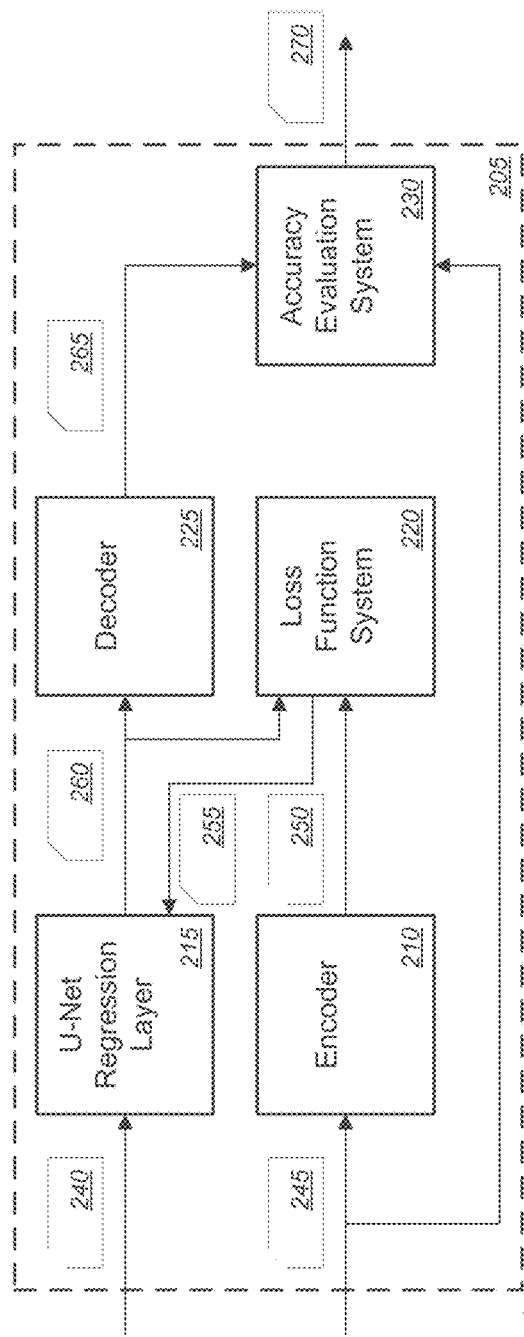
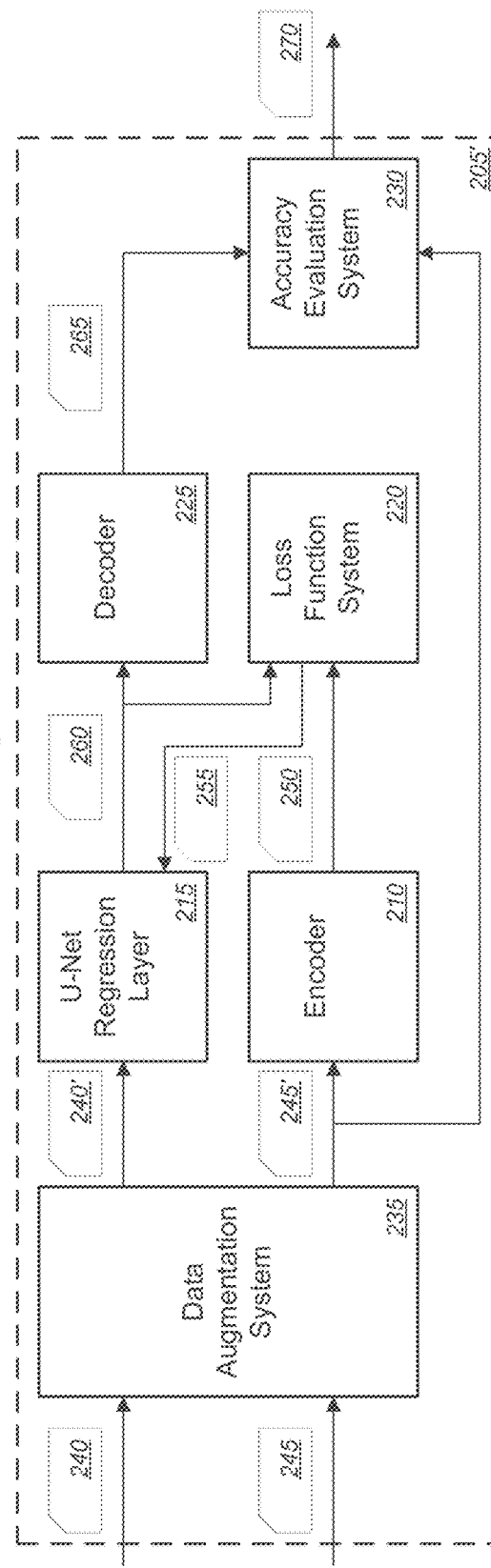

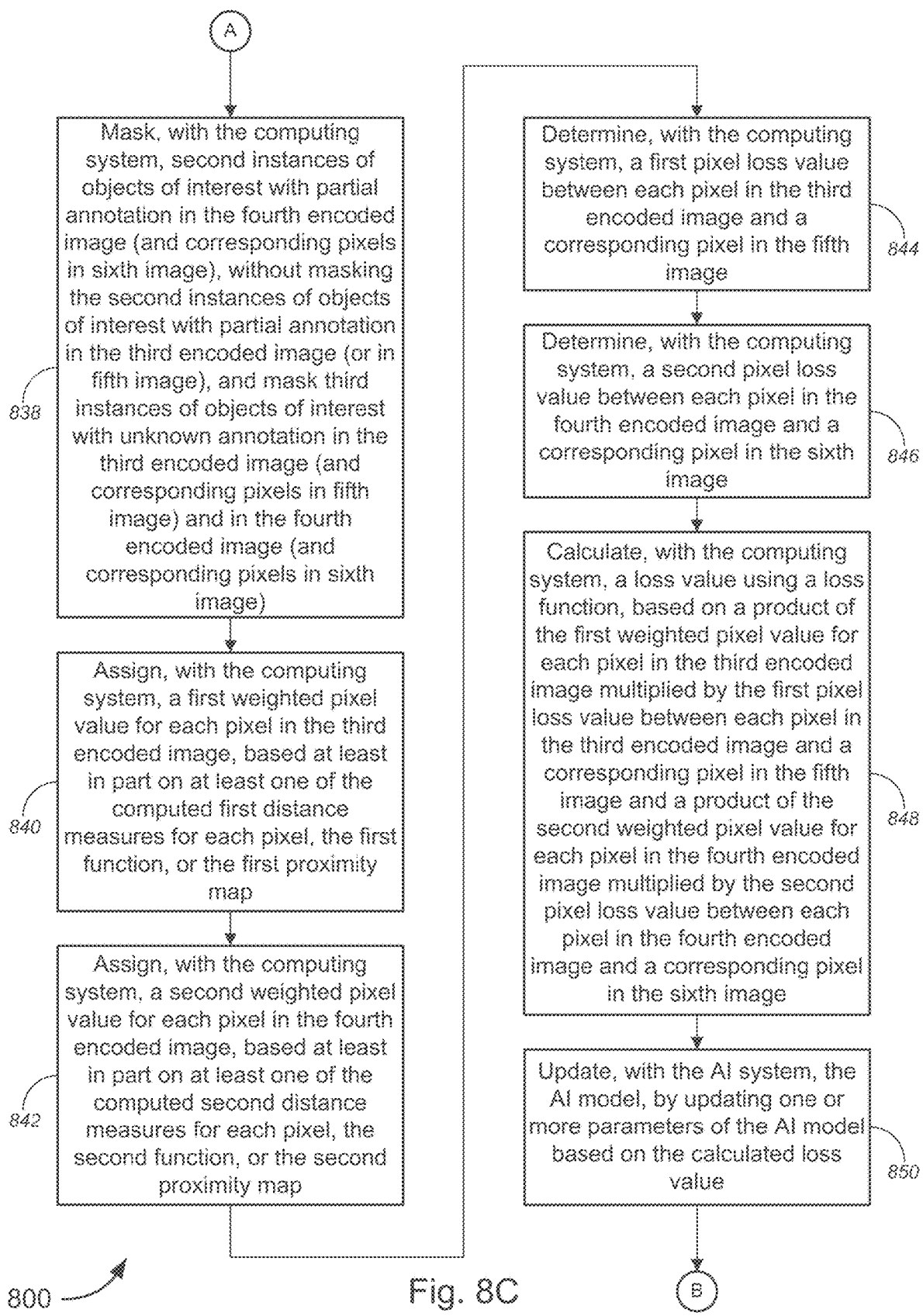

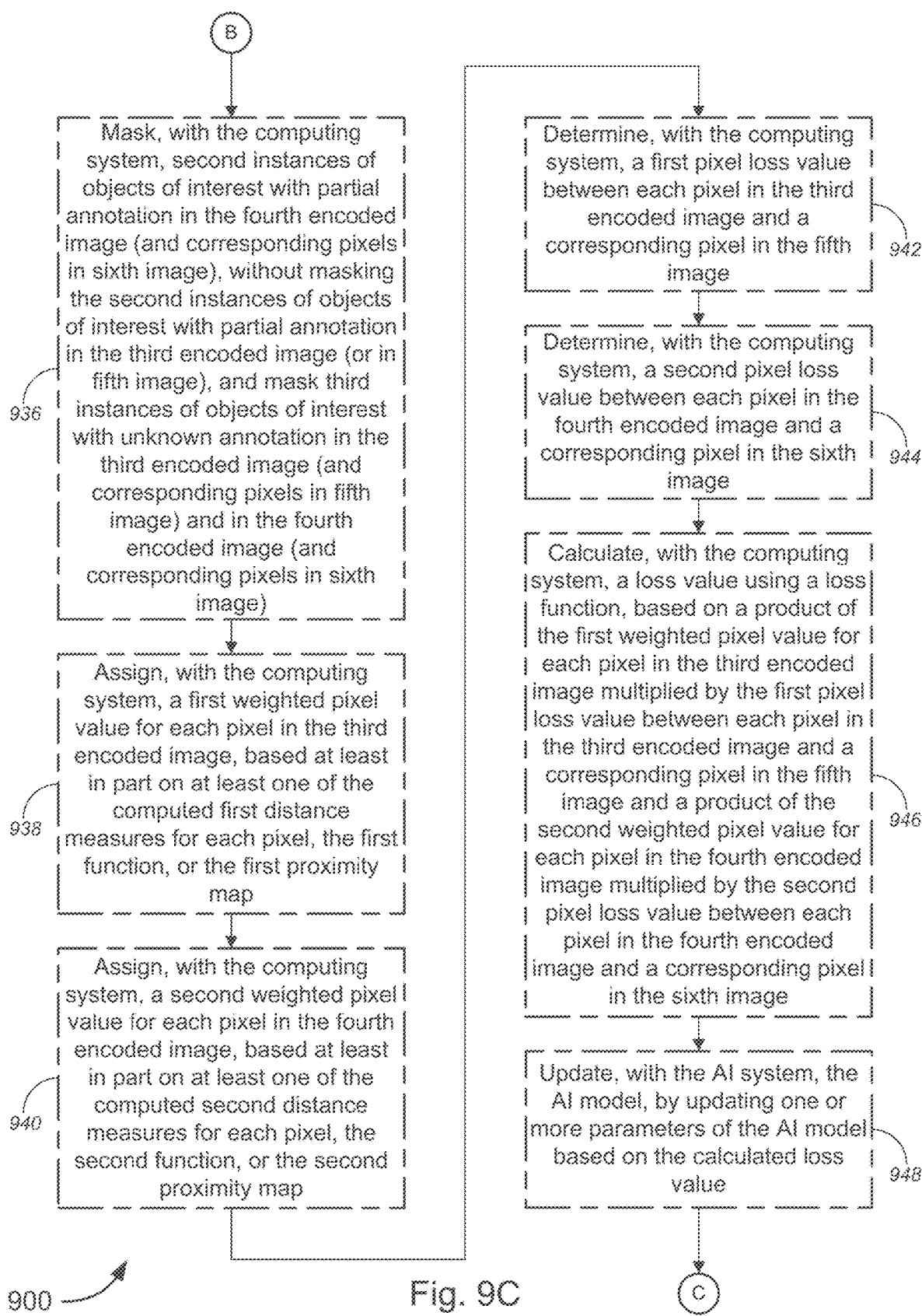

USER INTERFACE CONFIGURED TO FACILITATE USER ANNOTATION FOR INSTANCE SEGMENTATION WITHIN BIOLOGICAL SAMPLES

CROSS-REFERENCES TO RELATED APPLICATIONS

This application claims priority to U.S. Patent Application Ser. No. 62/832,880 (the "'880 application"), filed Apr. 12, 2019 by Elad Arbel et al., entitled, "DL Based Segmentation via Regression Layers," and U.S. Patent Application Ser. No. 62/832,877 (the "'877 application"), filed Apr. 11, 2019 by Elad Arbel et al., entitled, "Nuclei Segmentation Using Partial Annotation," the disclosure of each of which is incorporated herein by reference in its entirety for all purposes.

This application may be related to U.S. patent application Ser. No. 16/846,180 (the "180 Application"), filed Apr. 10, 2020 by Elad Arbel et al., entitled, "Deep Learning Based Instance Segmentation via Multiple Regression Layers," which claims priority to the '880 and '877 Applications, the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing digital microscopy imaging (e.g., digital pathology or live cell imaging, etc.), and, more particularly, to methods, systems, and apparatuses for implementing digital microscopy imaging using deep learning-based segmentation, implementing instance segmentation based on partial annotations, and/or implementing user interface configured to facilitate user annotation for instance segmentation within biological samples.

BACKGROUND

In recent years, digital pathology has gained more popularity as many stained tissue-slides are digitally scanned with high resolution (e.g., 40X) and viewed as whole slide images ("WSIs") using digital devices (e.g., PCs, tablets, etc.) instead of standard microscopes. Having the information in a digital format enables digital analyses that may be applied to WSI to facilitate diagnoses.

Given an image containing many instances of a particular type of object, instance segmentation is the problem of identifying and delineating the different instances (for example, which cells might be touching or partially overlapping other cells) in the image. An example of such a task is nuclei segmentation in microscopy images, where all nuclei need to be segmented. This task is an important step in many digital pathology analyses, such as nuclei classification and various cancer grading tasks. Developing a robust nuclei segmentation method is particularly challenging due to the huge diversity of nuclei shape, color, orientation, and density in different tissue and stain types (such as for multi-organ nuclei segmentation or MoNuSeg, or the like).

The performance of nuclei segmentation algorithms depends on the size and quality of the available ground truth data that may be used to train the model. For a field of view, I, of size $N \times M \times 3$, the ground truth data for nuclei segmentation may be specified via an integer valued Label Mat, L, of size $N \times M$, where all pixels that belong to a particular nuclei are assigned a unique positive ID, and all background pixels are assigned a zero value. Collecting this ground truth data is very challenging as the exact boundaries of each nucleus in the FOV need to be specified. This tedious annotation task is performed by a domain expert for thousands of cell nuclei. Therefore, the current difficulty in obtaining large training data is a limiting factor for broader applicability of deep learning models for nuclei segmentation. Furthermore, while a deep learning ("DL") based model may tend to perform very well for the specific task they were developed for (e.g., nuclei segmentation in a particular tissue type, or a particular staining protocol, or the like), they tend to perform poorly when applied naively to different tissue type, necessitating non-trivial additional annotation efforts in transfer-learning scenarios as well.

In many cases, WSI analysis pipelines require robust cell nuclei segmentation as a fundamental building block. High performance nuclei segmentation incorporates a training phase that leverages high-quality training data annotated by a domain expert (e.g., a pathologist, or the like) for multiple nuclei contours. This annotation task is difficult, time-consuming, and cumbersome to perform, limiting the applicability of deep learning models for nuclei segmentation. Deep learning-based models tend to perform poorly when applied naively to different segmentation.

Hence, there is a need for more robust and scalable solutions for implementing digital microscopy imaging, and, more particularly, to methods, systems, and apparatuses for implementing digital microscopy imaging using deep learning-based segmentation, implementing instance segmentation based on partial annotations, and/or implementing user interface configured to facilitate user annotation for instance segmentation within biological samples.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2C are system flow diagrams illustrating various systems for implementing digital microscopy imaging using deep learning-based segmentation, implementing instance segmentation based on partial annotations, and/or implementing user interface configured to facilitate user annotation for instance segmentation within biological samples, in accordance with various embodiments.

FIGS. 8A-8D are flow diagrams illustrating a method for implementing digital microscopy imaging using deep learning-based segmentation and/or implementing instance segmentation based on partial annotations, in accordance with various embodiments.

FIGS. 9A-9D are flow diagrams illustrating a method for implementing digital microscopy imaging using deep learning-based segmentation, implementing instance segmentation based on partial annotations, and/or implementing user interface configured to facilitate user annotation for instance segmentation within biological samples, in accordance with various embodiments.

DETAILED DESCRIPTION OF CERTAIN EMBODIMENTS

Overview

Figure 1:
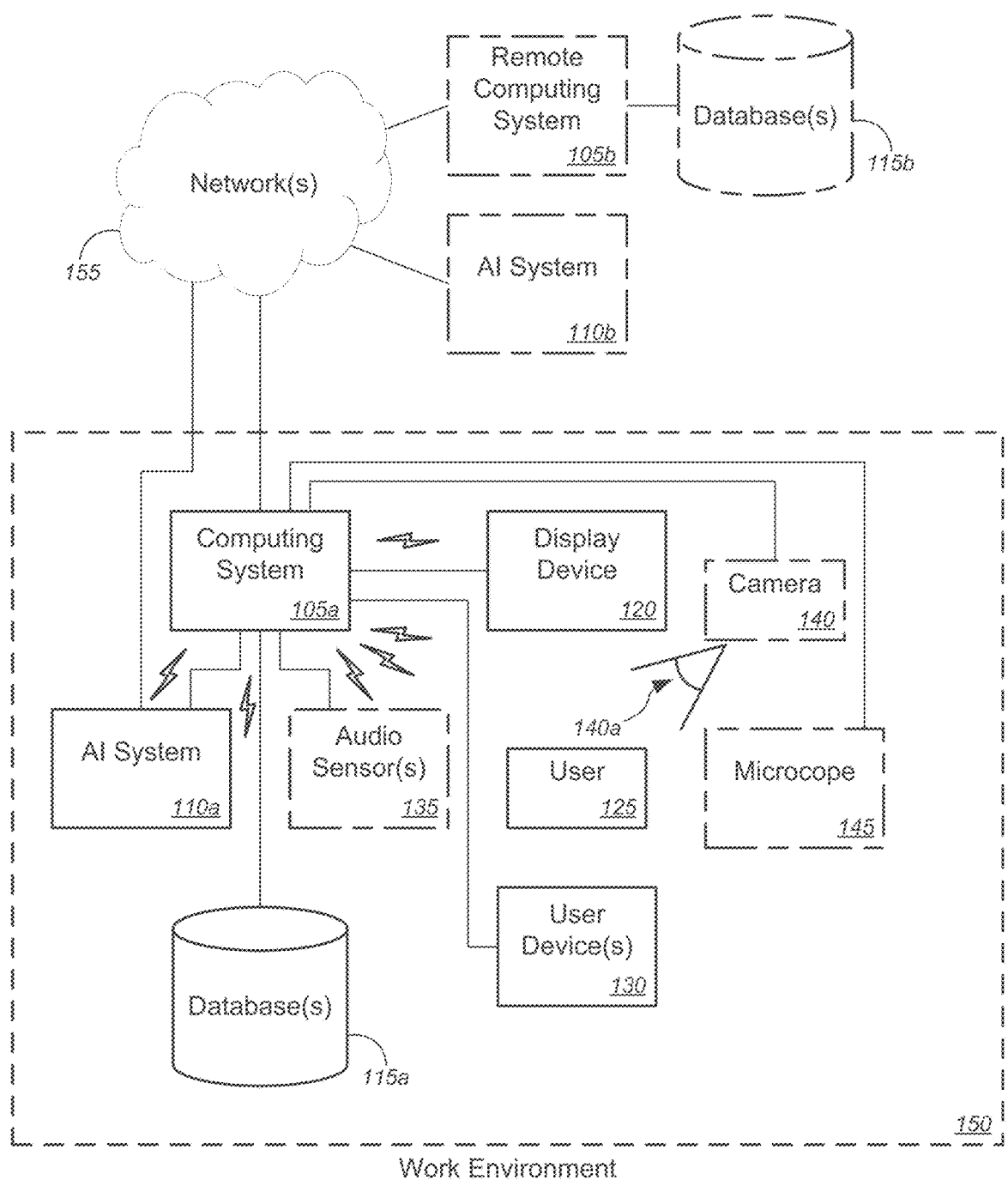
FIG. 1 is a schematic diagram illustrating a system for implementing digital microscopy imaging using deep learning-based segmentation, implementing instance segmentation based on partial annotations, and/or implementing user interface configured to facilitate user annotation for instance segmentation within biological samples, in accordance with various embodiments.

Various embodiments provide tools and techniques for implementing digital microscopy imaging (e.g., digital pathology or live cell imaging, etc.), and, more particularly, to methods, systems, and apparatuses for implementing digital microscopy imaging using deep learning-based segmentation, implementing instance segmentation based on partial annotations, and/or implementing user interface configured to facilitate user annotation for instance segmentation within biological samples.

In various embodiments, a computing system might receive a first image and a second image, the first image comprising a field of view ("FOV") of a first biological sample, and the second image comprising labeling of instances of objects of interest in the first biological sample. The computing system might encode, using an encoder, the second image to generate a third encoded image and a fourth encoded image, the fourth encoded image being different from the third encoded image.

In some embodiments, the first biological sample might include, without limitation, one of a human tissue sample, an animal tissue sample, or a plant tissue sample, and/or the like, where the objects of interest might include, but is not limited to, at least one of normal cells, abnormal cells, damaged cells, cancer cells, tumors, subcellular structures, or organ structures, and/or the like. In some instances, labeling of instances of objects of interest in the second image might include, without limitation, at least one of full annotation of first instances of objects of interest that identify centroid and edge of the first instances of objects of interest or partial annotation of second instances of objects of interest that identify only centroid of the second instances of objects of interest, and/or the like.

In some embodiments, encoding the second image to generate the third encoded image might comprise computing, with the computing system, a centroid for each labeled instance of an object of interest in the second image; and generating, with the computing system, the third encoded image, the third encoded image comprising highlighting of the centroid for each labeled instance of an object of interest. In some instances, encoding the second image to generate the fourth encoded image might comprise computing, with the computing system, an edge or border for each labeled instance of an object of interest in the second image; and generating, with the computing system, the fourth encoded image, the fourth encoded image comprising highlighting of the edge or border for each labeled instance of the object of interest.

According to some embodiments, the computing system might train the AI system to generate or update an AI model to predict instances of objects of interest based at least in part on the third encoded image and the fourth encoded image. The computing system might generate, using a regression layer of the AI system or the (updated) AI model, a fifth image and a sixth image, the sixth image being different from the fifth image.

The computing system might decode, using a decoder, the fifth image and the sixth image to generate a seventh image, the seventh image comprising predicted labeling of instances of objects of interest in the first biological sample, in some cases, by applying at least one of one or more morphological operations to identify foreground and background markers in each of the fifth image and the sixth image prior to generating the seventh image or one or more machine learning operations to directly decode the fifth image and the sixth image to generate the seventh image. In some instances, applying the at least one of the one or more morphological operations or the one or more machine learning operations might comprise applying the one or more morphological operations, where after decoding the fifth image and the sixth image by applying the one or more morphological operations to identify foreground and background markers in each of the fifth image and the sixth image, the computing system might apply a watershed algorithm to generate the seventh image. In some cases, the one or more morphological operations might include, but is not limited to, at least one of an open-with-reconstruction transform or a regional H-minima transform, and/or the like.

According to some embodiments, the computing system might compare the seventh image with the second image to generate an instance segmentation evaluation result. In some instances, generating the instance segmentation evaluation result might comprise evaluating instance segmentation performances using one or more metrics, which might include, without limitation, at least one of aggregated Jaccard index ("AJI") metrics, F1 metrics, dice metrics, average dice metrics, or joint-dice metrics, and/or the like. In some cases, the instance segmentation evaluation result might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like. The computing system might display, on a display screen, the generated instance segmentation evaluation result. In some cases, the seventh image might be generated by marker-controlled watershed algorithm using the regression layer (which might include an edge surface regression layer, or the like). In some instances, parameters for morphological operations may be set after applying Bayesian optimization with an instance segmentation evaluation result (e.g., an AJI score, or the like) as an objective function.

In some cases, training the AI system to generate or update an AI model to predict instances of objects of interest based at least in part on a plurality of sets of at least two images that are generated based on the second image might include at least the encoding of the second image to generate the third encoded image and the fourth encoded image, the training of the AI system to generate or update the AI model to predict instances of objects of interest based at least in part on the third encoded image and the fourth encoded image, the generation of the fifth image and the sixth image, the decoding of the fifth image and the sixth image to generate the seventh image, and the comparison of the seventh image with the second image, or the like. Although two images (in this case, the third encoded image and the fourth encoded image) are used for training the AI system, the various embodiments are not so limited, and more than two images (or surfaces) may be used.

According to some embodiments, the computing system might receive an eighth image, the eighth image comprising a FOV of a second biological sample different from the first biological sample; might generate, using the AI model that is generated or updated by the trained AI system, two or more images based on the eighth image, the two or more images being different from each other; and might decode, using the decoder, the two or more images to generate a ninth image, the ninth image comprising predicted labeling of instances of objects of interest in the second biological sample. Similar to decoding of the fifth image and the sixth image, decoding the two or more images to generate the ninth image might comprise decoding, with the computing system and using the decoder, the two or more images to generate the ninth image, by applying at least one of one or more morphological operations to identify foreground and background markers in each of the two or more images prior to generating the ninth image or one or more machine learning operations to directly decode the two or more images to generate the ninth image. In the case that the one or more morphological operations are applied, after decoding the two or more images by applying the one or more morphological operations to identify foreground and background markers in each of the two or more images, the computing system might apply a watershed algorithm to generate the ninth image. In this manner, the trained AI system and/or the AI model may be used to predict labeling of instances of objects of interest in new biological samples—in some cases, where there is no ground truth image (or prior user-annotated image) corresponding to the new biological samples.

Alternatively, or additionally, the computing system might generate a user interface configured to collect training data using at least one of full annotation or partial annotation of objects of interest within images of biological samples, and might display, within a display portion of the user interface, the first image comprising the FOV of the first biological sample. The computing system might receive, from a user (e.g., a pathologist, a clinician, a doctor, a nurse, or a laboratory technician, etc.) via the user interface, a first user input that indicates a presence or location of each of a first plurality of objects of interest contained within the first image displayed in the display portion of the user interface. The computing system might generate a border around each of the first plurality of objects of interest, based at least in part on a location for each of the first plurality of objects within the first image identified by the first user input and based at least in part on analysis of pixels in or around the corresponding location using an algorithm (which might include, but is not limited to, an object detection algorithm, a pixel identification algorithm, an edge detection algorithm, and/or the like).

In some instances, the computing system might receive, from the user via the user interface, a second user input that indicates movement of a point within one of the first plurality of objects of interest from a previous position to a new position within the first image, and might generate a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest. In some cases, the computing system might receive, from the user via the user interface, a third user input that indicates partial annotation of one of a second plurality of objects of interest contained within the first image displayed in the display portion of the user interface, and might generate a partial annotation symbol in the first image identifying a location of a centroid without a border for the one of the second plurality of objects of interest, based at least in part on a position of the third user input within the first image. In some instances, the computing system might receive, from the user via the user interface, a fourth user input that indicates either that one of the third plurality of objects of interest is unknown or that an instance class of one of the third plurality of objects of interest should be switched to another instance class (e.g., cancer, benign, etc.), and might generate an unknown annotation symbol (i.e., a symbol or annotation denoting an unknown instance or object, etc.) in the first image identifying a location of an unknown object denoted by the fourth user input, based at least in part on a position of the fourth user input within the first image, or might switch an instance class of a selected one of the third plurality of objects of interest to another instance class selected by the fourth user input (e.g., switching between cancer and benign, switching between fully annotated to partially annotated, switching between partially annotated to unknown annotated, switching between fully annotated to unknown annotated, or the like).

According to some embodiments, the first user input might include, without limitation, one of a click input or a bounding region input. In some cases, the click input might define a location of a centroid of one first object among the first plurality of objects of interest identified by the click input, while the bounding region input might define an area within the first image that marks an outer limit of a border of one second object among the first plurality of objects of interest identified by the bounding region input. In some instances, the bounding region input might include, but is not limited to, one of a rectangular bounding region input, a circular bounding region input, a polygon placement input, or a line placement input, and/or the like. In some embodiments, the second user input might include, without limitation, a click and drag input. In some cases, the third user input might include, but is not limited to, a double-click input, where the third user input one of selection or deselection of a border around the one of the second plurality of objects of interest. In some instances, the fourth user input might include, without limitation, one of a shift plus mouse click input or a key plus mouse click input, where the fourth user input might include, but is not limited to, one of a toggling between full annotation and unknown annotation or a switch between instance classes from a list of instance classes, or the like. The various embodiments are not limited to these particular inputs, however, and these inputs can be any suitable inputs for indicating a full annotation, a partial annotation, and/or an unknown annotation, or the like.

The computing system might generate at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

In this manner, the system provides a quick and efficient UI that allows the user (or annotator) to generate annotation in an efficient manner. In particular, there is no need for the user to open any menus or to follow a complex set of operations to interact with the UI for the annotation system. With a single operation (i.e., with a click input or a bounding region input, or the like), a full annotation can be generated (i.e., generation of a border around the location marked by the click input or the bounding region input, or the like). To change the auto-generated border, the user need only use a single operation (i.e., with a click drag input, or the like) to move a point within the instance or object, to cause the system to redraw or re-generate a new border around the instance or object. As such, the user need not waste time manually drawing around an edge or border of the instance or object, to obtain full annotation. Similarly, with a single operation (i.e., a shift plus mouse click input, a key plus mouse click input, or a mouse/keyboard combination, or the like), a full annotation can be changed to a partial annotation, or a class of an instance or object can be changed. The operation is not bound to specific mouse/keyboard operations; rather, any combination may be used or customized as appropriate or as desired.

These and other aspects of implementing digital microscopy imaging (e.g., digital pathology or live cell imaging, etc.) using deep learning-based segmentation (in some cases, via multiple regression layers or other machine learning or deep learning architecture, or the like), implementing instance segmentation based on partial annotations, and/or implementing user interface configured to facilitate user annotation for instance segmentation within biological samples are described in greater detail with respect to the figures. Although the focus is on biological samples as described with respect to the figures below, the various embodiments are not so limited, and the instance segmentation, the training of the system to generate or update an AI model to predict instance segmentation, and/or the user interface configured to facilitate user annotation for instance segmentation may be adapted to apply to non-biological samples, including, but not limited to, chemical samples, humans, animals, plants, insects, tools, vehicles, structures, landmarks, planets, stars, particular animate objects, or particular inanimate objects, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, digital pathology technology, live cell imaging technology, digital microscopy imaging technology, instance segmentation technology, nuclei segmentation technology, user interface technology, and/or the like. In other aspects, certain embodiments can improve the functioning of user equipment or systems themselves (e.g., digital pathology systems, live cell imaging systems, digital microscopy imaging systems, instance segmentation systems, nuclei segmentation systems, user interface systems, etc.), for example, by receiving, with a computing system, a first image, the first image comprising a field of view ("FOV") of a first biological sample; receiving, with the computing system, a second image, the second image comprising labeling of instances of objects of interest in the first biological sample; encoding, with the computing system and using an encoder, the second image to generate a third encoded image and a fourth encoded image, the fourth encoded image being different from the third encoded image; and training an artificial intelligence ("AI") system to generate or update an AI model to predict instances of objects of interest based at least in part on the third encoded image and the fourth encoded image; generating, using a regression layer of the AI system, a fifth image and a sixth image based on the first image and based on the training, the sixth image being different from the fifth image; decoding, with the computing system and using a decoder, the fifth image and the sixth image to generate a seventh image, the seventh image comprising predicted labeling of instances of objects of interest in the first biological sample; and comparing, with the computing system, the seventh image with the second image to generate an instance segmentation evaluation result; and/or the like.

Alternatively, or additionally, certain embodiments can improve the functioning of user equipment or systems themselves (e.g., digital pathology systems, live cell imaging systems, digital microscopy imaging systems, instance segmentation systems, nuclei segmentation systems, user interface systems, etc.), for example, by generating, with a computing system, a user interface configured to collect training data using at least one of full annotation or partial annotation of objects of interest within images of biological samples; displaying, with the computing system and within a display portion of the user interface, a first image comprising a field of view ("FOV") of a first biological sample; receiving, with the computing system and from a user via the user interface, a first user input that indicates a presence or location of each of a first plurality of objects of interest contained within the first image displayed in the display portion of the user interface; generating, with the computing system, a border around each of the first plurality of objects of interest, based at least in part on a location for each of the first plurality of objects within the first image identified by the first user input and based at least in part on analysis of pixels in or around the corresponding location using an algorithm; generating, with the computing system, at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input; and/or the like.

In particular, to the extent any abstract concepts are present in the various embodiments, those concepts can be implemented as described herein by devices, software, systems, and methods that involve specific novel functionality (e.g., steps or operations), such as, providing a user interface that is configured to receive user inputs that are indicative of at least one of full annotation of first instances of objects of interest that identify centroid and edge of the first instances of objects of interest, partial annotation of second instances of objects of interest that identify only centroid of the second instances of objects of interest, or annotations of unknown instances of objects of interest; and/or training an AI system (including, but not limited to, at least one of a machine learning system, a deep learning system, a neural network, a convolutional neural network ("CNN"), or a fully convolutional network ("FCN"), and/or the like) to predict instances of objects of interest in an image of a biological sample, based on full and/or partial annotation; and/or the like, to name a few examples, that extend beyond mere conventional computer processing operations. These functionalities can produce tangible results outside of the implementing computer system, including, merely by way of example, optimized presentation and tracking of user input that are indicative of full annotation, partial annotation, and/or annotation of unknown objects, and/or optimized training of an AI system to generate or update an AI model to predict instances of objects of interest in an image of a biological sample, based on full and/or partial annotation, and/or the like, at least some of which may be observed or measured by users (including, but not limited to, a pathologist, a clinician, a doctor, a nurse, or a laboratory technician, etc.).

In an aspect, a method might comprise receiving, with a computing system, a first image, the first image comprising a field of view ("FOV") of a first biological sample; receiving, with the computing system, a second image, the second image comprising labeling of instances of objects of interest in the first biological sample; and training an artificial intelligence ("AI") system to generate or update an AI model to predict instances of objects of interest based at least in part on a plurality of sets of at least two images that are generated based on the second image, each of the at least two images among the plurality of sets of at least two images being different from each other.

In some embodiments, the computing system might comprise one of a computing system disposed in a work environment, a remote computing system disposed external to the work environment and accessible over a network, a web server, a web browser, or a cloud computing system, and/or the like. The work environment might comprise at least one of a laboratory, a clinic, a medical facility, a research facility, a healthcare facility, or a room, and/or the like. In some instances, the AI system might comprise at least one of a machine learning system, a deep learning system, a neural network, a convolutional neural network ("CNN"), or a fully convolutional network ("FCN"), and/or the like. In some cases, the first biological sample might comprise one of a human tissue sample, an animal tissue sample, or a plant tissue sample, and/or the like. The objects of interest might comprise at least one of normal cells, abnormal cells, damaged cells, cancer cells, tumors, subcellular structures, or organ structures, and/or the like.

According to some embodiments, training the AI system to generate or update the AI model to predict instances of objects of interest based at least in part on the plurality of sets of at least two images that are generated based on the second image might comprise encoding, with the computing system and using an encoder, the second image to generate a third encoded image and a fourth encoded image, the fourth encoded image being different from the third encoded image; training the AI system to generate or update the AI model to predict instances of objects of interest based at least in part on the third encoded image and the fourth encoded image; generating, using the AI model that is generated or updated by the AI system, a fifth image and a sixth image based on the first image, the sixth image being different from the fifth image; and decoding, with the computing system and using a decoder, the fifth image and the sixth image to generate a seventh image, the seventh image comprising predicted labeling of instances of objects of interest in the first biological sample. In some cases, training the AI system to generate or update the AI model to predict instances of objects of interest based at least in part on the plurality of sets of at least two images that are generated based on the second image might further comprise comparing, with the computing system, the seventh image with the second image to generate an instance segmentation evaluation result.

In some embodiments, encoding the second image to generate the third encoded image might comprise: computing, with the computing system, a centroid for each labeled instance of an object of interest in the second image; and generating, with the computing system, the third encoded image, the third encoded image comprising highlighting of the centroid for each labeled instance of an object of interest. In some embodiments, encoding the second image to generate the fourth encoded image might comprise: computing, with the computing system, an edge or border for each labeled instance of an object of interest in the second image; and generating, with the computing system, the fourth encoded image, the fourth encoded image comprising highlighting of the edge or border for each labeled instance of the object of interest.

Merely by way of example, in some cases, encoding the second image to generate the third encoded image might further comprise computing, with the computing system, first distance measures between each pixel in the third encoded image and each centroid for each labeled instance of the object of interest; and computing, with the computing system, a first function to generate a first proximity map, the first function being a function of the first distance measures, the third encoded image comprising the first proximity map. Similarly, encoding the second image to generate the fourth encoded image might further comprise computing, with the computing system, second distance measures between each pixel in the fourth encoded image and a nearest edge pixel of the edge or border for each labeled instance of the object of interest; and computing, with the computing system, a second function to generate a second proximity map, the second function being a function of the second distance measures, the fourth encoded image comprising the second proximity map.

According to some embodiments, the method might further comprise assigning, with the computing system, a first weighted pixel value for each pixel in the third encoded image, based at least in part on at least one of the computed first distance measures for each pixel, the first function, or the first proximity map; and assigning, with the computing system, a second weighted pixel value for each pixel in the fourth encoded image, based at least in part on at least one of the computed second distance measures for each pixel, the second function, or the second proximity map.

In some embodiments, the method might further comprise determining, with the computing system, a first pixel loss value between each pixel in the third encoded image and a corresponding pixel in the fifth image; determining, with the computing system, a second pixel loss value between each pixel in the fourth encoded image and a corresponding pixel in the sixth image; calculating, with the computing system, a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image; and updating, with the AI system, the AI model, by updating one or more parameters of the AI model based on the calculated loss value. In some instances, the loss function might comprise one of a mean squared error loss function, a mean squared logarithmic error loss function, a mean absolute error loss function, a Huber loss function, or a weighted sum of squared differences loss function, and/or the like. In such cases, generating the fifth image and the sixth image might comprise generating, using the updated AI model, the fifth image and the sixth image, based on the first image.

According to some embodiments, labeling of instances of objects of interest in the second image comprises at least one of full annotation of first instances of objects of interest that identify centroid and edge of the first instances of objects of interest, partial annotation of second instances of objects of interest that identify only centroid of the second instances of objects of interest, or unknown annotation of third instances of objects of interest that identify neither centroid nor edge, and/or the like. In some instances, the method might further comprise masking, with the computing system, the second instances of objects of interest with partial annotation in the fourth encoded image and corresponding pixels in the sixth image, without masking the second instances of objects of interest with partial annotation in the third encoded image or in the fifth image, prior to calculating the loss value; and masking, with the computing system, the third instances of objects of interest with unknown annotation in the third encoded image and corresponding pixels in the fifth image and in the fourth encoded image and corresponding pixels in the sixth image, prior to calculating the loss value.

In some embodiments, decoding the fifth image and the sixth image to generate the seventh image might comprise decoding, with the computing system and using the decoder, the fifth image and the sixth image to generate the seventh image, by applying at least one of one or more morphological operations to identify foreground and background markers in each of the fifth image and the sixth image prior to generating the seventh image or one or more machine learning operations to directly decode the fifth image and the sixth image to generate the seventh image. In some instances, applying the at least one of the one or more morphological operations or the one or more machine learning operations might comprise applying the one or more morphological operations, and the method might further comprise, after decoding the fifth image and the sixth image by applying the one or more morphological operations to identify foreground and background markers in each of the fifth image and the sixth image, applying a watershed algorithm to generate the seventh image. In some cases, the one or more morphological operations might comprise at least one of an open-with-reconstruction transform or a regional H-minima transform, and/or the like.

According to some embodiments, the method might further comprise receiving, with the computing system, an eighth image, the eighth image comprising a FOV of a second biological sample different from the first biological sample; generating, using the AI model that is generated or updated by the trained AI system, two or more images based on the eighth image, the two or more images being different from each other; and decoding, with the computing system and using the decoder, the two or more images to generate a ninth image, the ninth image comprising predicted labeling of instances of objects of interest in the second biological sample.

In some instances, the first image and the second image might be data augmented prior to being received by the computing system, wherein data augmentation of the first image and the second image might comprise at least one of elastic augmentation or color augmentation, and/or the like, configured to facilitate instance segmentation. In some cases, the at least two images comprise at least a centroid layer image highlighting a centroid for each labeled instance of an object of interest in the second image, a border layer image highlighting an edge or border for each labeled instance of the object of interest in the second image, and a semantic segmentation layer image comprising semantic segmentation data for each labeled instance of the object of interest in the second image.

In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a first image, the first image comprising a field of view ("FOV") of a first biological sample; receive a second image, the second image comprising labeling of instances of objects of interest in the first biological sample; and train an artificial intelligence ("AI") system to generate or update an AI model to predict instances of objects of interest based at least in part on a plurality of sets of at least two images that are generated based on the second image, each of the at least two images among the plurality of sets of at least two images and being different from each other.

In yet another aspect, a method might comprise receiving, with a computing system, a first image, the first image comprising a field of view ("FOV") of a first biological sample; generating, using an artificial intelligence ("AI") model that is generated or updated by a trained AI system, two or more images based on the first image, each of the two or more images and being different from each other, wherein training of the AI system comprises training the AI system to generate or update the AI model to predict instances of objects of interest based at least in part on a plurality of sets of at least two images that are generated based on a user-annotated image, each of the at least two images among the plurality of sets of at least two images being different from each other; and decoding, with the computing system and using the decoder, the two or more images to generate a second image, the second image comprising predicted labeling of instances of objects of interest in the first biological sample.

In an aspect, a method might comprise generating, with a computing system, a user interface configured to collect training data using at least one of full annotation or partial annotation of objects of interest within images of biological samples; displaying, with the computing system and within a display portion of the user interface, a first image comprising a field of view ("FOV") of a first biological sample; receiving, with the computing system and from a user via the user interface, a first user input that indicates a presence or location of each of a first plurality of objects of interest contained within the first image displayed in the display portion of the user interface; generating, with the computing system, a border around each of the first plurality of objects of interest, based at least in part on a location for each of the first plurality of objects within the first image identified by the first user input and based at least in part on analysis of pixels in or around the corresponding location using an algorithm; and generating, with the computing system, at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

In some embodiments, the computing system might comprise one of a computing system disposed in a work environment, a remote computing system disposed external to the work environment and accessible over a network, a web server, a web browser, or a cloud computing system, and/or the like. In some cases, the work environment might comprise at least one of a laboratory, a clinic, a medical facility, a research facility, a healthcare facility, or a room, and/or the like. In some cases, the first biological sample might comprise one of a human tissue sample, an animal tissue sample, or a plant tissue sample, and/or the like. In some instances, the objects of interest might comprise at least one of normal cells, abnormal cells, damaged cells, cancer cells, tumors, subcellular structures, or organ structures, and/or the like.

In some embodiments, the method might further comprise receiving, with the computing system and from the user via the user interface, a second user input that indicates movement of a point within one of the first plurality of objects of interest from a previous position to a new position within the first image; and generating, with the computing system, a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest.

According to some embodiments, the method might further comprise receiving, with the computing system and from the user via the user interface, a third user input that indicates partial annotation of one of a second plurality of objects of interest contained within the first image displayed in the display portion of the user interface; and generating, with the computing system, a partial annotation symbol in the first image identifying a location of a centroid without a border for the one of the second plurality of objects of interest, based at least in part on a position of the third user input within the first image.

In some embodiments, the method might further comprise receiving, with the computing system and from the user via the user interface, a fourth user input that indicates either that one of the third plurality of objects of interest is unknown or that an instance class of one of the third plurality of objects of interest should be switched to another instance class; and generating, with the computing system, an unknown annotation symbol in the first image identifying a location of an unknown object denoted by the fourth user input, based at least in part on a position of the fourth user input within the first image, or switching, with the computing system, an instance class of a selected one of the third plurality of objects of interest to another instance class selected by the fourth user input.

Merely by way of example, in some cases, the first user input might comprise one of a click input or a bounding region input, wherein the click input defines a location of a centroid of each of at least one first object among the first plurality of objects of interest identified by the click input, wherein the bounding region input defines an area within the first image that marks an outer limit of a border of one second object among the first plurality of objects of interest identified by the bounding region input, wherein the bounding region input might comprise one of a rectangular bounding region input, a circular bounding region input, a polygon placement input, or a line placement input, and/or the like. The second user input might comprise a click and drag input. The third user input might comprise a double click input, wherein the third user input might comprise one of selection or deselection of a border around the one of the second plurality of objects of interest. The fourth user input might comprise one of a shift plus mouse click input or a key plus mouse click input, and/or the like. The fourth user input might comprise one of a toggling between full annotation and unknown annotation or a switch between instance classes from a list of instance classes.

According to some embodiments, the method might further comprise training an artificial intelligence ("AI") system to generate or update an AI model to predict instances of objects of interest in the first biological sample based at least in part on a plurality of sets of at least two images that are generated based on the at least one of the second image or the annotation dataset, each of the at least two images among the plurality of sets of at least two images being different from each other. In some instances, training the AI system to generate or update the AI model to predict instances of objects of interest based at least in part on the plurality of sets of at least two images might comprise: encoding, with the computing system and using an encoder, the at least one of the second image or the annotation dataset to generate a third encoded image and a fourth encoded image, the fourth encoded image being different from the third encoded image; training the AI system to generate or update the AI model to predict instances of objects of interest based at least in part on the third encoded image and the fourth encoded image; generating, using the AI model that is generated or updated by the AI system, a fifth image and a sixth image based on the first image, the sixth image being different from the fifth image; and decoding, with the computing system and using a decoder, the fifth image and the sixth image to generate a seventh image, the seventh image comprising predicted labeling of instances of objects of interest in the first biological sample. In some instances, the AI system might comprise at least one of a machine learning system, a deep learning system, a neural network, a convolutional neural network ("CNN"), or a fully convolutional network ("FCN"), and/or the like. In some cases, training the AI system to generate or update the AI model to predict instances of objects of interest based at least in part on the plurality of sets of at least two images might further comprise comparing, with the computing system, the seventh image with the second image to generate an instance segmentation evaluation result.

In some embodiments, the third encoded image might contain a centroid for each of the first plurality of objects of interest based on the first user input, wherein the fourth encoded image might contain the generated border for each of the first plurality of objects of interest. According to some embodiments, encoding the second image to generate the third encoded image might comprise: computing, with the computing system, first distance measures between each pixel in the third encoded image and each centroid for each of the first plurality of objects of interest; and computing, with the computing system, a first function to generate a first proximity map, the first function being a function of the first distance measures, the third encoded image comprising the first proximity map. Similarly, encoding the second image to generate the fourth encoded image might comprise: computing, with the computing system, second distance measures between each pixel in the fourth encoded image and a nearest edge pixel of the edge or border for each of the first plurality of objects of interest; and computing, with the computing system, a second function to generate a second proximity map, the second function being a function of the second distance measures, the fourth encoded image comprising the second proximity map.

According to some embodiments, the method might further comprise assigning, with the computing system, a first weighted pixel value for each pixel in the third encoded image, based at least in part on at least one of the computed first distance measures for each pixel, the first function, or the first proximity map; and assigning, with the computing system, a second weighted pixel value for each pixel in the fourth encoded image, based at least in part on at least one of the computed second distance measures for each pixel, the second function, or the second proximity map.

In some embodiments, the method might further comprise determining, with the computing system, a first pixel loss value between each pixel in the third encoded image and a corresponding pixel in the fifth image; determining, with the computing system, a second pixel loss value between each pixel in the fourth encoded image and a corresponding pixel in the sixth image; calculating, with the computing system, a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image; and updating, with the AI system, the AI model, by updating one or more parameters of the AI model based on the calculated loss value. In some cases, the loss function might comprise one of a mean squared error loss function, a mean squared logarithmic error loss function, a mean absolute error loss function, a Huber loss function, or a weighted sum of squared differences loss function, and/or the like. In such cases, generating the fifth image and the sixth image might comprise generating, using the updated AI model, the fifth image and the sixth image, based on the first image.

According to some embodiments, decoding the fifth image and the sixth image to generate the seventh image might comprise decoding, with the computing system and using the decoder, the fifth image and the sixth image to generate the seventh image, by applying at least one of one or more morphological operations to identify foreground and background markers in each of the fifth image and the sixth image prior to generating the seventh image or one or more machine learning operations to directly decode the fifth image and the sixth image to generate the seventh image. In some cases, applying the at least one of the one or more morphological operations or the one or more machine learning operations might comprise applying the one or more morphological operations, wherein the method might further comprise after decoding the fifth image and the sixth image by applying the one or more morphological operations to identify foreground and background markers in each of the fifth image and the sixth image, applying a watershed algorithm to generate the seventh image.

In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: generate a user interface configured to collect training data using at least one of full annotation or partial annotation of objects of interest within images of biological samples; display, within a display portion of the user interface, a first image comprising a field of view ("FOV") of a first biological sample; receive, from a user via the user interface, a first user input that indicates a presence or location of each of a first plurality of objects of interest contained within the first image displayed in the display portion of the user interface; generate a border around each of the first plurality of objects of interest, based at least in part on a location for each of the first plurality of objects within the first image identified by the first user input and based at least in part on analysis of pixels in or around the corresponding location using an algorithm; generate at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

According to some embodiments, the computing system might comprise one of a computing system disposed in a work environment, a remote computing system disposed external to the work environment and accessible over a network, a web server, a web browser, or a cloud computing system, and/or the like. In some cases, the work environment might comprise at least one of a laboratory, a clinic, a medical facility, a research facility, a healthcare facility, or a room, and/or the like. In some cases, the first biological sample might comprise one of a human tissue sample, an animal tissue sample, or a plant tissue sample, and/or the like. In some instances, the objects of interest might comprise at least one of normal cells, abnormal cells, damaged cells, cancer cells, tumors, subcellular structures, or organ structures, and/or the like. In some cases, the first user input might comprise one of a click input or a bounding region input, wherein the click input defines a location of a centroid of each of at least one first object among the first plurality of objects of interest identified by the click input, wherein the bounding region input defines an area within the first image that marks an outer limit of a perimeter of at least one second object among the first plurality of objects of interest identified by the bounding region input, wherein the bounding region input comprises one of a rectangular bounding region input, a circular bounding region input, a polygon placement input, or a line placement input.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

I. Deep Learning Based Segmentation Via Regression Layers

In an image with many instances of similar or related objects/features or a particular type of object/feature (that might be touching or partially overlapping with other objects/features), difficulties may arise in accurately identifying objects/features within the image. Instance segmentation reflects the challenge of identifying all instances of objects and their corresponding characteristics such as shape/contour. An example of such task is nuclei segmentation in microscopy images, which is a principal task in many digital pathology procedures, such as nuclei counting, nuclei classification and various cancer grading tasks, or the like. In such applications, manual segmentation may be difficult or impractical due to large numbers of nuclei in a whole slide image ("WSI"), in which cases automatic nuclei segmentation may be desired. However, robust automatic nuclei segmentation is an extremely challenging task due to the diversity of nuclei shapes, colors, orientations, density, and other characteristics, as well as other factors such as image quality, resolution, differences in tissue and stain types, as well as the large size of WSI, or the like.

In one embodiment, for robust encoding of nuclei morphology—instead of encoding each cell as a different class of object (as done in semantic segmentation)—the morphology of the nuclei (i.e., object to be segmented) might be encoded using a two surface encoding—i.e., distance to nucleus center and nucleus contour. This encoding is robust as the morphology is encoded using many pixels and not subject to single pixel mistakes. The use of two surfaces to encode morphology (as opposed to just one distance) is novel and potentially more robust than existing methods.

In one embodiment, advantages to the weighting scheme are provided, where a higher weight is specified for 'important' pixels (e.g., pixels that belong to a shared border between two nuclei), therefore helping the network to focus on 'risky' pixels (where mistakes might lead to over or under segmentation).

In one embodiment, a method may be provided that minimizes the effort required to generate a training dataset for instance segmentation tasks, built upon two main components: (A) a new scheme for instance segmentation ground-truth data, comprising a mixture of two kinds of nuclei annotation—full annotation (in which nuclei whose center as well as full contour are completely specified), and partial annotation (in which nuclei whose center is only specified); and (B) a novel approach for solving instance segmentation problems including (i) encoding ground-truth data using two surfaces that can be robustly modeled by a fully convolutional dual-regression neural network (which might be trained with a mixture of full and partial annotation) and (ii) decoding the network predicted surfaces (for test images) into instance segmentation (based on marker-controlled watershed algorithm).

A. Example 1

1. Preprocessing:
1.1 Dataset preparation: Dataset for training the model was supplied as part of MoNuSeg H&E stained multi organ nuclei segmentation in digital pathology challenge held on MICCAI 2018 conference. The training data set is composed of 30 1000×1000 image tiles cropped from WSI (captured at 40× magnification) and downloaded from TCGA archive. To ensure dataset diversity, each image corresponds to one patient, where images were taken from 18 hospitals and cover 7 types of organs. In every image tile, nuclei segmentations (ground truth) were provided. For training purposes, since no validation set was provided, we selected 11 of the images for validation (those images were not used in the training phase).

Figure 5:
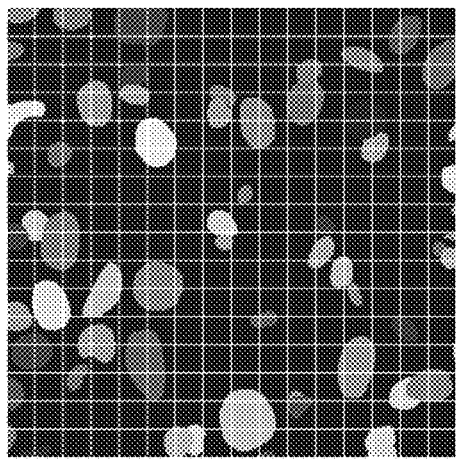
FIG. 5 depict an example of various images illustrating elastic augmentation of an original image of a first biological sample and elastic augmentation of an annotated image of the original image, in accordance with various embodiments.
Figure 5:
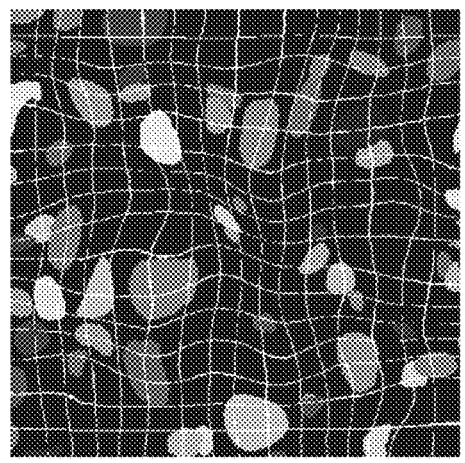
Figure 5:
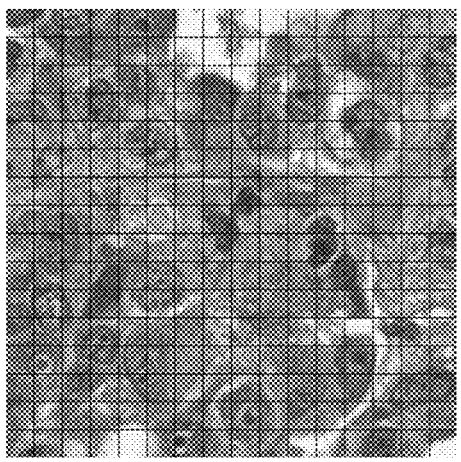
Figure 5:
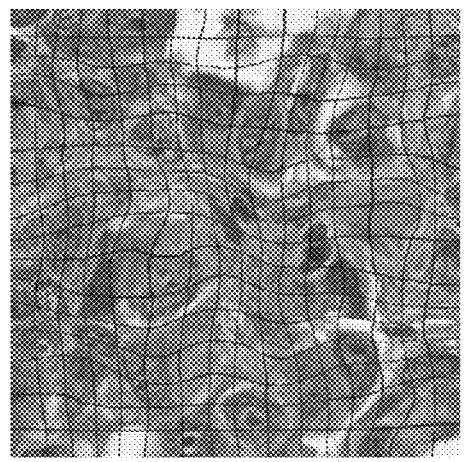
Figure 6:
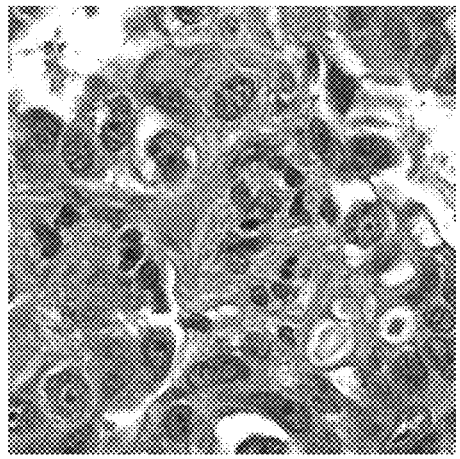
FIG. 6 depict an example of various images illustrating color augmentation of an original image of a first biological sample, in accordance with various embodiments.
Figure 6:
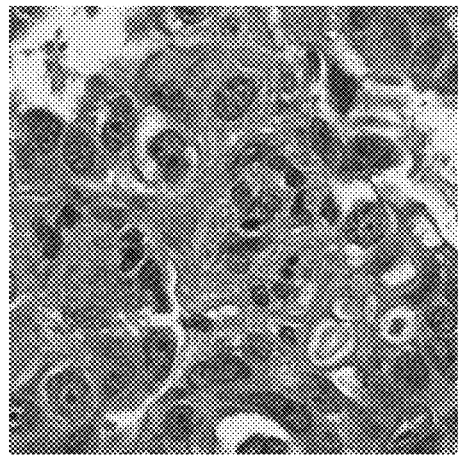
Figure 6:
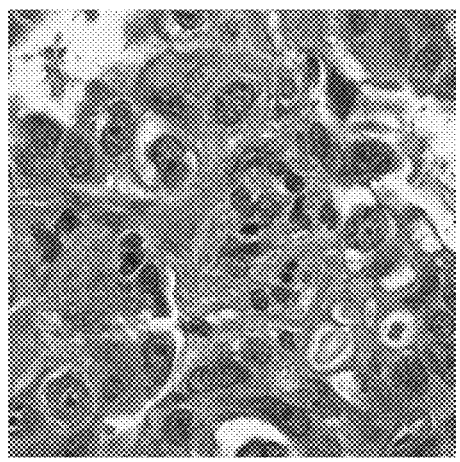
Figure 6:
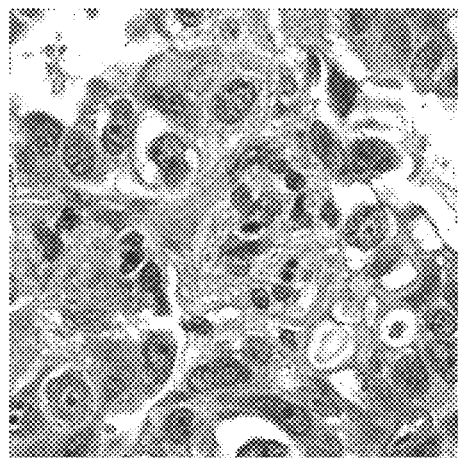

1.2 Dataset augmentation: Due to the small number of images for training and their diversity, we use extensive data augmentation for sets of RGB and label images that include both standard augmentation procedures such as rotation, mirroring, and small resizing, as well as elastic image transformation as depicted in FIG. 5. Elastic augmentation was applied by sampling both RGB image and annotation label image with a random displacement field. The level of distortion was controlled by convolving the displacement field with gaussian kernel with a predefined standard deviation and scale factor. Finally, RGB image and label image were sampled by the displacement field using bilinear interpolation and nearest-neighbors, respectively. In addition, RGB color variation was done directly in stain channels optical density space through color deconvolution. Stains optical density was randomly scaled and biased and then projected back to RGB space as shown in FIG. 6.

2. Proposed Model

Our approach is composed of three main steps (detailed below): first, encoding the ground truth as a set of two surfaces (see section 2.1 below); second, training a fully convolutional neural network ("FCN") based on the UNet or U-Net architecture, proposed by Ronneberger et al. in 2015, to predict those surfaces; and lastly, in post processing, using the predicted surfaces to perform constrained watershed segmentation and predict nuclei segmentation (see section 3 below).

2.1 Ground truth encoding: For each trained image, we have an associated ground truth segmentation of the pixels into non-overlapping objects (e.g., nuclei). We further compute for each nucleus its centroid (see FIGS. 4 and 7). We now compute two distance measures for each pixel: (a) distance (in pixels) to the nuclei centroid; and (b) distance to the nearest nuclei edge pixel. Following the approach of Philipp Kainz et. al. (Miccai 2015), we transform these distances from nuclei centers and edges. In addition, we assign a weight for each pixel. Intuitively, we want to assign higher weights to 'critical' pixels, where a mis-prediction will result in an over segmentation. Specifically, we follow similar weighting scheme of U-Net, and assign higher weight to pixels that are close to two different nuclei.

2.2 Network architecture: We replace the last U-Net layer (a classification layer, for semantic classification) with a regression layer that outputs two surface maps. As a loss function, we use weighted sum of squared differences between encoded ground truth and model output as depicted in FIG. 2.

3. Post Processing:

3.1 Decoding network predictions surfaces into instance segmentation: To convert the output network surfaces to nuclei segmentation label map, we first apply several morphological operations such as open-with-reconstruction and regional H-minima transform to find foreground and background markers from the centroid surface. Finally, predicted label map was generated by markers-controlled watershed algorithm using the edge surface regression layer. Parameters for morphological operations were set after applying Bayesian optimization with aggregated Jaccard index ("All") score as objective function.

3.2 Performance evaluation: Instance segmentation performances were evaluated using two metrics—namely, AJI and Joint-Dice—that provide accuracy measure for instance segmentation. Both metrics consider various errors in instance segmentation such as wrongly-detected pixels (false negative or false positive), over segmented instance (in which one instance is predicted and split into two or more instances), and under segmented instances (in which two or more instances are merged and predicted as a single instance), or the like.

B. Example 2

Dual-regression deep neural network for nuclei segmentation: Our approach is composed of three main steps (detailed below): first, encoding the ground truth as a set of two surfaces (see section 2.1 below); second, training a fully convolutional neural network ("FCN") based on the UNet or U-Net architecture, proposed by Ronneberger et al. in 2015, to predict those surfaces; and lastly, in post processing, using the predicted surfaces to perform constrained watershed segmentation and predict nuclei segmentation (see section 3 below).

Ground truth encoding: For each trained image, we have an associated ground truth segmentation of the pixels into non-overlapping objects (e.g., nuclei). We further compute for each nucleus its centroid (see FIGS. 4 and 7). We now compute two distance measures for each pixel: (a) distance (in pixels) to the nuclei centroid; and (b) distance to the nearest nuclei edge pixel. Following the approach of Philipp Kainz et. al. (Miccai 2015), we transform these distances from nuclei centers and edges.

Network architecture: We replace the last U-Net layer (a classification layer, for semantic classification) with two regression layers that attempt to predict the surface maps. As a loss function, we use weighted sum of squared differences between encoded ground truth and model output.

Post-Processing: To convert the output network surfaces to nuclei segmentation label map, we first apply several morphological operations such as open-with-reconstruction and regional H-minima transform to find foreground and background markers from the centroid surface. Finally, predicted label map was generated by markers-controlled watershed algorithm using the edge surface regression layer. Parameters for morphological operations were set after applying Bayesian optimization with aggregated Jaccard index ("All") score as objective function.

Adapting partial annotations for training a deep neural network: We utilize the inherent separation between detecting nuclei and tracing their contour channels, and we mask-out partially annotated instances in the second channel during the training process. Specifically, we employ a boundary-mask around semi-annotated nuclei, and hence for those specific nuclei, the network is not scored for nuclei boundary prediction but only on detection accuracy as depicted in, e.g., FIG. 3D.

Results: For training the model, we used the MoNuSeg H&E stained multi organ nuclei segmentation dataset (a nuclei segmentation challenge held on MICCAI 2018). The competition data set is composed of 30 1000×1000 images, each cropped from a WSI (captured at 40× magnification). To ensure diversity, the dataset covers 7 types of organs taken from different patients across 18 hospitals. In every image, the cells' nuclei annotation (ground truth) were provided. We used the approach described above as part of the MoNuSeg competition, where this approach achieved AJI score of 0.62 on the competition test set. For the evaluation described below, since the competition test set was not released, we selected 14 out of the 30 images to be used as a test set (those images were not used in the training phase). To simulate partial annotated data, we conducted a series of experiments, with various ratios: 10%-100% (3 cross-validation), where we randomly replaced fully annotated nuclei with nuclei centers only.

Preliminary results show that having access to only 50% fully segmented nuclei (while only approximate location of nuclei center is used for the other 50%) only decreases algorithm performance by 2%-4%.

II. User Interface and Nuclei Segmentation Partial Annotation

The disclosure teaches a method that would greatly minimize the effort required to generate a training dataset for instance segmentation tasks. This disclosure comprises a novel deep-learning training framework that is specifically developed to address the challenge of collecting segmentation training data efficiently and using it to train a deep learning-based nuclei segmentation model that can also benefit from partially annotated training data.

The disclosure teaches a method that greatly minimizes the effort required to generate a training dataset for nuclei segmentation, by using a novel encoding method to train convolutional deep neural networks ("CNNs") that allow the combination of two types of nuclei annotation (i.e., a fully segmented nuclei as well as only detected ones), as well as a novel user interface that facilitates collecting those two types of annotation.

The disclosure teaches a new scheme for instance segmentation ground-truth data, comprising a mixture of two kinds of nuclei annotation: full annotation (in which nuclei whose center as well as full contour are completely specified); and partial annotation (in which nuclei whose center is only specified).

The disclosure teaches a novel approach for solving instance segmentation problems: (i) encoding ground-truth data using two surfaces that can be robustly modeled by a fully convolutional dual-regression neural network (which might be trained with a mixture of full and partial annotation) and (ii) decoding the network predicted surfaces (for test images) into instance segmentation (based on marker-controlled watershed algorithm).

The disclosure comprises at least two parts: a user-interface that facilitate collecting both fully and partial annotation together with a method to combine both types of annotation in the training process of new nuclei segmentation algorithms. This disclosure further teaches the following:

(a) Ease or speed of generating training annotation: In one embodiment, a novel user interface is developed that allows a domain expert to quickly (with a single mouse click) either generate a complete nucleus contour or only mark approximate centers of nuclei.

(b) Utilizing Partial Annotations: Some nuclei are hard to precisely segment, so allowing the user to only mark the nuclei for detection increases the number nuclei used for training. In one embodiment, the training method marks contours and/or nuclei localizations, to provide nuclei segmentation model.

(c) Simpler training process: The disclosure teaches a method to quickly mark and/or segment all cells in a field of view, allowing for a simple training process. Thus, there is no need to pre-process or crop the data before training, (d) Full use of field of view ("FOV"): All of the data in the specific FOV is annotated to some extent (either fully segmented or partially segmented), and the method of training teaches partial annotations. The method negates the need to pre-process and crop the data before making it useful.

(e) Improved performance: Incomplete annotations are useful for the training process and increases the amount of available training data. The disclosure teaches that fully segmenting only 50% of nuclei (while only approximate location of nuclei center is recorded for the rest) only decreases algorithm performance by 2%-4%.

A. Collecting Data:

The first step in any machine learning task is collecting training data, usually a tedious and time-consuming process, and in some cases can be very expensive (as typically, an expert is required for the labeling). To this end, we teach a novel semi-supervised algorithm and user interface, called "Click-Growing," that enables quick and efficient nuclei segmentation.

1. Using our in-house whole slide image analysis software, users are instructed to click on a relevant object (e.g., nuclei).

2. The software applies a dedicated semi-supervised object-segmentation algorithm that attempts to "extend" the click and find the precise boundaries of the object. More specifically, we apply a voting mechanism among multiple automatically generated segmentations to try and identify the stable contours of the nuclei. The resulting proposed segmentation of the object is immediately (in real time) shown on screen.

3. If the user agrees with the proposed segmentation, he or she can continue and click on another nuclei. In this case, the proposed automatically generated segmentation is recorded and will be used as the nuclei contour in the training process. On the other hand, if the segmentation is not accurate, the user can try to generate new segmentation by moving (e.g., dragging, or the like) the click location, which will generate a new proposed segmentation. Alternatively, the user can mark an annotation as being partial (e.g., by double clicking on it, or the like). In this case, only the location of the click will be recorded and not the contour of the nuclei, meaning that the user acknowledges object existence but not its contour.

B. Encoding Partial Segmented Data for Training a Deep Neural Network:

Given a set of fully segmented nuclei, we teach a novel deep learning segmentation approach that encodes the training data as a pair of regression channels. The first one is the distance to the center of the nuclei (i.e., detection channel), and the second is the distance to the nuclei contour (i.e., border detecting channel). The disclosure teaches how that scheme can be extended to support fully annotated data and partially annotated data, as well as unknown objects. The disclosure teaches making use of the separation between detecting nuclei and tracing their contour channels, and masking out partially annotated instances in the second channel during the training process. Specifically, the disclosure teaches employing a boundary-mask around semi-annotated nuclei, and hence for those specific nuclei the network is not scored for nuclei boundary prediction but only on detection accuracy as depicted in, e.g., FIG. 3D. In addition, we mask pixels for unknown objects in both channels (i.e., the nuclei distance transform from centers channel and boundary channel).

C. Dual-Regression Deep Neural Network for Nuclei Segmentation:

Our approach is composed of three main steps (detailed below): first, encoding the ground truth as a set of two surfaces; second, training a fully convolutional neural network ("FCN") based on the UNet or U-Net architecture, proposed by Ronneberger et al. in 2015, to predict those surfaces; and lastly, in post processing, using the predicted surfaces to perform constrained watershed segmentation and predict nuclei segmentation.

Ground truth encoding: For each trained image, we have an associated ground truth segmentation of the pixels into non-overlapping objects (e.g., nuclei). We further compute for each nucleus its centroid (see FIGS. 4 and 7). We now compute two distance measures for each pixel: (a) distance (in pixels) to the nuclei centroid; and (b) distance to the nearest nuclei edge pixel. Following the approach of Philipp Kainz et. al. (Miccai 2015), we transform these distances from nuclei centers and edges.

Network architecture: We replace the last U-Net layer (a classification layer, for semantic classification) with two regression layers that attempt to predict the surface maps. As a loss function, we use weighted sum of squared differences between encoded ground truth and model output.

Post-Processing: To convert the output network surfaces to nuclei segmentation label map, we first apply several morphological operations such as open-with-reconstruction and regional H-minima transform to find foreground and background markers from the centroid surface. Finally, predicted label map was generated by markers-controlled watershed algorithm using the edge surface regression layer. Parameters for morphological operations were set after applying Bayesian optimization with aggregated Jaccard index ("AJI") score as objective function.

D. Adapting Partial Annotations for Training a Deep Neural Network:

We utilize the inherent separation between detecting nuclei and tracing their contour channels, and masking out partially annotated instances in the second channel during the training process. Specifically, we employ a boundary-mask around semi-annotated nuclei, and hence for those specific nuclei the network is not scored for nuclei boundary prediction but only on detection accuracy as depicted in, e.g., FIG. 3D.

Results: For training the model, we used the MoNuSeg H&E stained multi organ nuclei segmentation dataset (a nuclei segmentation challenge held on MICCAI 2018). The competition data set is composed of 30 1000×1000 images, each cropped from a WSI (captured at 40× magnification). To ensure diversity, the dataset covers 7 types of organs taken from different patients across 18 hospitals. In every image, the cells' nuclei annotation (ground truth) were provided. We used the approach described above as part of the MoNuSeg competition, where this approach achieved AJI score of 0.62 on the competition test set. For the evaluation described below, since the competition test set was not released, we selected 14 out of the 30 images to be used as a test set (those images were not used in the training phase). To simulate partial annotated data, we conducted a series of experiments, with various ratios: 10%-100% (3 cross-validation), where we randomly replaced fully annotated nuclei with nuclei centers only.

Preliminary results show that having access to only 50% fully segmented nuclei (while only approximate location of nuclei center is used for the other 50%) only decreases algorithm performance by 2%-4%.

III. Embodiments as Illustrated in the Drawings

We now turn to the embodiments as illustrated by the drawings. FIGS. 1-11 illustrate some of the features of the method, system, and apparatus for implementing digital microscopy imaging (e.g., digital pathology or live cell imaging, etc.), and, more particularly, to methods, systems, and apparatuses for implementing digital microscopy imaging using deep learning-based segmentation (in some cases, via multiple regression layers or other machine learning or deep learning architecture, or the like), implementing instance segmentation based on partial annotations, and/or implementing user interface configured to facilitate user annotation for instance segmentation within biological samples, as referred to above. The methods, systems, and apparatuses illustrated by FIGS. 1-11 refer to examples of different embodiments that include various components and steps, which can be considered alternatives or which can be used in conjunction with one another in the various embodiments. The description of the illustrated methods, systems, and apparatuses shown in FIGS. 1-11 is provided for purposes of illustration and should not be considered to limit the scope of the different embodiments.

With reference to the figures, FIG. 1 is a schematic diagram illustrating a system 100 for implementing digital microscopy imaging using deep learning-based segmentation, implementing instance segmentation based on partial annotations, and/or implementing user interface configured to facilitate user annotation for instance segmentation within biological samples, in accordance with various embodiments.

In the non-limiting embodiment of FIG. 1, system 100 might comprise a computing system 105a, an artificial intelligence ("AI") system 110a, and a data store or database 115a that is local to the computing system 105a and/or the AI system 110a. In some cases, the database 115a might be external, yet communicatively coupled, to the computing system 105a. In other cases, the database 115a might be integrated within the computing system 105a. In some embodiments, the AI system 110a—which might include, but is not limited to, at least one of a machine learning system, a deep learning system, a neural network, a convolutional neural network ("CNN"), or a fully convolutional network ("FCN") (which might include a U-Net framework or the like), and/or the like—might be external, yet communicatively coupled, to the computing system 105a or might be integrated within the computing system 105a.

System 100, according to some embodiments, might further comprise a display device 120 that might allow a user 125 to view a field of view ("FOV") of a biological sample or an image(s) or video(s) of the biological sample. System 100 might further comprise one or more user devices 130, one or more audio sensors 135 (optional), a camera(s) 140 (optional), and a microscope 145 (optional). In some instances, the one or more user devices 130 might include, without limitation, smart phones, mobile phones, tablet computers, laptop computers, desktop computers, keyboards, keypads, computer mice, or monitors, and/or the like. In some cases, the one or more audio sensors 135 might include, but is not limited to, one or more microphones, one or more voice recorders, or one or more audio recorders, and/or the like. In some instances, the camera 140 might include, without limitation, one or more eye tracking sensors, one or more motion sensors, or one or more tracking sensors, and/or the like.

According to some embodiments, the one or more user devices 130 might be used to receive user input from the user 125 indicative of annotations or labeling of objects of interest observed by the user 125 while viewing the field of view of the biological sample, whether viewing on a display screen of the display device 120 or viewing through an eyepiece(s) of the microscope 145. The one or more audio sensors 135 might be used to record vocal or spoken annotations by the user 125 while the user 125 is viewing the FOV of the biological sample either on the display device 120 or through the eyepiece(s) of the microscope 145. The camera 140 might capture images or videos of the user 125 (in some cases, capturing images or videos of at least one eye of the user 125) while the user 125 is within the FOV 140a of camera 140.

Computing system 105a might communicatively couple (either via wireless (as depicted by lightning bolt symbols, or the like) or wired connection (as depicted by connecting lines)) with one or more of the AI system 110a, the database (s) 115a, the display device 120, the one or more user devices 130, the one or more audio sensors 135, the camera 140, and/or the microscope 145. Computing system 105a, the AI system 110a, the database(s) 115a, the display device 120, the one or more user devices 130, the one or more audio sensors 135, the camera 140, and/or the microscope 145 might be disposed or located within work environment 150, which might include, but is not limited to, one of a laboratory, a clinic, a medical facility, a research facility, a healthcare facility, or a room, and/or the like.

System 100 might further comprise remote computing system 105b (optional), AI system 110b (optional), and database(s) 115b (optional) that might communicatively couple with computing system 105a and/or AI system 110a via network(s) 155. In some cases, the remote computing system 105b might include, but is not limited to a web server, a web browser, or a cloud computing system, and/or the like. Remote computing system 105b, AI system 110b, and database(s) 115b might otherwise be similar, if not identical, to computing system 105a, the AI system 110a, and the database(s) 115a, respectively.

Merely by way of example, network(s) 155 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, network(s) 155 might each include an access network of an Internet service provider ("ISP"). In another embodiment, network(s) 155 might each include a core network of the ISP, and/or the Internet.

In operation, computing system 105a, remote computing system(s) 105b, and/or AI system 110a or 110b (collectively, "computing system" or the like) might perform data augmentation on a first image and on a second image (optional), the first image comprising a field of view ("FOV") of a first biological sample, and the second image comprising labeling of instances of objects of interest in the first biological sample. In some cases, the first biological sample might include, without limitation, one of a human tissue sample, an animal tissue sample, or a plant tissue sample, and/or the like, where the objects of interest might include, but is not limited to, at least one of normal cells, abnormal cells, damaged cells, cancer cells, tumors, subcellular structures, or organ structures, and/or the like. In some embodiments, data augmentation of the first image and the second image might include, but is not limited to, at least one of elastic augmentation or color augmentation, and/or the like (in some cases, configured to facilitate instance segmentation).

Although the focus is on biological samples as described herein, the various embodiments are not so limited, and the instance segmentation, the training of the system to generate or update an AI model to predict instance segmentation, and/or the user interface configured to facilitate user annotation for instance segmentation may be adapted to apply to non-biological samples, including, but not limited to, chemical samples, humans, animals, plants, insects, tools, vehicles, structures, landmarks, planets, stars, particular animate objects, or particular inanimate objects, and/or the like. Herein, "instance segmentation" might refer to separation and/or identification of an instance of an object of interest (e.g., cells, tissue, molecular structures, parts of person, parts of an animal, parts of plants, parts of insects, parts of tools, parts of vehicles, parts of physical structures, parts of landmarks, planets, stars, parts of particular animate objects, or parts of particular inanimate objects, etc.) from other instances of the object of interest or other objects of interest that are beside or adjacent to each other. Elastic augmentation or color augmentation serves to manipulate an image to highlight or shift relative positions or orientations of the adjacent objects of interest or adjacent instances of objects of interest, thereby facilitating instance segmentation of such objects of interest.

The computing system might receive the (augmented) first image and the (augmented) second image. The computing system might train the AI system 110a or 110b to generate or update an AI model to predict instances of objects of interest based at least in part on a plurality of sets of at least two images that are generated based on the second image, each of the at least two images among the plurality of sets of at least two images being different from each other. In some embodiments, the at least two images might include, but are not limited to, at least a centroid layer image highlighting a centroid for each labeled instance of an object of interest in the second image and a border layer image highlighting an edge or border for each labeled instance of the object of interest in the second image. Alternatively, the at least two images might include, without limitation, at least a centroid layer image highlighting a centroid for each labeled instance of an object of interest in the second image, a border layer image highlighting an edge or border for each labeled instance of the object of interest in the second image, and a semantic segmentation layer image comprising semantic segmentation data for each labeled instance of the object of interest in the second image. In other alternative embodiments, the at least two images might include any number of images or surfaces highlighting different aspects of instances of objects of interest in the first biological sample.

In some embodiments, as part of the training of the AI system to generate or update the AI model to predict instances of objects of interest based at least in part on the plurality of sets of at least two images that are generated based on the second image, or the like, the computing system might encode, using an encoder (which either may be part of the software and/or hardware of the computing system or may be a separate device (in some cases, a dedicated encoder, or the like) in communication with the computing system, or the like), the (augmented) second image to generate a third encoded image and a fourth encoded image, the fourth encoded image being different from the third encoded image. In some embodiments, encoding the second image to generate the third encoded image might comprise computing, with the computing system, a centroid for each labeled instance of an object of interest in the second image; and generating, with the computing system, the third encoded image, the third encoded image comprising highlighting of the centroid for each labeled instance of an object of interest. In some instances, encoding the second image to generate the fourth encoded image might comprise computing, with the computing system, an edge or border for each labeled instance of an object of interest in the second image; and generating, with the computing system, the fourth encoded image, the fourth encoded image comprising highlighting of the edge or border for each labeled instance of the object of interest.

According to some embodiments, encoding the second image to generate the third encoded image might further comprise the computing system computing: first distance measures between each pixel in the third encoded image and each centroid for each labeled instance of the object of interest; and a first function to generate a first proximity map, the first function being a function of the first distance measures, the third encoded image comprising the first proximity map. Likewise, encoding the second image to generate the fourth encoded image might further comprise the computing system computing: second distance measures between each pixel in the fourth encoded image and a nearest edge pixel of the edge or border for each labeled instance of the object of interest; and a second function to generate a second proximity map, the second function being a function of the second distance measures, the fourth encoded image comprising the second proximity map. In some cases, the computing system might assign a first weighted pixel value for each pixel in the third encoded image, based at least in part on at least one of the computed first distance measures for each pixel, the first function, or the first proximity map; and might assign a second weighted pixel value for each pixel in the fourth encoded image, based at least in part on at least one of the computed second distance measures for each pixel, the second function, or the second proximity map.

In some embodiments, the computing system might determine a first pixel loss value between each pixel in the third encoded image and a corresponding pixel in the fifth image; and might determine a second pixel loss value between each pixel in the fourth encoded image and a corresponding pixel in the sixth image. The computing system might calculate a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image. In some instances, the loss function might include, without limitation, one of a mean squared error loss function, a mean squared logarithmic error loss function, a mean absolute error loss function, a Huber loss function, or a weighted sum of squared differences loss function, and/or the like. For example, calculating the loss value using a mean squared error loss function might comprise adding the product of the first weighted pixel value for each pixel in the third encoded image multiplied by the first pixel loss value between each pixel in the third encoded image and a corresponding pixel in the fifth image and the product of the second weighted pixel value for each pixel in the fourth encoded image multiplied by the second pixel loss value between each pixel in the fourth encoded image and a corresponding pixel in the sixth image.

In some embodiments, the AI system might update the AI model, by updating one or more parameters of the AI model based on the calculated loss value. In some cases, the one or more parameters might include, but are not limited to, a single parameter, a number of parameters between two and a hundred (inclusively), a number of parameters between a hundred and a thousand (inclusively), a number of parameters between a thousand and a million (inclusively), or more. The computing system might generate, using the updated AI model, a fifth image and a sixth image, based on the first image.

In some instances, labeling of instances of objects of interest in the second image might include, without limitation, at least one of full annotation of first instances of objects of interest that identify centroid and edge of the first instances of objects of interest, partial annotation of second instances of objects of interest that identify only centroid of the second instances of objects of interest, or unknown annotation of third instances of objects of interest that identify neither centroid nor edge (i.e., are otherwise denoted as being unknown), and/or the like. In some embodiments, the computing system might mask the second instances of objects of interest with partial annotation in the fourth encoded image and corresponding pixels in the sixth image, without masking the second instances of objects of interest with partial annotation in the third encoded image or in the fifth image, prior to calculating the loss value; and might mask the third instances of objects of interest with unknown annotation in the third encoded image and corresponding pixels in the fifth image and in the fourth encoded image and corresponding pixels in the sixth image, prior to calculating the loss value. In some cases, for partial annotation or for unknown annotation, masking the at least a portion of the second instance or the third instance of objects of interest might comprise masking out a circle in the third encoded image and/or the fourth encoded image, the circle representing the distance from the centroid or from a point within the partially annotated object denoted by user input (e.g., mouse click or the like). In some instances, the circle radius either might be pre-defined or might be calculated "on-the-fly" according to information from the full annotation of objects in the same area. Although a circular mask is described, other polygonal or geometrical shapes may be used as necessary or as desired. Alternatively, masking might comprise changing the weight of particular pixels in the third encoded image and corresponding pixels in the fifth image (or particular pixels in the fourth encoded image and corresponding pixels in the sixth image) to be the same value so that they cancel each other out when compared pixel-by-pixel.

The computing system might decode, using a decoder (which either may be part of the software and/or hardware of the computing system or may be a separate device (in some cases, a dedicated decoder, or the like) in communication with the computing system, or the like), the fifth image and the sixth image to generate a seventh image, the seventh image comprising predicted labeling of instances of objects of interest in the first biological sample, in some cases, by applying at least one of one or more morphological operations to identify foreground and background markers in each of the fifth image and the sixth image prior to generating the seventh image or one or more machine learning operations to directly decode the fifth image and the sixth image to generate the seventh image. In some instances, applying the at least one of the one or more morphological operations or the one or more machine learning operations might comprise applying the one or more morphological operations, where after decoding the fifth image and the sixth image by applying the one or more morphological operations to identify foreground and background markers in each of the fifth image and the sixth image, the computing system might apply a watershed algorithm to generate the seventh image. In some cases, the one or more morphological operations might include, but is not limited to, at least one of an open-with-reconstruction transform or a regional H-minima transform, and/or the like.

In some embodiments, the first image and the second image (or augmented first and second images) may be fed through the system many times (i.e., over many iterations, including, but not limited to, less than ten times, between ten and a hundred times (inclusively), between a hundred and a thousand times (inclusively), between a thousand and a million times (inclusively), or more). Each time, the third encoded image is compared with the fifth image and the fourth encoded image is compared with the sixth image, and the loss value is calculated based on the first weighted pixel value for each pixel in the third encoded image multiplied by the first pixel loss value between each pixel in the third encoded image and a corresponding pixel in the fifth image and based on the second weighted pixel value for each pixel in the fourth encoded image multiplied by the second pixel loss value between each pixel in the fourth encoded image and a corresponding pixel in the sixth image. The calculated loss value is used to update the one or more parameters of the AI model to generate successive regression layers, each regression layer generating fifth and sixth images that are incrementally or successively closer to being identical to respective third and fourth encoded images. As a result, with each iteration (and using each resultant or successive regression layer), the decoded image (i.e., the seventh image) would incrementally or successively become closer to being identical to the second image (which may be referred to herein as the ground truth image).

According to some embodiments, the computing system might compare the seventh image with the second image to generate an instance segmentation evaluation result. In some instances, generating the instance segmentation evaluation result might comprise evaluating instance segmentation performances using one or more metrics, which might include, without limitation, at least one of aggregated Jaccard index ("AR") metrics, F1 metrics, dice metrics, average dice metrics, or joint-dice metrics, and/or the like. In some cases, the instance segmentation evaluation result might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like. The computing system might display, on a display screen, the generated instance segmentation evaluation result. In some cases, the seventh image might be generated by marker-controlled watershed algorithm using the regression layer (which might include an edge surface regression layer, or the like). In some instances, parameters for morphological operations may be set after applying Bayesian optimization with an instance segmentation evaluation result (e.g., an AJI score, or the like) as an objective function.

In some cases, training the AI system to generate or update an AI model to predict instances of objects of interest based at least in part on a plurality of sets of at least two images that are generated based on the second image might include at least the encoding of the second image to generate the third encoded image and the fourth encoded image, the training of the AI system to generate or update the AI model to predict instances of objects of interest based at least in part on the third encoded image and the fourth encoded image, the generation of the fifth image and the sixth image, the decoding of the fifth image and the sixth image to generate the seventh image, and the comparison of the seventh image with the second image, or the like. Although two images (in this case, the third encoded image and the fourth encoded image) are used for training the AI system, the various embodiments are not so limited, and more than two images (or surfaces) may be used.

According to some embodiments, the computing system might receive an eighth image, the eighth image comprising a FOV of a second biological sample different from the first biological sample; might generate, using the AI model that is generated or updated by the trained AI system, two or more images based on the eighth image, the two or more images being different from each other; and might decode, using the decoder, the two or more images to generate a ninth image, the ninth image comprising predicted labeling of instances of objects of interest in the second biological sample. Similar to decoding of the fifth image and the sixth image, decoding the two or more images to generate the ninth image might comprise decoding, with the computing system and using the decoder, the two or more images to generate the ninth image, by applying at least one of one or more morphological operations to identify foreground and background markers in each of the two or more images prior to generating the ninth image or one or more machine learning operations to directly decode the two or more images to generate the ninth image. In the case that the one or more morphological operations are applied, after decoding the two or more images by applying the one or more morphological operations to identify foreground and background markers in each of the two or more images, the computing system might apply a watershed algorithm to generate the ninth image. In this manner, the trained AI system and/or the AI model may be used to predict labeling of instances of objects of interest in new biological samples—in some cases, where there is no ground truth image (or prior user-annotated image) corresponding to the new biological samples.

Alternatively, or additionally, the computing system might generate a user interface configured to collect training data using at least one of full annotation or partial annotation of objects of interest within images of biological samples, and might display, within a display portion of the user interface, the first image comprising the FOV of the first biological sample. The computing system might receive, from a user (e.g., a pathologist, a clinician, a doctor, a nurse, or a laboratory technician, etc.) via the user interface, a first user input that indicates a presence or location of each of a first plurality of objects of interest contained within the first image displayed in the display portion of the user interface. The computing system might generate a border around each of the first plurality of objects of interest, based at least in part on a location for each of the first plurality of objects within the first image identified by the first user input and based at least in part on analysis of pixels in or around the corresponding location using an algorithm (which might include, but is not limited to, an object detection algorithm, a pixel identification algorithm, an edge detection algorithm, and/or the like).

In some instances, the computing system might receive, from the user via the user interface, a second user input that indicates movement of a point within one of the first plurality of objects of interest from a previous position to a new position within the first image, and might generate a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest. In some cases, the computing system might receive, from the user via the user interface, a third user input that indicates partial annotation of one of a second plurality of objects of interest contained within the first image displayed in the display portion of the user interface, and might generate a partial annotation symbol in the first image identifying a location of a centroid without a border for the one of the second plurality of objects of interest, based at least in part on a position of the third user input within the first image. In some instances, the computing system might receive, from the user via the user interface, a fourth user input that indicates either that one of the third plurality of objects of interest is unknown or that an instance class of one of the third plurality of objects of interest should be switched to another instance class (e.g., cancer, benign, etc.), and might generate an unknown annotation symbol (i.e., a symbol or annotation denoting an unknown instance or object, etc.) in the first image identifying a location of an unknown object denoted by the fourth user input, based at least in part on a position of the fourth user input within the first image, or might switch an instance class of a selected one of the third plurality of objects of interest to another instance class selected by the fourth user input (e.g., switching between cancer and benign, switching between fully annotated to partially annotated, switching between partially annotated to unknown annotated, switching between fully annotated to unknown annotated, or the like).

According to some embodiments, the first user input might include, without limitation, one of a click input or a bounding region input. In some cases, the click input might define a location of a centroid of one first object among the first plurality of objects of interest identified by the click input, while the bounding region input might define an area within the first image that marks an outer limit of a border of one second object among the first plurality of objects of interest identified by the bounding region input. In some instances, the bounding region input might include, but is not limited to, one of a rectangular bounding region input, a circular bounding region input, a polygon placement input, or a line placement input, and/or the like. In some embodiments, the second user input might include, without limitation, a click and drag input. In some cases, the third user input might include, but is not limited to, a double-click input, where the third user input one of selection or deselection of a border around the one of the second plurality of objects of interest. In some instances, the fourth user input might include, without limitation, one of a shift plus mouse click input or a key plus mouse click input, where the fourth user input might include, but is not limited to, one of a toggling between full annotation and unknown annotation or a switch between instance classes from a list of instance classes, or the like. The various embodiments are not limited to these particular inputs, however, and these inputs can be any suitable inputs for indicating a full annotation, a partial annotation, and/or an unknown annotation, or the like.

The computing system might generate at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input. In this manner, the system provides a quick and efficient UI that allows the user (or annotator) to generate annotation in an efficient manner. In particular, there is no need for the user to open any menus or to follow a complex set of operations to interact with the UI for the annotation system. With a single operation (i.e., with a click input or a bounding region input, or the like), a full annotation can be generated (i.e., generation of a border around the location marked by the click input or the bounding region input, or the like). To change the auto-generated border, the user need only use a single operation (i.e., with a click drag input, or the like) to move a point within the instance or object, to cause the system to redraw or re-generate a new border around the instance or object. As such, the user need not waste time manually drawing around an edge or border of the instance or object, to obtain full annotation. Similarly, with a single operation (i.e., a shift plus mouse click input, a key plus mouse click input, or a mouse/keyboard combination, or the like), a full annotation can be changed to a partial annotation, or a class of an instance or object can be changed. The operation is not bound to specific mouse/keyboard operations; rather, any combination may be used or customized as appropriate or as desired.

In some embodiments, the computing system might train the AI system 110a or 110b to generate or update an AI model to predict instances of objects of interest in the first biological sample based at least in part on a plurality of sets of at least two images that are generated based on the at least one of the second image or the annotation dataset, each of the at least two images among the plurality of sets of at least two images being different from each other. In some cases, training the AI system to generate or update the AI model to predict instances of objects of interest based at least in part on the at least two images might comprise: encoding, with the computing system and using an encoder (which either may be part of the software and/or hardware of the computing system or may be a separate device (in some cases, a dedicated encoder, or the like) in communication with the computing system, or the like), the at least one of the second image or the annotation dataset to generate a third encoded image and a fourth encoded image, the fourth encoded image being different from the third encoded image; training the AI system to generate or update the AI model to predict instances of objects of interest based at least in part on the third encoded image and the fourth encoded image; generating, using the AI model that is generated or updated by the AI system, a fifth image and a sixth image based on the first image and based on the training, the sixth image being different from the fifth image; decoding, with the computing system and using a decoder (which either may be part of the software and/or hardware of the computing system or may be a separate device (in some cases, a dedicated decoder, or the like) in communication with the computing system, or the like), the fifth image and the sixth image to generate a seventh image, the seventh image comprising predicted labeling of instances of objects of interest in the first biological sample; and (optionally) comparing, with the computing system, the seventh image with the second image to generate an instance segmentation evaluation result. Encoding of the second image and the training of the AI system 110a or 110b may also be implemented as described below with respect to FIG. 9B, or the like.

These and other functions of the system 100 (and its components) are described in greater detail below with respect to FIGS. 2-9.

Figure 2C:
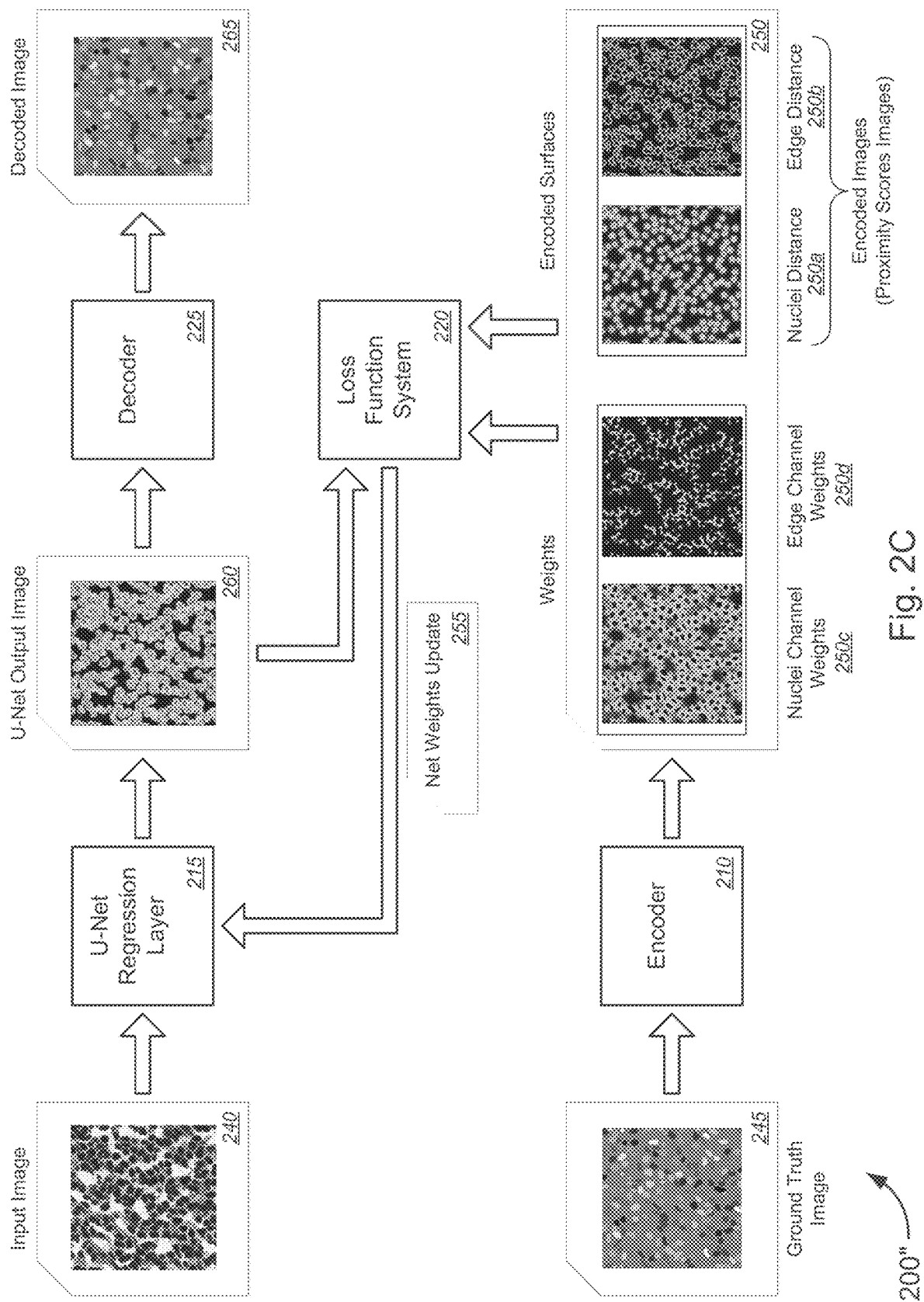

FIGS. 2A-2C (collectively, "FIG. 2") are system flow diagrams illustrating various systems 200, 200', and 200" for implementing digital microscopy imaging using deep learning-based segmentation, implementing instance segmentation based on partial annotations, and/or implementing user interface configured to facilitate user annotation for instance segmentation within biological samples, in accordance with various embodiments. In FIG. 2, system 200 might comprise a computing system 205 comprising an encoder 210, a U-Net framework 215 or a regression layer of the U-Net framework 215 (the U-Net framework 215 being an implementation of a fully convolutional network ("FCN") or the like), a loss function system 220, a decoder 225, and an accuracy evaluation system 230. System 200' might differ from system 200 in that computing system 205' of system 200' might further comprise a data augmentation system 235. Computing system 205 or 205' might correspond to computing system 105a or computing system 105b of system 100 of FIG. 1, or the like.

With reference to the non-limiting embodiment of FIG. 2A, the U-Net framework 215 might receive a first image 240, the first image 240 comprising a field of view ("FOV") of a first biological sample. According to some embodiments, the first biological sample might include, without limitation, one of a human tissue sample, an animal tissue sample, or a plant tissue sample, and/or the like, while the objects of interest might include, but are not limited to, at least one of normal cells, abnormal cells, damaged cells, cancer cells, tumors, subcellular structures, or organ structures, and/or the like. The encoder 210 might receive a second image 245, the second image 245 comprising labeling of instances of objects of interest in the first biological sample. In some instances, labeling of instances of objects of interest in the second image 245 might include, without limitation, at least one of full annotation (by a user) of first instances of objects of interest that identify centroid and edge of the first instances of objects of interest, partial annotation (by the user) of second instances of objects of interest that identify only centroid of the second instances of objects of interest, or unknown annotation (by the user) of third instances of objects of interest that identify neither centroid nor edge (i.e., are otherwise denoted as being unknown), and/or the like. According to some embodiments, the user might include, but is not limited to, a pathologist, a clinician, a doctor, a nurse, or a laboratory technician, and/or the like. In some cases, the first image 240 might be an image of size H×W (as in the case with mono camera for bright field microscopy, phase microscopy, or the like), H×W×RGB, or H×W×N (i.e., height×width×red/green/blue, or height×width×N, or the like, where N is an integer value; as in the case with spectral imaging, fluorescence, or the like), or the like, while the second image 245 might be an image of size H×W. In some instances, the second image 245 may be referred to as a ground-truth image or an instance segmentation ground-truth image, or the like.

In some embodiments, the computing system 205 or the encoder 210 might mask the second instances of objects of interest with partial annotation in the fourth encoded image and corresponding pixels in the sixth image, without masking the second instances of objects of interest with partial annotation in the third encoded image or in the fifth image, prior to calculating the loss value, and might mask the third instances of objects of interest with unknown annotation in the third encoded image and corresponding pixels in the fifth image and in the fourth encoded image and corresponding pixels in the sixth image, prior to calculating the loss value. In some cases, for partial annotation or for unknown annotation, masking the at least a portion of the second instance or the third of objects of interest might comprise masking out a circle in the third encoded image and/or the fourth encoded image, the circle representing the distance from the centroid or from a point within the partially annotated object denoted by user input (e.g., mouse click or the like). In some instances, the circle radius either might be pre-defined or might be calculated "on-the-fly" according to information from the full annotation of objects in the same area. Although a circular mask is described, other polygonal or geometrical shapes may be used as necessary or as desired. Alternatively, masking might comprise changing the weight of particular pixels in the third encoded image and corresponding pixels in the fifth image (or particular pixels in the fourth encoded image and corresponding pixels in the sixth image) to be the same value so that they cancel each other out when compared pixel-by-pixel.

The encoder 210 might compute a centroid for each labeled instance of an object of interest in the second image 245; might compute an edge or border for each labeled instance of an object of interest in the second image 245; might generate a third encoded image 250a, the third encoded image 250a comprising highlighting of the centroid for each labeled instance of an object of interest; and might generate a fourth encoded image 250b, the fourth encoded image 250b comprising highlighting of the edge or border for each labeled instance of the object of interest. In some embodiments, encoding the second image 245 to generate the third encoded image 250a might further comprise the system 200 or the encoder 210 computing: first distance measures between each pixel in the third encoded image and each centroid for each labeled instance of the object of interest; and a first function to generate a first proximity map, the first function being a function of the first distance measures, the third encoded image comprising the first proximity map. Likewise, encoding the second image to generate the fourth encoded image might further comprise the system 200 or the encoder 210 computing: second distance measures between each pixel in the fourth encoded image and a nearest edge pixel of the edge or border for each labeled instance of the object of interest; and a second function to generate a second proximity map, the second function being a function of the second distance measures, the fourth encoded image comprising the second proximity map. In some cases, the computing system might assign a first weighted pixel value for each pixel in the third encoded image (collectively, "first weighted values 250c," "nuclei channel weights 250c," "centroid channel weights 250c," "weights 250c," or the like), based at least in part on at least one of the computed first distance measures for each pixel, the first function, or the first proximity map; and might assign a second weighted pixel value for each pixel in the fourth encoded image (collectively, "second weighted values 250d," "edge channel weights 250d," "edge channel weights 250d," "weights 250d," or the like), based at least in part on at least one of the computed second distance measures for each pixel, the second function, or the second proximity map. The encoder 210 might output the third encoded image 250a and the fourth encoded image 250b (collectively, "encoded images 250" or "transformed images 250" or the like) to the loss function system 220. The encoder 210 might also output the assigned first weighted pixel value for each pixel in the third encoded image and the assigned second weighted pixel value for each pixel in the fourth encoded image to the loss function system 220.

Meanwhile, the U-Net framework 215 might receive the first image 240, and might utilize the regression layer or an AI model of the U-Net framework 215 to generate a fifth image 260a and a sixth image 260b based on the first image 240, based on one or more parameters of the regression layer or the AI model or the determined updates to the one or more parameters, or the like. The generated fifth image 260a might simulate an image (such as the third encoded image 250a, or the like) that comprises highlighting of a centroid for each predicted instance of an object of interest, while the generated sixth image 260b might simulate an image (such as the fourth encoded image 250b, or the like) that comprises highlighting of an edge or border for each predicted instance of the object of interest. The U-Net framework 215 might send the generated fifth image 260a and the generated sixth image 260b (collectively, "generated images 260" or "predicted images 260" or the like) to the decoder 225 and to the loss function system 220 as well.

The loss function system 220 might determine a first pixel loss value between each pixel in the third encoded image 250a and a corresponding pixel in the fifth image 260a; and might determine a second pixel loss value between each pixel in the fourth encoded image 250b and a corresponding pixel in the sixth image 260b. The loss function system 220 might calculate a loss value using a loss function, based on a product of the first weighted pixel value 250c for each pixel in the third encoded image 250a multiplied by the first pixel loss value between each pixel in the third encoded image 250a and a corresponding pixel in the fifth image 260a and a product of the second weighted pixel value 250d for each pixel in the fourth encoded image 250b multiplied by the second pixel loss value between each pixel in the fourth encoded image 250b and a corresponding pixel in the sixth image 260b. In some embodiments, the loss function might include, but is not limited to, one of a mean squared error loss function, a mean squared logarithmic error loss function, a mean absolute error loss function, a Huber loss function, or a weighted sum of squared differences loss function, and/or the like. The loss function system 220 might update one or more parameters of the regression layer or the AI model based on the calculated loss value, and might send the updated one or more parameters or the calculated loss value 255 to the U-Net framework 215. The system 200 might train the U-Net framework 215 to generate or update the AI model to predict instances of objects of interest, based at least in part on the third encoded image 250a and the fourth encoded image 250b, by using the updated one or more parameters to generate or re-generate the fifth image 260a and the sixth image 260b. Although system 200 uses a U-Net framework 215, the various embodiments are not so limited, and any suitable AI system may be used, including, but not limited to, at least one of a machine learning system, a deep learning system, a neural network, a convolutional neural network ("CNN"), or a fully convolutional network ("FCN"), and/or the like.

The decoder 225 might decode the fifth image 260a and the sixth image 260b to generate a seventh image 265, the seventh image 265 comprising predicted labeling of instances of objects of interest in the first biological sample. In some embodiments, decoding the fifth image 260a and the sixth image 260b to generate the seventh image 265 might comprise decoding the fifth image 260a and the sixth image 260b to generate the seventh image 265, by applying at least one of one or more morphological operations to identify foreground and background markers in each of the fifth image 260a and the sixth image 260b prior to generating the seventh image 265 or one or more machine learning operations to directly decode the fifth image 260a and the sixth image 260b to generate the seventh image 265. In the case that the one or more morphological operations are applied to identify foreground and background markers in each of the fifth image 260a and the sixth image 260b, after decoding the fifth image 260a and the sixth image 260b by applying the one or more morphological operations, the decoder 225 might apply a watershed algorithm to generate the seventh image 265. In some cases, the one or more morphological operations might include, but are not limited to, at least one of an open-with-reconstruction transform or a regional H-minima transform, and/or the like. During training, the decoder 225 might output the seventh image 265 to the accuracy evaluation system 230.

The accuracy evaluation system 230 might compare the seventh image 265 with the augmented second image 245' to generate an instance evaluation result, in some cases, by evaluating instance segmentation performances using one or more metrics. In some instances, the one or more metrics might include, without limitation, at least one of aggregated Jaccard index ("AJI") metrics, F1 metrics, dice metrics, average dice metrics, or joint-dice metrics, and/or the like. As described above, in some cases, the seventh image 265 might be generated by marker-controlled watershed algorithm using the regression layer (which might include an edge surface regression layer, or the like). In some instances, parameters for morphological operations may be set after applying Bayesian optimization with an instance segmentation evaluation result (e.g., an AJI score, or the like) as an objective function. The accuracy evaluation system 230 might output the instance evaluation result or comparison values as feedback values 270. In some cases, the generated instance segmentation evaluation result 270 might be displayed on a display screen of a display device (e.g., display device 120 of FIG. 1, or the like). In some cases, the instance segmentation evaluation result 270 might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like.

Referring to the non-limiting embodiment of FIG. 2B, the first image 240 and the second image 245 might be data augmented by the data augmentation system 235 to generated augmented first image 240' and augmented second image 245', respectively. In some cases, data augmentation of the first image 240 and the second image 245 might include, without limitation, at least one of elastic augmentation or color augmentation (in some cases, configured to facilitate instance segmentation), and/or the like (such as shown in FIGS. 5 and 6, respectively). The U-Net framework 215 might receive the augmented first image 240', while the encoder 210 might receive the augmented second image 245'. The encoder 210, the U-Net framework (or the regression layer or the AI model of the U-Net framework) 215, the loss function system 220, the decoder 225, and the accuracy evaluation system 230 of FIG. 2B might function in a similar manner as the encoder 210, the U-Net framework (or the regression layer of the U-Net framework) 215, the loss function system 220, the decoder 225, and the accuracy evaluation system 230 of FIG. 2A, except using the augmented first image 240' and the augmented second image 245' instead of the first image 240 and the second image 245.

Turning to the non-limiting embodiment of FIG. 2C, a visual depiction is provided to illustrate the training process, as described above with respect to FIG. 2A. In particular, the U-Net regression layer or framework 215 might receive a first image or input image 240, the first image or input image 240 comprising a field of view ("FOV") of a first biological sample. The encoder 210 might receive a second image or ground truth image 245, the second image or ground truth image 245 comprising labeling of instances of objects of interest in the first biological sample. In some instances, labeling of instances of objects of interest in the second image or ground truth image 245 might include, without limitation, at least one of full annotation (by a user) of first instances of objects of interest that identify centroid and edge of the first instances of objects of interest, partial annotation (by the user) of second instances of objects of interest that identify only centroid of the second instances of objects of interest, or unknown annotation (by the user) of third instances of objects of interest that identify neither centroid nor edge (i.e., are otherwise denoted as being unknown), and/or the like. In some cases, the first image or input image 240 might be an image of size H×W (as in the case with mono camera for bright field microscopy, phase microscopy, or the like), H×W×RGB, or H×W×N (i.e., height×width×red/green/blue, or height×width×N, or the like, where N is an integer value; as in the case with spectral imaging, fluorescence, or the like), or the like, while the second image or ground truth image 245 might be an image of size H×W. In some instances, the second image or ground truth image 245 may be referred to as an instance segmentation ground-truth image, or the like.

In some embodiments, the computing system 205 or 205' or the encoder 210 might mask the second instances of objects of interest with partial annotation in the fourth encoded image and corresponding pixels in the sixth image, without masking the second instances of objects of interest with partial annotation in the third encoded image or in the fifth image, prior to calculating the loss value, and might mask the third instances of objects of interest with unknown annotation in the third encoded image and corresponding pixels in the fifth image and in the fourth encoded image and corresponding pixels in the sixth image, prior to calculating the loss value. In some cases, for partial annotation or for unknown annotation, masking the at least a portion of the second instance or the third of objects of interest might comprise masking out a circle in the third encoded image and/or the fourth encoded image, the circle representing the distance from the centroid or from a point within the partially annotated object denoted by user input (e.g., mouse click or the like). In some instances, the circle radius either might be pre-defined or might be calculated "on-the-fly" according to information from the full annotation of objects in the same area. Although a circular mask is described, other polygonal or geometrical shapes may be used as necessary or as desired. Alternatively, masking might comprise changing the weight of particular pixels in the third encoded image and corresponding pixels in the fifth image (or particular pixels in the fourth encoded image and corresponding pixels in the sixth image) to be the same value so that they cancel each other out when compared pixel-by-pixel.

The encoder 210 might compute a centroid or nuclei for each labeled instance of an object of interest in the second image or ground truth image 245; might compute an edge or border for each labeled instance of an object of interest in the second image or ground truth image 245; might generate a third encoded image or nuclei distance image 250a, the third encoded image 250a comprising highlighting of the centroid for each labeled instance of an object of interest; and might generate a fourth encoded image or edge distance image 250b, the fourth encoded image 250b comprising highlighting of the edge or border for each labeled instance of the object of interest. In some embodiments, encoding the second image or ground truth image 245 to generate the third encoded image 250a might further comprise the computing system 205 or the encoder 210 computing: first distance measures between each pixel in the third encoded image and each centroid for each labeled instance of the object of interest; and a first function to generate a first proximity map, the first function being a function of the first distance measures, the third encoded image 250a comprising the first proximity map (or first proximity scores image). Likewise, encoding the second image or ground truth image to generate the fourth encoded image might further comprise the computing system 205 or the encoder 210 computing: second distance measures between each pixel in the fourth encoded image and a nearest edge pixel of the edge or border for each labeled instance of the object of interest; and a second function to generate a second proximity map, the second function being a function of the second distance measures, the fourth encoded image 250b comprising the second proximity map (or second proximity scores image). In some cases, the computing system 205 or the encoder 210 might assign a first weighted pixel value 250c for each pixel in the third encoded image, based at least in part on at least one of the computed first distance measures for each pixel, the first function, or the first proximity map; and might assign a second weighted pixel value 250d for each pixel in the fourth encoded image, based at least in part on at least one of the computed second distance measures for each pixel, the second function, or the second proximity map. As described above with respect to FIG. 2A, but as depicted with example image representations in FIG. 2C, computing system 205 or the encoder 210 might generate a first weight image or nuclei channel weights image 250c, which contains the first weighted pixel value for each pixel in the third encoded image 250a, and might generate a second weight image or edge channel weights image 250d, which contains the second weighted pixel value for each pixel in the fourth encoded image 250b. The encoder 210 might output the third encoded image 250a and the fourth encoded image 250b (collectively, "encoded images 250" or "transformed images 250" or the like). The encoder 210 might also output the assigned first weighted pixel value for each pixel in the third encoded image and the assigned second weighted pixel value for each pixel in the fourth encoded image to the loss function system 220, in some cases, outputting as the first weight image or nuclei channel weights image 250c and the second weight image or edge channel weights image 250d (collectively, "weighted images," "weights," or "weight matrix" or the like).

Meanwhile, the U-Net regression layer or framework 215 might receive the first image or input image 240, and might utilize the regression layer or an AI model of the U-Net regression layer or framework 215 to generate a fifth image 260a and a sixth image 260b (which, in some cases, may be combined as a single output image, such as U-Net Output Image 260 (which is a H×W×2 image), or the like) based on the first image or input image 240, based on one or more parameters of the regression layer or the AI model or the determined updates to the one or more parameters, or the like. The generated fifth image 260a might simulate an image (such as the third encoded image 250a, or the like) that comprises highlighting of a centroid or a nuclei for each predicted instance of an object of interest, while the generated sixth image 260b might simulate an image (such as the fourth encoded image 250b, or the like) that comprises highlighting of an edge or border for each predicted instance of the object of interest. The U-Net regression layer or framework 215 might send the generated fifth image 260a and the generated sixth image 260b (collectively, "generated images 260" or "predicted images 260" or the like) to the decoder 225 and to the loss function system 220 as well.

The loss function system 220 might determine a first pixel loss value between each pixel in the third encoded image 250a and a corresponding pixel in the fifth image 260a; and might determine a second pixel loss value between each pixel in the fourth encoded image 250b and a corresponding pixel in the sixth image 260b. The loss function system 220 might calculate a loss value using a loss function, based on a product of the first weighted pixel value for each pixel in the third encoded image 250a (or the first weight image or nuclei channel weights image 250c) multiplied by the first pixel loss value between each pixel in the third encoded image 250a and a corresponding pixel in the fifth image 260a and a product of the second weighted pixel value for each pixel in the fourth encoded image 250b (or the second weight image or edge channel weights image 250d) multiplied by the second pixel loss value between each pixel in the fourth encoded image 250b and a corresponding pixel in the sixth image 260b. In some embodiments, the loss function might include, but is not limited to, one of a mean squared error loss function, a mean squared logarithmic error loss function, a mean absolute error loss function, a Huber loss function, or a weighted sum of squared differences loss function, and/or the like. The loss function system 220 might update one or more parameters of the regression layer or the AI model based on the calculated loss value, and might send the updated one or more parameters or the calculated loss value 255 (collectively, "Net Weights Update 255" or "Parameters Update 255" or the like) to the U-Net regression layer or framework 215. The computing system 205 might train the U-Net regression layer or framework 215 to generate or update the AI model, to predict instances of objects of interest, based at least in part on the third encoded image 250a and the fourth encoded image 250b, by using the updated one or more parameters to generate or re-generate the fifth image 260a and the sixth image 260b. Although computing system 205 uses a U-Net regression layer or framework 215, the various embodiments are not so limited, and any suitable AI system may be used, including, but not limited to, at least one of a machine learning system, a deep learning system, a neural network, a convolutional neural network ("CNN"), or a fully convolutional network ("FCN"), and/or the like.

The decoder 225 might decode the fifth image 260a and the sixth image 260b to generate a seventh image or decoded image 265, the seventh image or decoded image 265 comprising predicted labeling of instances of objects of interest in the first biological sample. In some embodiments, decoding the fifth image 260a and the sixth image 260b to generate the seventh image or decoded image 265 might comprise decoding the fifth image 260a and the sixth image 260b to generate the seventh image or decoded image 265, by applying at least one of one or more morphological operations to identify foreground and background markers in each of the fifth image 260a and the sixth image 260b prior to generating the seventh image or decoded image 265 or one or more machine learning operations to directly decode the fifth image 260a and the sixth image 260b to generate the seventh image or decoded image 265. In the case that the one or more morphological operations are applied to identify foreground and background markers in each of the fifth image 260a and the sixth image 260b, after decoding the fifth image 260a and the sixth image 260b by applying the one or more morphological operations, the decoder 225 might apply a watershed algorithm to generate the seventh image or decoded image 265. In some cases, the one or more morphological operations might include, but are not limited to, at least one of an open-with-reconstruction transform or a regional H-minima transform, and/or the like.

In some embodiments, the first image 240 and the second image 245 (or augmented first and second images 240' and 245') may be fed through the system many times (i.e., over many iterations, including, but not limited to, less than ten times, between ten and a hundred times (inclusively), between a hundred and a thousand times (inclusively), between a thousand and a million times (inclusively), or more). Each time, the third encoded image 250a is compared with the fifth image 260a and the fourth encoded image 250b is compared with the sixth image 260b, and the loss value is calculated based on the first weighted pixel value for each pixel in the third encoded image (or the first weight image or nuclei channel weights image 250c) multiplied by the first pixel loss value between each pixel in the third encoded image and a corresponding pixel in the fifth image and based on the second weighted pixel value for each pixel in the fourth encoded image (or the second weight image or edge channel weights image 250d) multiplied by the second pixel loss value between each pixel in the fourth encoded image and a corresponding pixel in the sixth image. The calculated loss value is used to update the one or more parameters 255 of the AI model to generate successive regression layers, each regression layer generating fifth and sixth images that are incrementally or successively closer to being identical to respective third and fourth encoded images. As a result, with each iteration (and using each resultant or successive regression layer), the decoded image 260 (i.e., the seventh image) would incrementally or successively become closer to being identical to the ground truth image 245 (i.e., the second image). Although two images (in this case, the third encoded image 250a and the fourth encoded image 250b) are used for training the AI system, the various embodiments are not so limited, and more than two images (or surfaces) may be used.

FIGS. 3A-3E (collectively, "FIG. 3") are schematic diagrams illustrating various embodiments 300, 300', 300", 300''', and 300'''' of user interfaces that are used to facilitate user annotation for instance segmentation within biological samples, in accordance with various embodiments. A user interface 305 might be configured to collect training data for predicting instance segmentation within biological samples.

Figure 3A:
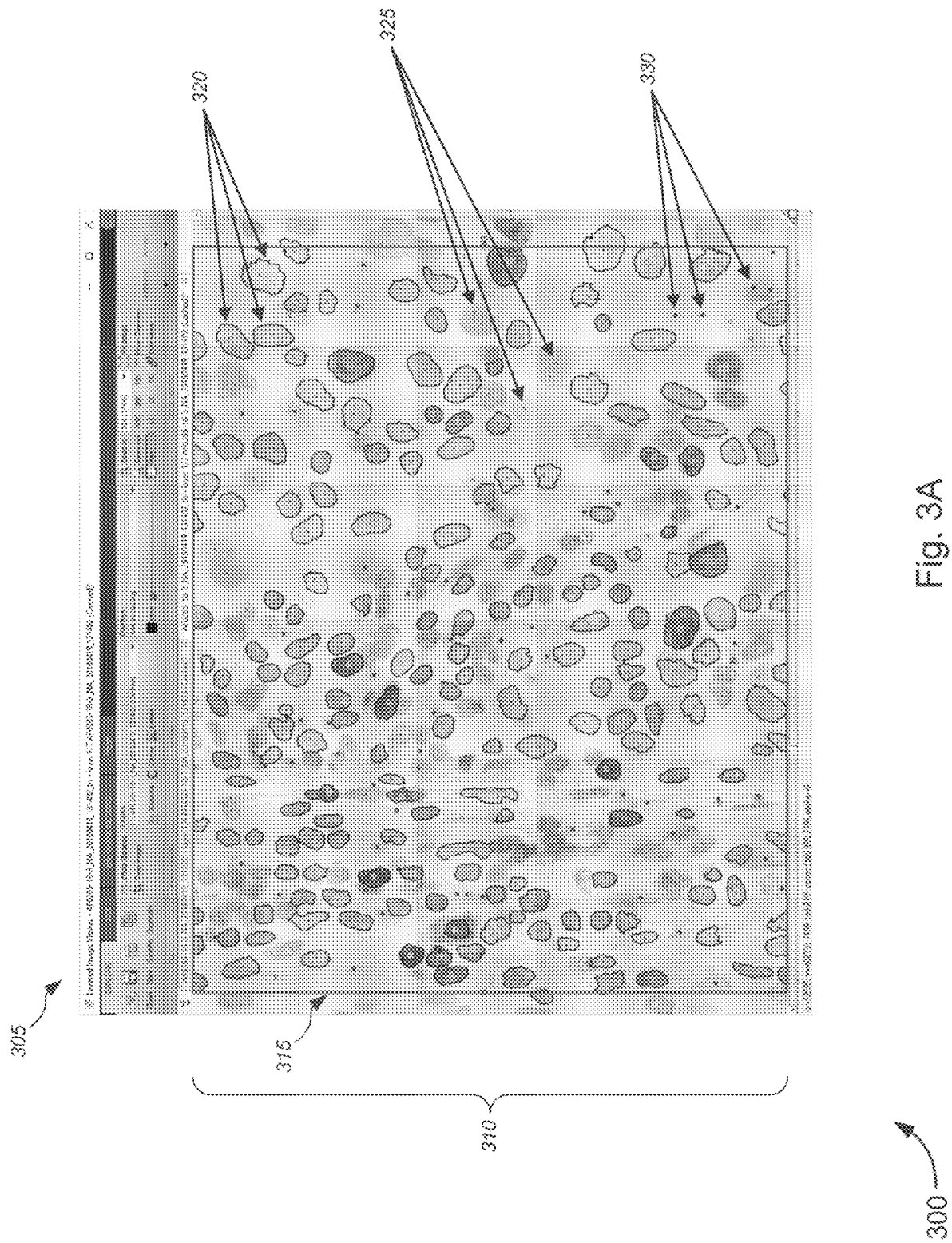
FIGS. 3A-3E are schematic diagrams illustrating various embodiments of user interfaces that are used to facilitate user annotation for instance segmentation within biological samples, in accordance with various embodiments.

With reference to the non-limiting embodiment 300 of FIG. 3A, user interface 305 might display a first image 310 (e.g., an image(s) or video(s), or the like) of a first biological sample, and in some cases, might also display a field of view ("FOV") 315 of the first image 310 of the first biological sample. A computing system (similar to computing system 105a or 105b of FIG. 1 or computing system 205 or 205' of FIG. 2, or the like) might receive, from a user (e.g., a pathologist, a clinician, a doctor, a nurse, or a laboratory technician, etc.) via the user interface 305, a first user input that indicates a presence or location of each of a first plurality of objects of interest contained within the first image displayed in the display portion of the user interface. The computing system might generate a border around each of the first plurality of objects of interest, based at least in part on a location for each of the first plurality of objects within the first image identified by the first user input and based at least in part on analysis of pixels in or around the corresponding location using an algorithm (which might include, but is not limited to, an object detection algorithm, a pixel identification algorithm, an edge detection algorithm, and/or the like).

In some instances, the computing system might receive, from the user via the user interface, a second user input that indicates movement of a point within one of the first plurality of objects of interest from a previous position to a new position within the first image, and might generate a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest. In some cases, the computing system might receive, from the user via the user interface, a third user input that indicates partial annotation of one of a second plurality of objects of interest contained within the first image displayed in the display portion of the user interface, and might generate a partial annotation symbol in the first image identifying a location of a centroid without a border for the one of the second plurality of objects of interest, based at least in part on a position of the third user input within the first image. In some instances, the computing system might receive, from the user via the user interface, a fourth user input that indicates either that one of the third plurality of objects of interest is unknown or that an instance class of one of the third plurality of objects of interest should be switched to another instance class (e.g., cancer, benign, etc.), and might generate an unknown annotation symbol (i.e., a symbol or annotation denoting an unknown instance or object, etc.) in the first image identifying a location of an unknown object denoted by the fourth user input, based at least in part on a position of the fourth user input within the first image, or might switch an instance class of a selected one of the third plurality of objects of interest to another instance class selected by the fourth user input (e.g., switching between cancer and benign, switching between fully annotated to partially annotated, switching between partially annotated to unknown annotated, switching between fully annotated to unknown annotated, or the like).

In some embodiments, the first user input might include, without limitation, one of a click input or a bounding region input. In some cases, the click input might define a location of a centroid of one first object among the first plurality of objects of interest identified by the click input, while the bounding region input might define an area within the first image that marks an outer limit of a border of one second object among the first plurality of objects of interest identified by the bounding region input. In some instances, the bounding region input might include, but is not limited to, one of a rectangular bounding region input, a circular bounding region input, a polygon placement input, or a line placement input, and/or the like. In some embodiments, the second user input might include, without limitation, a click and drag input. In some cases, the third user input might include, but is not limited to, a double-click input, where the third user input one of selection or deselection of a border around the one of the second plurality of objects of interest. In some instances, the fourth user input might include, without limitation, one of a shift plus mouse click input or a key plus mouse click input, where the fourth user input might include, but is not limited to, one of a toggling between full annotation and unknown annotation or a switch between instance classes from a list of instance classes, or the like. The various embodiments are not limited to these particular inputs, however, and these inputs can be any suitable inputs for indicating a full annotation, a partial annotation, and/or an unknown annotation, or the like.

As shown in FIG. 3A, objects 320 correspond to fully annotated objects of interest, while objects 325 correspond to partially annotated objects of interest, and objects 330 correspond to unknown objects of interest.

Figure 3B:
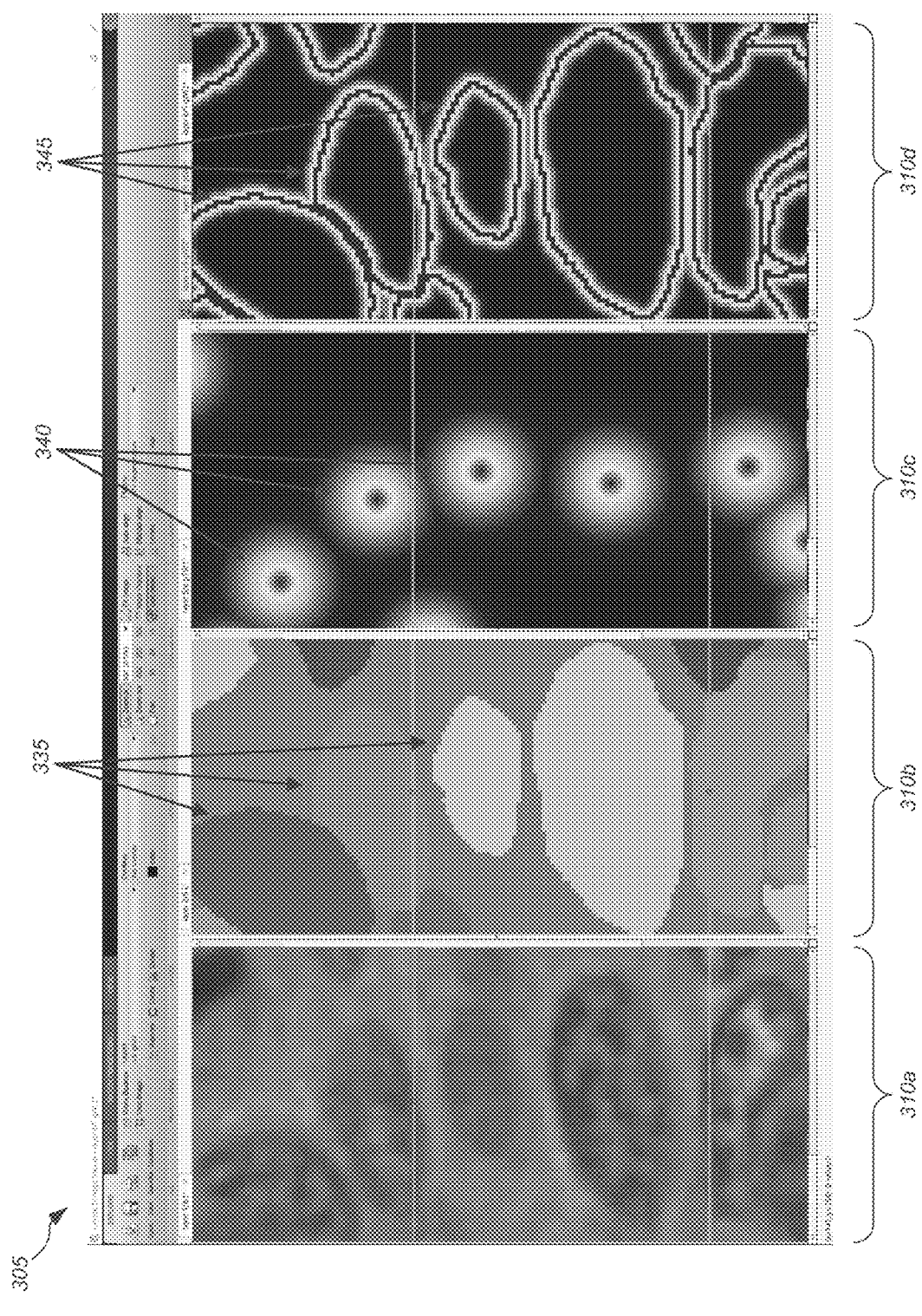

Turning to the non-limiting embodiment 300' of FIG. 3B, user interface 305 might display a second image 310a (which may correspond to the same type of image as image 240 in FIG. 2, or the like) of a second biological sample, as well as displaying a third image 310b (which may correspond to the same type of image as image 245 in FIG. 2, or the like) depicting instance segmentation 335 of objects of interest as annotated or labeled by the user, displaying a fourth image 310c (which may correspond to the same type of image as image 250a in FIG. 2, or the like) depicting a centroid 340 for each of a first plurality of objects of interest contained within the third image 310b displayed in the display portion of the user interface, and displaying a fifth image 310d (which may correspond to the same type of image as image 250b in FIG. 2, or the like) depicting a border or a bordered region 345 around each of the first plurality of objects of interest contained within the third image 310b displayed in the display portion of the user interface.

Figure 3C:
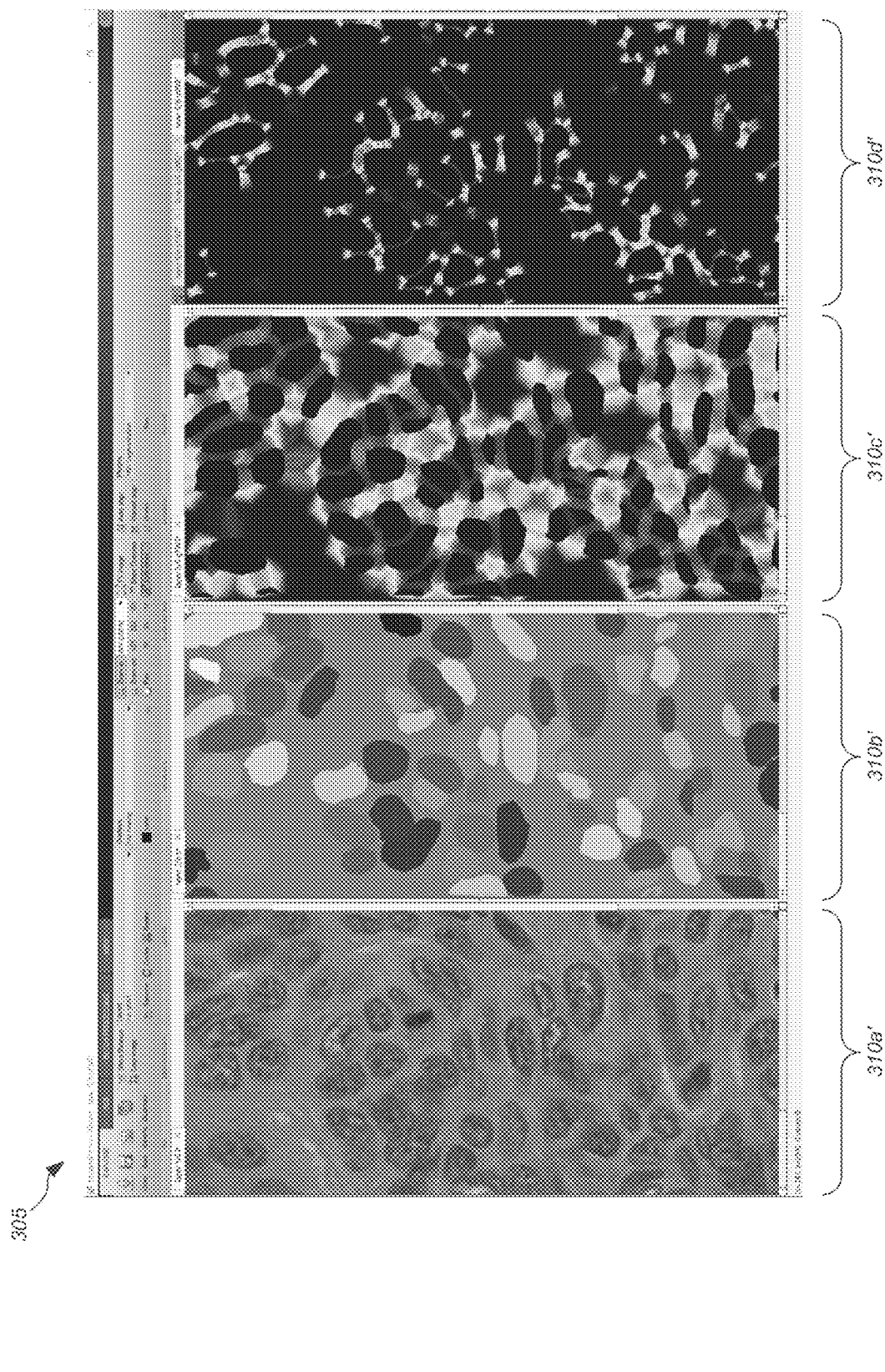

FIG. 3C depicts user interface 305 in which the second through fifth images 310a-310d are zoomed out resulting in second through fifth images 310a'-310d' (here, images 310c' and 310d' may correspond to the same type of images as image 250c and 250d, respectively, in FIG. 2, or the like), and where weighting values (e.g., in weight matrices, or the like) might be introduced to focus model attention on challenging regions of the biological sample (e.g., crowded areas, or the like). In some cases, the weighting values or matrices might be defined by equations, such as, but not limited to:

$$w(x) = w_0 \cdot \exp\left(-\frac{(d_1(x) + d_2(x))^2}{2\sigma^2}\right) \qquad \text{(Eq. 1)}$$

where w(x) is a weighting function that is applied to each pixel x, $w_0$ is a weighting constant, $d_1(x)$ is a first distance measure between each pixel x in image 310c and each centroid or nearest center pixel for each of the first plurality of objects of interest in the center images (e.g., image 250a, image 310c, or the like), $d_2$ (x) is a second distance measure between each pixel x in image 310d and a nearest (or second nearest) edge pixel of the edge or border for each of the first plurality of objects of interest, and a is a sigma value indicative of a clustering margin for each object of interest, and $d_1$ (x) and $d_2$ (x) always refer to pixels within the same source image.

In the non-limiting example 300'' of FIG. 3C, a centroid weight transform might utilize, e.g., a $w_0$ value of 5 and a a or sigma value of 10 resulting in the weighted image (similar to weight image 250c in FIG. 2, or the like) as shown in fourth image 310c', while an edge weight transform might utilize, e.g., a $w_0$ value of 10 and a σ or sigma value of 3 resulting in the weighted image (similar to weight image 250d in FIG. 2, or the like) as shown in fifth image 310d'. Alternatively, the weight transforms might comprise changing the weight of particular pixels in the third encoded image and corresponding pixels in the fifth image (or particular pixels in the fourth encoded image and corresponding pixels in the sixth image) to be the same value so that they cancel each other out when compared pixel-by-pixel. Although two images (in this case, the fourth image 310c and the fifth image 310d) are used for training the AI system, the various embodiments are not so limited, and more than two images (or surfaces) may be used.

Figure 3D:
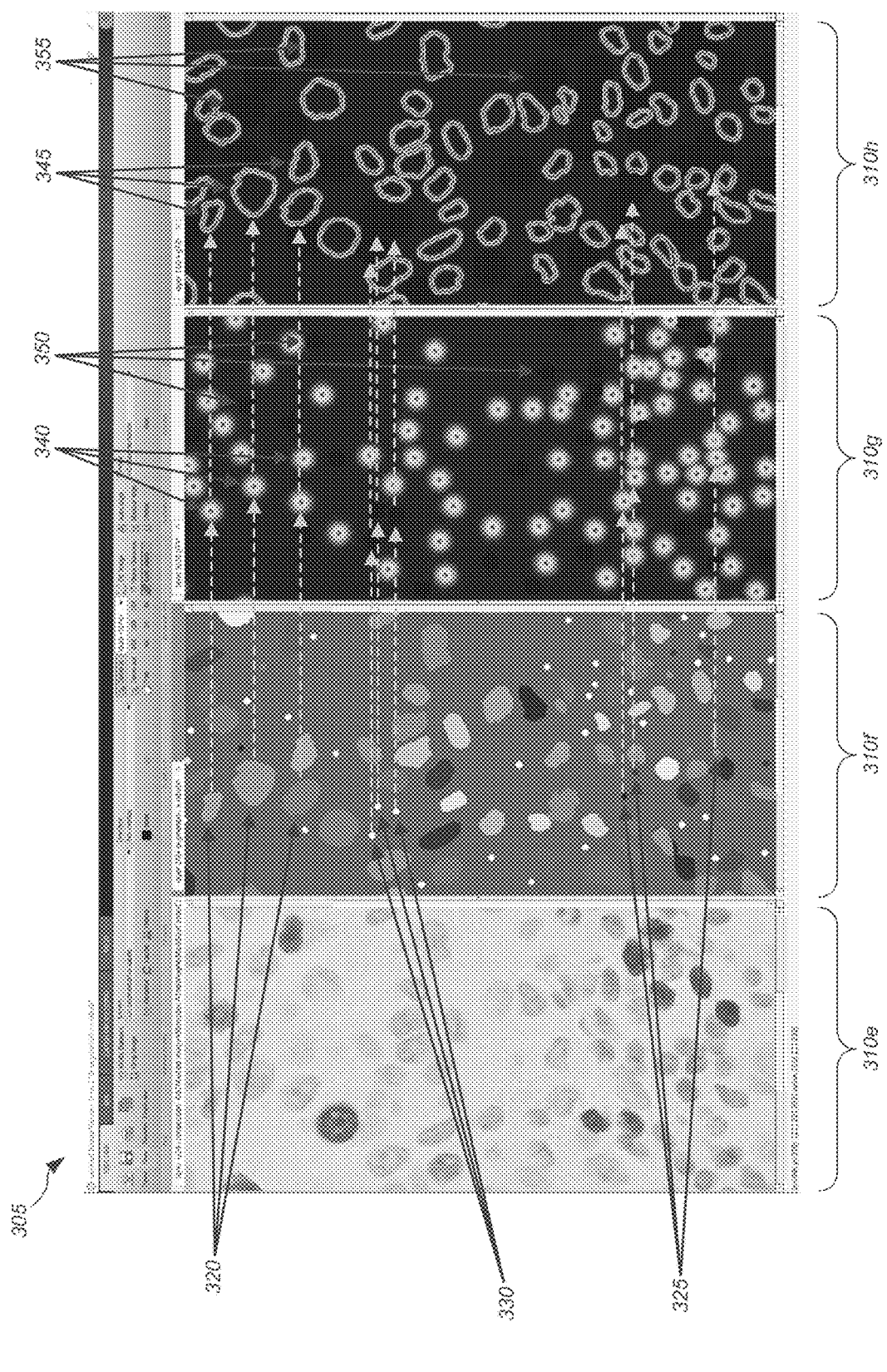

Referring to the non-limiting embodiment 300''' of FIG. 3D, user interface 305 might display a sixth image 310e of a second biological sample (different from the first biological sample shown in FIGS. 3B and 3C), as well as displaying a seventh image 310f depicting instance segmentation 335' of objects of interest as annotated or labeled by the user (e.g., fully annotated objects 320, partially annotated objects 325, unknown objects 330, or the like), displaying an eighth image 310g (which is a centroid proximity map, which may correspond to the same type of image as image 250a in FIG. 2, or the like) depicting a centroid 340 for each of a first plurality of objects of interest (e.g., fully annotated objects 320, or the like) as well as depicting a first mask 350 for each of a second plurality of objects of interest (e.g., unknown objects 330, but not partially annotated objects 325, or the like) contained within the seventh image 310f displayed in the display portion of the user interface, and displaying a ninth image 310h (which is an edge proximity map, which may correspond to the same type of image as image 250b in FIG. 2, or the like) depicting a bordered region 345 around each of the first plurality of objects of interest (e.g., fully annotated objects 320, or the like) as well as depicting a second mask 355 for each of a second plurality of objects of interest (e.g., both unknown objects 330 and partially annotated objects 325, or the like) contained within the seventh image 310f displayed in the display portion of the user interface.

Figure 3E:
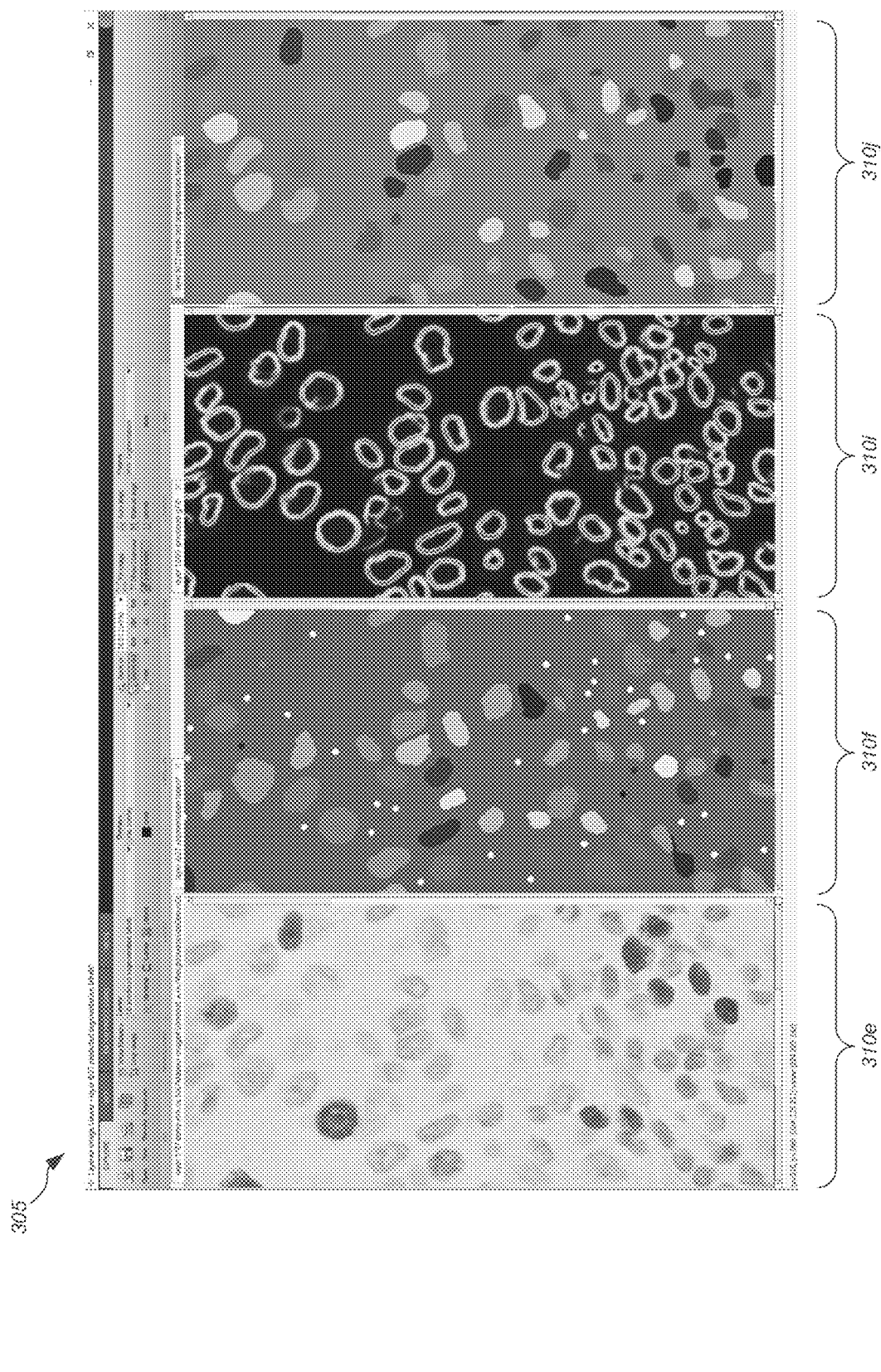

Turning to the non-limiting embodiment 300'''' of FIG. 3E, user interface 305 might display the sixth image 310e of a second biological sample, as well as displaying a seventh image 310f depicting instance segmentation 335 of objects of interest as annotated or labeled by the user (e.g., fully annotated objects 320, partially annotated objects 325, unknown objects 330, or the like), displaying a tenth image 310i depicting a predicted edge proximity score with foreground and background markers overlaid on top of this map, and displaying an eleventh image 310j depicting predicted instance segmentation of the first plurality of objects of interest contained within the seventh image 310f displayed in the display portion of the user interface. The system might be used to train an AI system (e.g., AI systems 110a, 110b, or 215 of FIGS. 1 and 2, or the like) to generate or update an AI model to predict instances of objects of interest, with a regression layer of the AI system generating the tenth image 310i as shown in FIG. 3E. The tenth image 310i may be used as the input image for marker-based watershed algorithm that may be used to generate the eleventh image 310j, in some cases, by applying at least one of one or more morphological operations to identify foreground and background markers in the tenth image 310i prior to generating the eleventh image 310j or one or more machine learning operations to directly decode the tenth image 310i to generate the eleventh image 310j. In the case that the one or more morphological operations are applied, after decoding the tenth image 310i by applying the one or more morphological operations to identify foreground and background markers in the tenth image 310i, the computing system might apply a watershed algorithm to generate the eleventh image 310j. In some cases, the one or more morphological operations might include, but are not limited to, at least one of an open-with-reconstruction transform or a regional H-minima transform, and/or the like. The eleventh image 310j might comprise predicted labeling of instances of objects of interest in the second biological sample. As described above, in some cases, the eleventh image 310j might be generated by marker-controlled watershed algorithm using the regression layer (which might include an edge surface regression layer, or the like). In some instances, parameters for morphological operations may be set after applying Bayesian optimization with an instance segmentation evaluation result (e.g., an AJI score, or the like) as an objective function. Although two images (in this case, the image (not shown) that are used to create the proximity map images 310g and 310h) are used for training the AI system, the various embodiments are not so limited, and more than two images (or surfaces) may be used.

Figure 4:
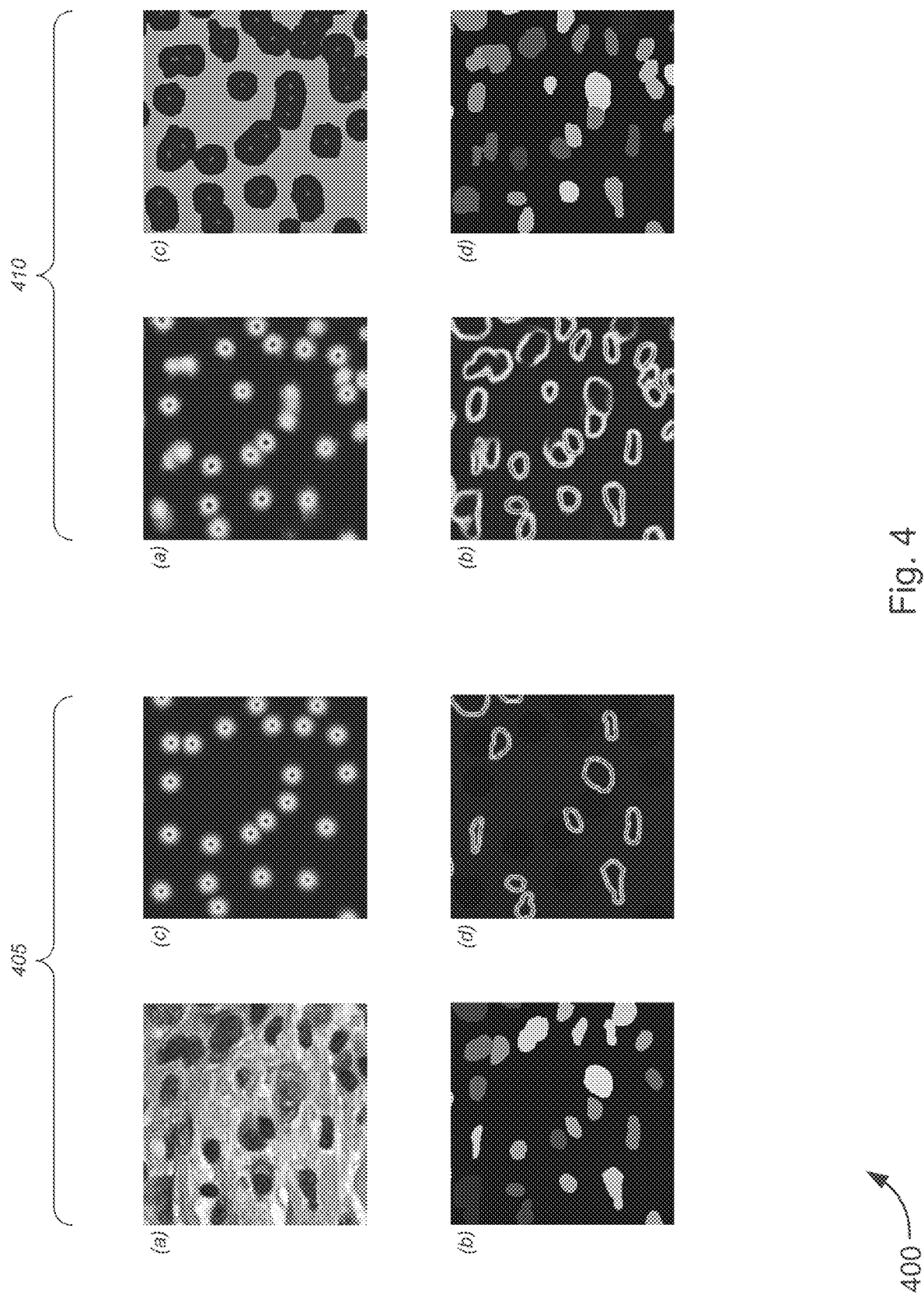
FIG. 4 depict an example of various images illustrating annotation of objects of interest in an original image of a first biological sample and illustrating prediction of objects of interest by an artificial intelligence ("AI") system, in accordance with various embodiments.

FIG. 4 depict an example 400 of various images illustrating annotation of objects of interest in an original image of a first biological sample and illustrating prediction of objects of interest by an artificial intelligence ("AI") system, in accordance with various embodiments.

With reference to the non-limiting example 400 of FIG. 4, ground truth images 405 and predicted images 410 are depicted. First image 405a—also referred to herein as "a RGB image" or the like—might comprise a field of view ("FOV") of a first biological sample, while second image 405b might comprise labeling (by a user) of instances of objects of interest in the first biological sample. According to some embodiments, the first biological sample might include, without limitation, one of a human tissue sample, an animal tissue sample, or a plant tissue sample, and/or the like, while the objects of interest might include, but are not limited to, at least one of normal cells, abnormal cells, damaged cells, cancer cells, tumors, subcellular structures, or organ structures, and/or the like. The second image 405b—also referred to herein as "a ground truth segmentation image" or the like—might include fully annotated (depicted in the second image 405b by colored shapes without white spots in their middle portions) and partially annotated objects of interest (depicted in the second image 405b by colored shapes with white spots in their middle portions). Third image 405c—also referred to herein as "a centroid distance transform image" or the like—might comprise highlighting of a centroid for each labeled instance of an object of interest (both fully annotated and partially annotated), while fourth image 405d—also referred to herein as "an edge distance transform image" or the like—might comprise highlighting of an edge or border for each labeled instance of the object of interest (for fully annotated objects) with masking for each partially annotated object).

Fifth image 410a—also referred to herein as "a predicted centroid distance transform image" or the like—might comprise highlighting of a centroid for each predicted instance of an object of interest, while sixth image 410b—also referred to herein as "a predicted edge distance transform image" or the like—might comprise highlighting of an edge or border for each predicted instance of the object of interest. Seventh image 410c might comprise foreground markers (depicted in the seventh image 410c by red dots, or the like) and background markers (depicted in the seventh image 410c by the green background, or the like). Eighth image 410d—also referred to herein as "an instance segmentation prediction image" or "decoded image" or the like—might comprise predicted labeling of instances of objects of interest in the first biological sample. In some embodiments, the system might highlight weakly or partially annotated nuclei or objects that were segmented correctly, in addition to highlighting nuclei that were missed in the original annotation.

FIG. 5 depict an example 500 of various images illustrating elastic augmentation of an original image of a first biological sample and elastic augmentation of an annotated image of the original image, in accordance with various embodiments.

Referring to the non-limiting example 500 of FIG. 5, a first image 505a—also referred to herein as "a RGB image" or the like—might comprise a field of view ("FOV") of a first biological sample, while second image 505b—also referred to herein as "an instance segmentation image" or the like—might comprise labeling (by a user) of instances of objects of interest in the first biological sample. According to some embodiments, the first biological sample might include, without limitation, one of a human tissue sample, an animal tissue sample, or a plant tissue sample, and/or the like, while the objects of interest might include, but are not limited to, at least one of normal cells, abnormal cells, damaged cells, cancer cells, tumors, subcellular structures, or organ structures, and/or the like. The first image 505a and the second image 505b might each be provided with gridlines overlaid over the FOV of the first biological sample or the annotated image of the first biological sample to exemplify the deformation, but need not be used for the instance segmentation processes.

Third image 505c—also referred to herein as "a deformed RGB image" or the like—might comprise elastic augmentation of the first image 505a, while fourth image 505d—also referred to herein as "a deformed instance segmentation image" or the like—might comprise elastic augmentation of the second image 505b. As shown in FIG. 5, the gridlines in the third image 505c and the fourth image 505d are used to highlight the elastic augmentation of the first image 505a and the second image 505b.

FIG. 6 depict an example 600 of various images illustrating color augmentation of an original image of a first biological sample, in accordance with various embodiments.

With reference to the non-limiting example 600 of FIG. 6, a first image 605a—also referred to herein as "a RGB image" or the like—might comprise a field of view ("FOV") of a first biological sample, while each of second image 605b, third image 605c, and fourth image 605d—also referred to herein as "altered color RGB image" or the like—might comprise color alterations of the FOV of the first biological sample to highlight in the different colors objects of interest contained within the FOV of the first biological sample. According to some embodiments, the first biological sample might include, without limitation, one of a human tissue sample, an animal tissue sample, or a plant tissue sample, and/or the like, while the objects of interest might include, but are not limited to, at least one of normal cells, abnormal cells, damaged cells, cancer cells, tumors, subcellular structures, or organ structures, and/or the like.

Figure 7:
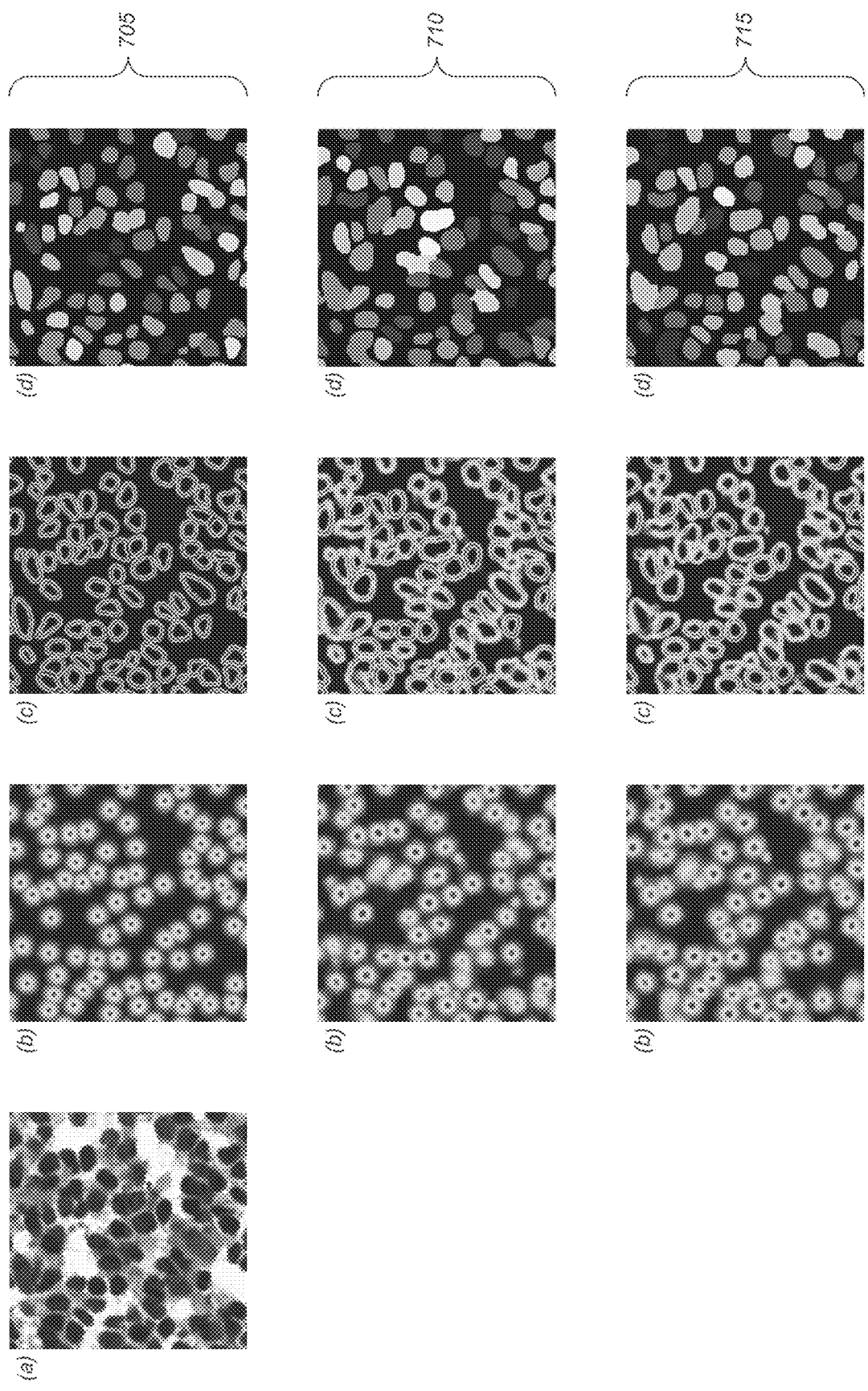
FIG. 7 depict an example of various images illustrating efficacy of prediction of objects of interest based on full and partial segmentation, in accordance with various embodiments.

FIG. 7 depict an example 700 of various images illustrating efficacy of prediction of objects of interest based on full and partial segmentation, in accordance with various embodiments.

Referring to the non-limiting example 700 of FIG. 7, a first image 705a—also referred to herein as "a RGB image" or the like—might comprise a field of view ("FOV") of a first biological sample. According to some embodiments, the first biological sample might include, without limitation, one of a human tissue sample, an animal tissue sample, or a plant tissue sample, and/or the like, while the objects of interest might include, but are not limited to, at least one of normal cells, abnormal cells, damaged cells, cancer cells, tumors, subcellular structures, or organ structures, and/or the like. Second image 705b, third image 705c, and fourth image 705d (collectively, "ground-truth images" or the like) might comprise labeling (by a user) of instances of objects of interest in the first biological sample. The second image 705b—also referred to herein as "a ground truth centroid distance transform image" or the like—might comprise highlighting of a centroid for each labeled instance of an object of interest, while third image 705c—also referred to herein as "a ground truth edge distance transform image" or the like—might comprise highlighting of an edge or border for each labeled instance of the object of interest. The fourth image 705d—also referred to herein as "a ground truth instance segmentation image" or the like—might comprise labeling (by the user) of instances of objects of interest in the first biological sample, based at least in part on the combination of the second image 705b and the third image 705c.

Fifth image 710b, sixth image 710c, and seventh 710d (collectively, "full segmentation images 710" or the like) depict AI model predictions when the trained model was trained with full segmentation annotation (i.e., 100% labeling (by the user) of instances of objects of interest in the first biological sample). The fifth image 710b—also referred to herein as "a full segmentation centroid distance transform image" or the like—might comprise highlighting of a predicted centroid for each labeled instance of an object of interest, while sixth image 710c—also referred to herein as "a full segmentation edge distance transform image" or the like—might comprise highlighting of a predicted edge or border for each labeled instance of the object of interest. The seventh image 710d—also referred to herein as "a full segmentation instance segmentation image" or the like—might comprise predicted labeling of instances of objects of interest in the first biological sample, based at least in part on the combination of the fifth image 710b and the sixth image 710c.

Eighth image 715b, ninth image 715c, and tenth 715d (collectively, "50% partial segmentation images 715" or the like) depict AI model predictions when the trained model was trained with 50% segmentation annotation (i.e., the labeling (by the user) of instances of objects of interest in the first biological sample comprises 50% of the instances that have ground truth for both centroids and edges, while 50% of the instances have ground truth only for their centroids). The eighth image 715b—also referred to herein as "a 50% partial segmentation centroid distance transform image" or the like—might comprise highlighting of a predicted centroid for each labeled instance of an object of interest, while ninth image 715c—also referred to herein as "a 50% partial segmentation edge distance transform image" or the like—might comprise highlighting of a predicted edge or border for each labeled instance of the object of interest. The tenth image 715d—also referred to herein as "a 50% partial segmentation instance segmentation image" or the like—might comprise predicted labeling of instances of objects of interest in the first biological sample, based at least in part on the combination of the eighth image 715b and the ninth image 715c.

FIGS. 8A-8D (collectively, "FIG. 8") are flow diagrams illustrating a method 800 for implementing digital microscopy imaging using deep learning-based segmentation and/or implementing instance segmentation based on partial annotations, in accordance with various embodiments. Method 800 of FIG. 8A continues onto FIG. 8C following the circular marker denoted, "A," and returns from FIG. 8C to FIG. 8A following the circular marker denoted, "B." Method 800 of FIG. 8A continues onto FIG. 8D following the circular marker denoted, "C."

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7, respectively (or components thereof), such methods may also be implemented using any suitable hardware (or software) implementation. Similarly, while each of the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7, respectively (or components thereof), can operate according to the method 800 illustrated by FIG. 8 (e.g., by executing instructions embodied on a computer readable medium), the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7 can each also operate according to other modes of operation and/or perform other suitable procedures.

Figure 8A:
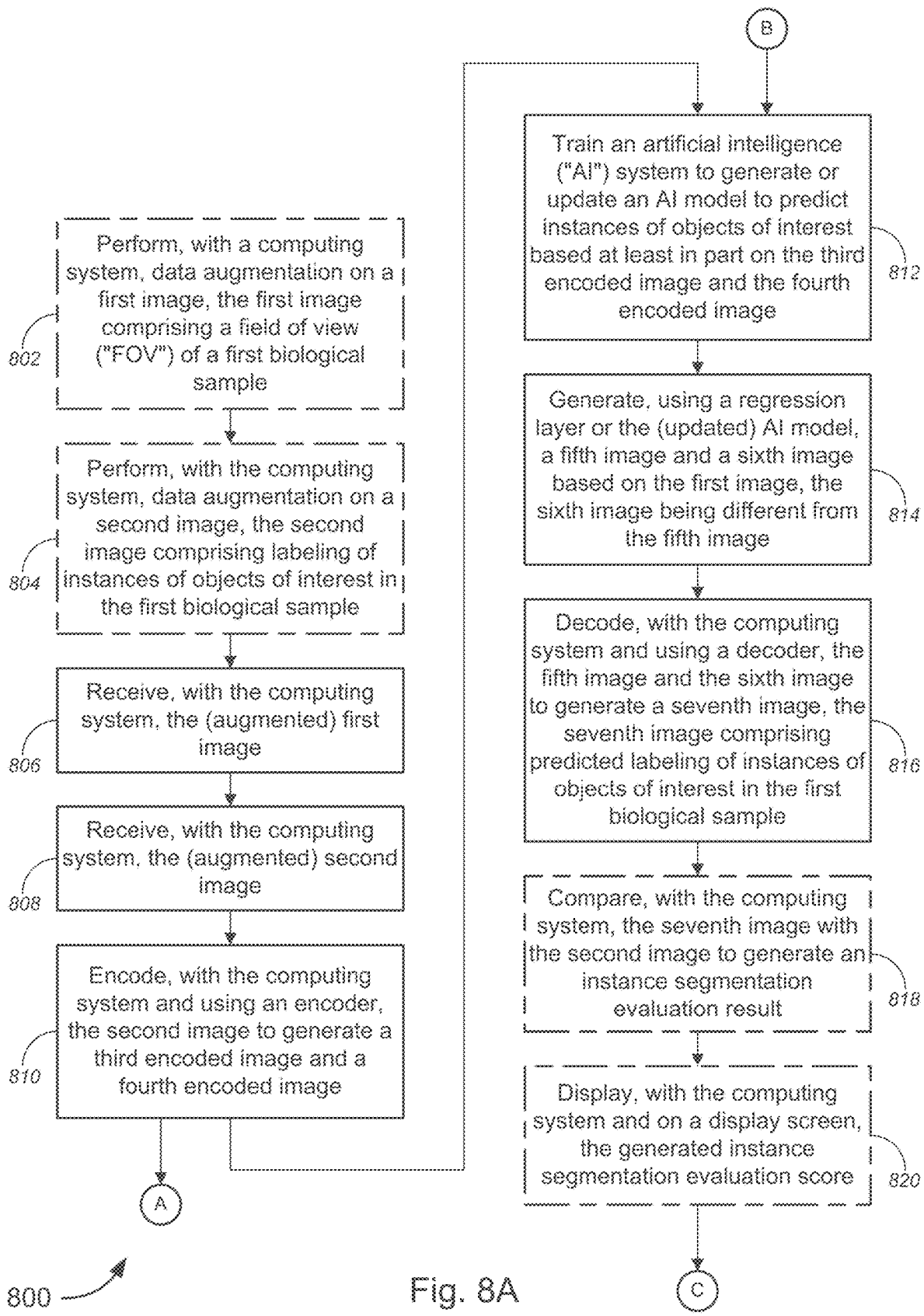

In the non-limiting embodiment of FIG. 8A, method 800, at optional block 802, might comprise performing, with a computing system, data augmentation on a first image, the first image comprising a field of view ("FOV") of a first biological sample. At optional block 804, method 800 might perform, with the computing system, (the same) data augmentation on a second image, the second image comprising labeling of instances of objects of interest in the first biological sample.

In some embodiments, the computing system might include, without limitation, one of a computing system disposed in a work environment, a remote computing system disposed external to the work environment and accessible over a network, a web server, a web browser, or a cloud computing system, and/or the like. In some cases, the work environment might include, but is not limited to, at least one of a laboratory, a clinic, a medical facility, a research facility, a healthcare facility, or a room, and/or the like. In some instances, the first biological sample might include, without limitation, one of a human tissue sample, an animal tissue sample, or a plant tissue sample, and/or the like. In some cases, the objects of interest might include, but are not limited to, at least one of normal cells, abnormal cells, damaged cells, cancer cells, tumors, subcellular structures, or organ structures, and/or the like. In some instances, labeling of instances of objects of interest in the second image might include, without limitation, at least one of full annotation of first instances of objects of interest that identify centroid and edge of the first instances of objects of interest or partial annotation of second instances of objects of interest that identify only centroid of the second instances of objects of interest, and/or the like. In some cases, data augmentation of the first image and the second image might include, but is not limited to, at least one of elastic augmentation or color augmentation (in some cases, configured to facilitate instance segmentation), and/or the like.

Method 800 might comprise receiving the first image or the augmented first image (block 806) and receiving the second image or the augmented second image (block 808). At block 810, method 800 might comprise encode, using an encoder, the second image to generate a third encoded image and a fourth encoded image, the fourth encoded image being different from the third encoded image. Method 800 might continue onto the process at block 812 or might continue onto the process at block 838 in FIG. 8C following the circular marker denoted, "A."

Method 800, at block 812, might comprise training an artificial intelligence ("AI") system to generate or update an AI model to predict instances of objects of interest based at least in part on the third encoded image and the fourth encoded image. In some embodiments, the AI system might include, but is not limited to, at least one of a machine learning system, a deep learning system, a neural network, a convolutional neural network ("CNN"), or a fully convolutional network ("FCN") (which might include a U-Net framework or the like), and/or the like. Method 800 might further comprise, at block 814, generating, using a regression layer of the AI system or the (updated) AI model, a fifth image and a sixth image based on the first image, the sixth image being different from the fifth image. Method 800 might further comprise decoding, with the computing system and using a decoder, the fifth image and the sixth image to generate a seventh image, the seventh image comprising predicted labeling of instances of objects of interest in the first biological sample (block 816); comparing, with the computing system, the seventh image with the second image to generate an instance segmentation evaluation result (optional block 818); and displaying, with the computing system and on a display screen, the generated instance segmentation evaluation result (optional block 820). In some embodiments, decoding the fifth image and the sixth image to generate the seventh image (at block 816) might comprise decoding, with the computing system and using the decoder, the fifth image and the sixth image to generate the seventh image, by applying one or more morphological operations to identify foreground and background markers in each of the fifth image and the sixth image prior to generating the seventh image or one or more machine learning operations to directly decode the fifth image and the sixth image to generate the seventh image. In the case that the one or more morphological operations are applied, after decoding the fifth image and the sixth image by applying the one or more morphological operations to identify foreground and background markers in each of the fifth image and the sixth image, method 800 might comprise applying, with the computing system, a watershed algorithm to generate the seventh image. In some cases, the one or more morphological operations might include, but is not limited to, at least one of an open-with-reconstruction transform or a regional H-minima transform, and/or the like. According to some embodiments, generating the instance segmentation evaluation result (at block 818) might comprise evaluating instance segmentation performances using one or more metrics, which might include, without limitation, at least one of aggregated Jaccard index ("AJI") metrics, F1 metrics, dice metrics, average dice metrics, or joint-dice metrics, and/or the like. In some cases, the instance segmentation evaluation result might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like.

Figure 8B:
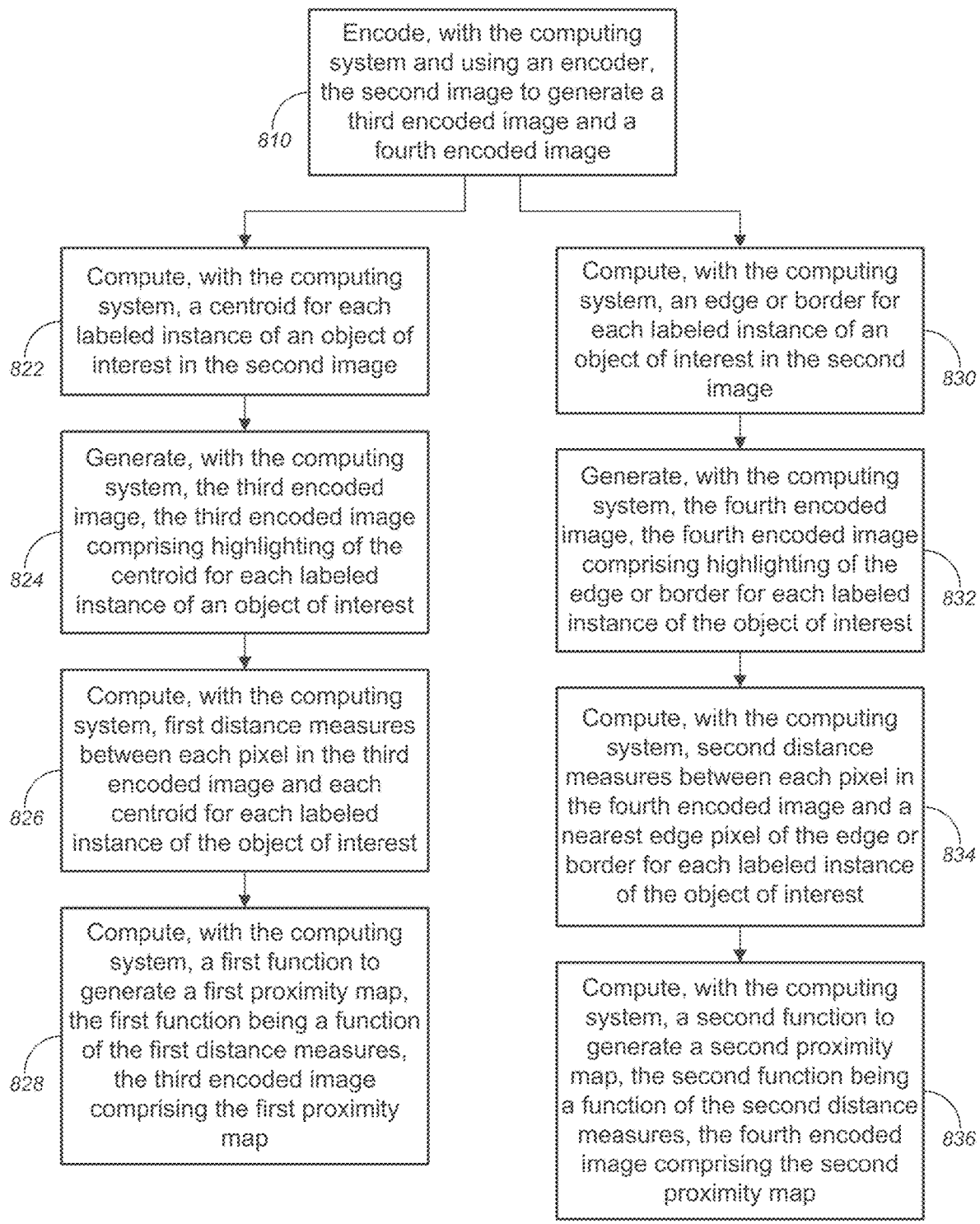
Figure 8D:
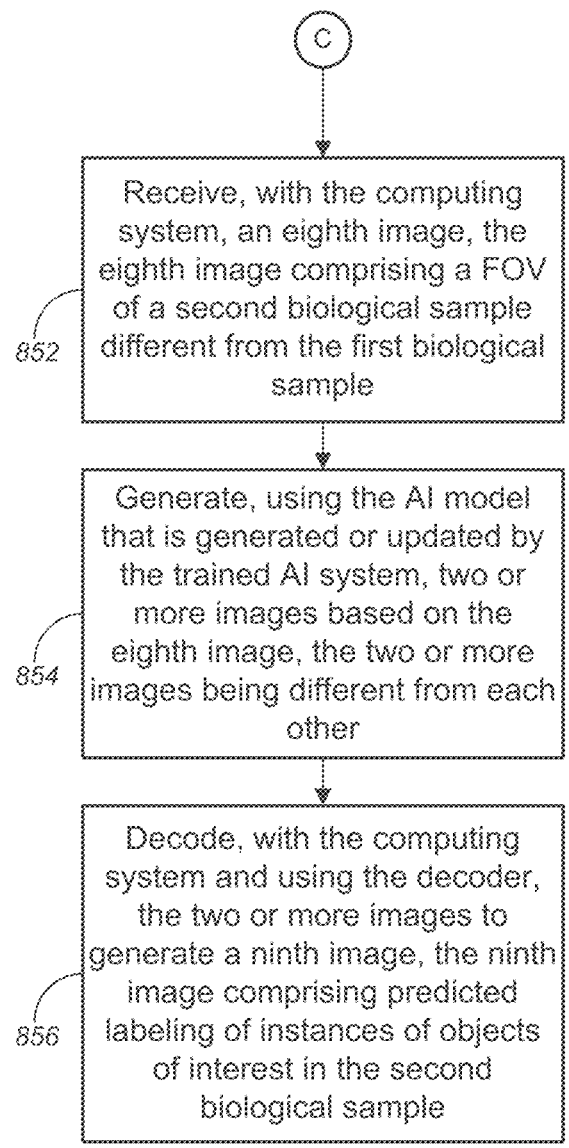

Method 800 might continue onto the process at block 852 in FIG. 8D following the circular marker denoted, "C."

With reference to FIG. 8B, encoding the second image to generate the third encoded image and the fourth encoded image (at block 810) might comprise computing, with the computing system, a centroid for each labeled instance of an object of interest in the second image (block 822); and generating, with the computing system, the third encoded image, the third encoded image comprising highlighting of the centroid for each labeled instance of an object of interest (block 824). In some embodiments, encoding the second image to generate the third encoded image and the fourth encoded image (at block 810) might further comprise computing, with the computing system, first distance measures between each pixel in the third encoded image and each centroid for each labeled instance of the object of interest (block 826); and computing, with the computing system, a first function to generate a first proximity map, the first function being a function of the first distance measures, the third encoded image comprising the first proximity map (block 828). Alternatively, or additionally, encoding the second image to generate the third encoded image and the fourth encoded image (at block 810) might comprise computing, with the computing system, an edge or border for each labeled instance of an object of interest in the second image (block 830); and generating, with the computing system, the fourth encoded image, the fourth encoded image comprising highlighting of the edge or border for each labeled instance of the object of interest (block 832). In some embodiments, encoding the second image to generate the third encoded image and the fourth encoded image (at block 810) might further comprise computing, with the computing system, second distance measures between each pixel in the fourth encoded image and a nearest edge pixel of the edge or border for each labeled instance of the object of interest (block 834); and computing, with the computing system, a second function to generate a second proximity map, the second function being a function of the second distance measures, the fourth encoded image comprising the second proximity map (block 836).

According to some embodiments, labeling of instances of objects of interest in the second image might include, but is not limited to, at least one of full annotation of first instances of objects of interest that identify centroid and edge of the first instances of objects of interest, partial annotation of second instances of objects of interest that identify only centroid of the second instances of objects of interest, or unknown annotation of third instances of objects of interest that identify neither centroid nor edge, and/or the like. At block 838 in FIG. 8C (following the circular marker denoted, "A"), method 800 might comprise masking, with the computing system, the second instances of objects of interest with partial annotation in the fourth encoded image and corresponding pixels in the sixth image, without masking the second instances of objects of interest with partial annotation in the third encoded image or in the fifth image, and masking, with the computing system, the third instances of objects of interest with unknown annotation in the third encoded image and corresponding pixels in the fifth image and in the fourth encoded image and corresponding pixels in the sixth image. Method 800 might further comprise assigning, with the computing system, a first weighted pixel value for each pixel in the third encoded image, based at least in part on at least one of the computed first distance measures for each pixel, the first function, or the first proximity map (block 840) and assigning, with the computing system, a second weighted pixel value for each pixel in the fourth encoded image, based at least in part on at least one of the computed second distance measures for each pixel, the second function, or the second proximity map (block 842). At block 844, method 800 might comprise determining, with the computing system, a first pixel loss value between each pixel in the third encoded image and a corresponding pixel in the fifth image. Method 800, at block 846, might comprise determining, with the computing system, a second pixel loss value between each pixel in the fourth encoded image and a corresponding pixel in the sixth image. Method 800 might further comprise, at block 848, calculating, with the computing system, a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image. The loss function might include, without limitation, one of a mean squared error loss function, a mean squared logarithmic error loss function, a mean absolute error loss function, a Huber loss function, or a weighted sum of squared differences loss function, and/or the like. At block 850, method 800 might comprise updating, with the AI system, the AI model, by updating one or more parameters of the AI model based on the calculated loss value. Method 800 might return to the process at block 812 in FIG. 8A following the circular marker denoted, "B." In some cases, generating the fifth image and the sixth image (at block 814) might comprise generating, using a regression layer of the AI system or using the updated AI model, the fifth image and the sixth image, based on the first image.

At block 852 in FIG. 8D (following the circular marker denoted, "C"), method 800 might comprise receiving, with the computing system, an eighth image, the eighth image comprising a FOV of a second biological sample different from the first biological sample. Method 800 might further comprise, at block 854, generating, using the AI model that is generated or updated by the trained AI system, two or more images based on the eighth image, the two or more images being different from each other. Method 800, at block 856, might comprise decoding, with the computing system and using the decoder, the two or more images to generate a ninth image, the ninth image comprising predicted labeling of instances of objects of interest in the second biological sample.

In some embodiments, decoding the fifth image and the sixth image to generate the seventh image might comprise decoding, with the computing system and using the decoder, the fifth image and the sixth image to generate the seventh image, by applying at least one of one or more morphological operations to identify foreground and background markers in each of the fifth image and the sixth image prior to generating the seventh image or one or more machine learning operations to directly decode the fifth image and the sixth image to generate the seventh image. In the case that the one or more morphological operations are applied, the method might comprise, after decoding the fifth image and the sixth image by applying the one or more morphological operations to identify foreground and background markers in each of the fifth image and the sixth image, applying a watershed algorithm to generate the seventh image (not shown in FIG. 8). In some cases, the one or more morphological operations might include, but is not limited to, at least one of an open-with-reconstruction transform or a regional H-minima transform, and/or the like.

Similarly, decoding the two or more images to generate the ninth image might comprise decoding, with the computing system and using the decoder, the two or more images to generate the ninth image, by applying at least one of one or more morphological operations to identify foreground and background markers in each of the two or more images prior to generating the ninth image or one or more machine learning operations to directly decode the two or more images to generate the ninth image. In the case that the one or more morphological operations are applied, the method might comprise, after decoding the two or more images by applying the one or more morphological operations to identify foreground and background markers in each of the two or more images, applying a watershed algorithm to generate the ninth image (also not shown in FIG. 8).

FIGS. 9A-9D (collectively, "FIG. 9") are flow diagrams illustrating a method 900 for implementing digital microscopy imaging using deep learning-based segmentation, implementing instance segmentation based on partial annotations, and/or implementing user interface configured to facilitate user annotation for instance segmentation within biological samples, in accordance with various embodiments. Method 900 of FIG. 9A continues onto FIG. 9B following the circular marker denoted, "A," continues from FIG. 9B onto FIG. 9C following the circular marker denoted, "B," and continues from FIG. 9C onto FIG. 9D following the circular marker denoted, "C."

While the techniques and procedures are depicted and/or described in a certain order for purposes of illustration, it should be appreciated that certain procedures may be reordered and/or omitted within the scope of various embodiments. Moreover, while the method 900 illustrated by FIG. 9 can be implemented by or with (and, in some cases, are described below with respect to) the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7, respectively (or components thereof), such methods may also be implemented using any suitable hardware (or software) implementation. Similarly, while each of the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7, respectively (or components thereof), can operate according to the method 900 illustrated by FIG. 9 (e.g., by executing instructions embodied on a computer readable medium), the systems, examples, or embodiments 100, 200, 200', 200", 300, 300', 300", 300''', 300'''', 400, 500, 600, and 700 of FIGS. 1, 2A, 2B, 2C, 3A, 3B, 3C, 3D, 3E, 4, 5, 6, and 7 can each also operate according to other modes of operation and/or perform other suitable procedures.

Figure 9A:
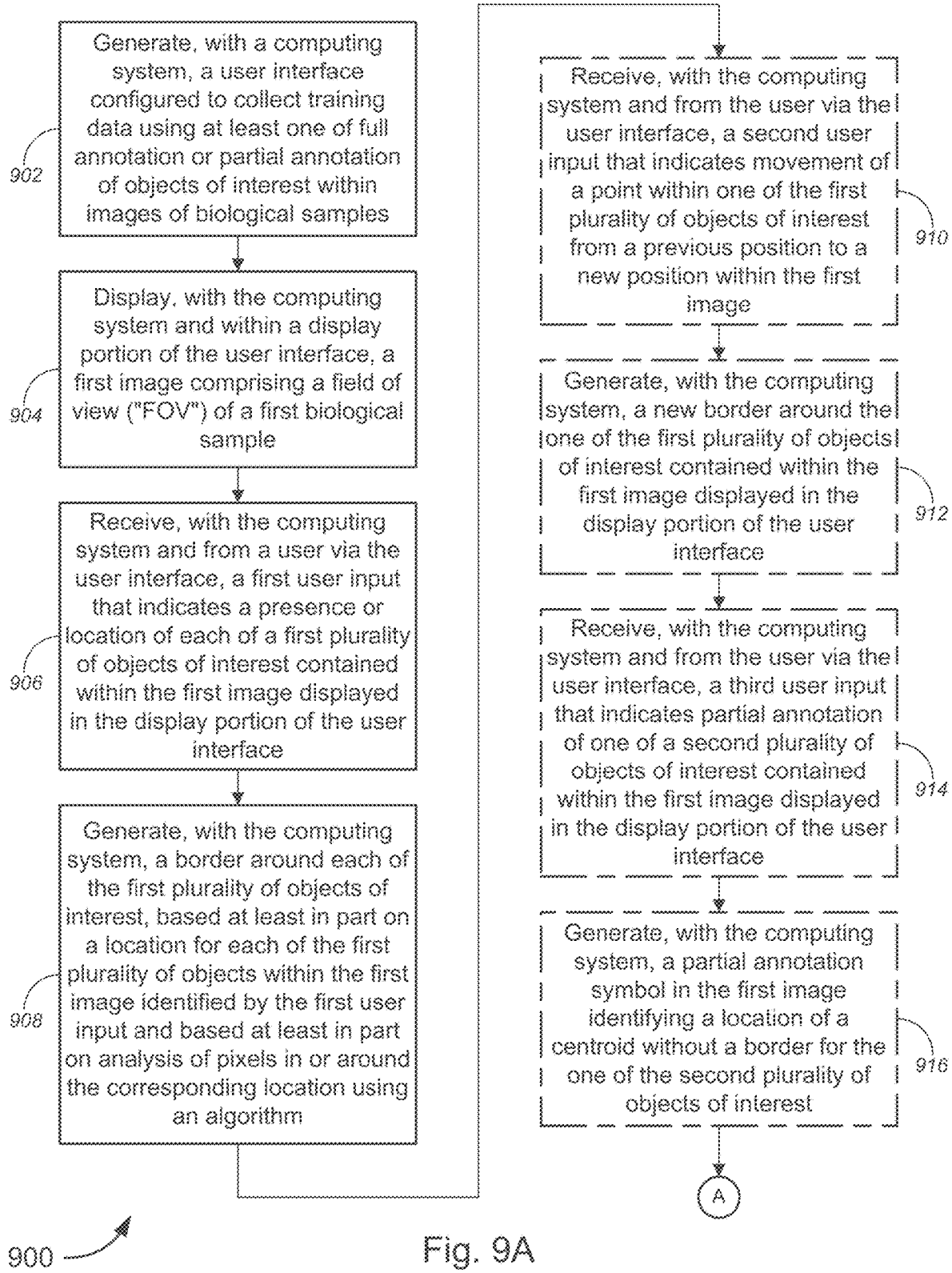

In the non-limiting embodiment of FIG. 9A, method 900, at block 902, might comprise generating, with a computing system, a user interface configured to collect training data using at least one of full annotation or partial annotation of objects of interest within images of biological samples. At block 904, method 900 might comprise displaying, with the computing system and within a display portion of the user interface, a first image comprising a field of view ("FOV") of a first biological sample.

In some embodiments, the computing system might include, without limitation, one of a computing system disposed in a work environment, a remote computing system disposed external to the work environment and accessible over a network, a web server, a web browser, or a cloud computing system, and/or the like. In some cases, the work environment might include, but is not limited to, at least one of a laboratory, a clinic, a medical facility, a research facility, a healthcare facility, or a room, and/or the like. In some instances, the first biological sample might include, without limitation, one of a human tissue sample, an animal tissue sample, or a plant tissue sample, and/or the like.

Method 900 might further comprise receiving, with the computing system and from a user (e.g., a pathologist, a clinician, a doctor, a nurse, or a laboratory technician, etc.) via the user interface, a first user input that indicates a presence or location of each of a first plurality of objects of interest contained within the first image displayed in the display portion of the user interface (block 906); generating, with the computing system, a border around each of the first plurality of objects of interest, based at least in part on a location for each of the first plurality of objects within the first image identified by the first user input and based at least in part on analysis of pixels in or around the corresponding location using an algorithm (which might include, but is not limited to, an object detection algorithm, a pixel identification algorithm, an edge detection algorithm, and/or the like) (block 908); receiving, with the computing system and from the user via the user interface, a second user input that indicates movement of a point within one of the first plurality of objects of interest from a previous position to a new position within the first image (optional block 910); generating, with the computing system, a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest (optional block 912); receiving, with the computing system and from the user via the user interface, a third user input that indicates partial annotation of one of a second plurality of objects of interest contained within the first image displayed in the display portion of the user interface (optional block 914); and generating, with the computing system, a partial annotation symbol in the first image identifying a location of a centroid without a border for the one of the second plurality of objects of interest, based at least in part on a position of the third user input within the first image (optional block 916). Method 900 might continue onto the process at optional block 918 in FIG. 9B following the circular marker denoted, "A."

Figure 9B:
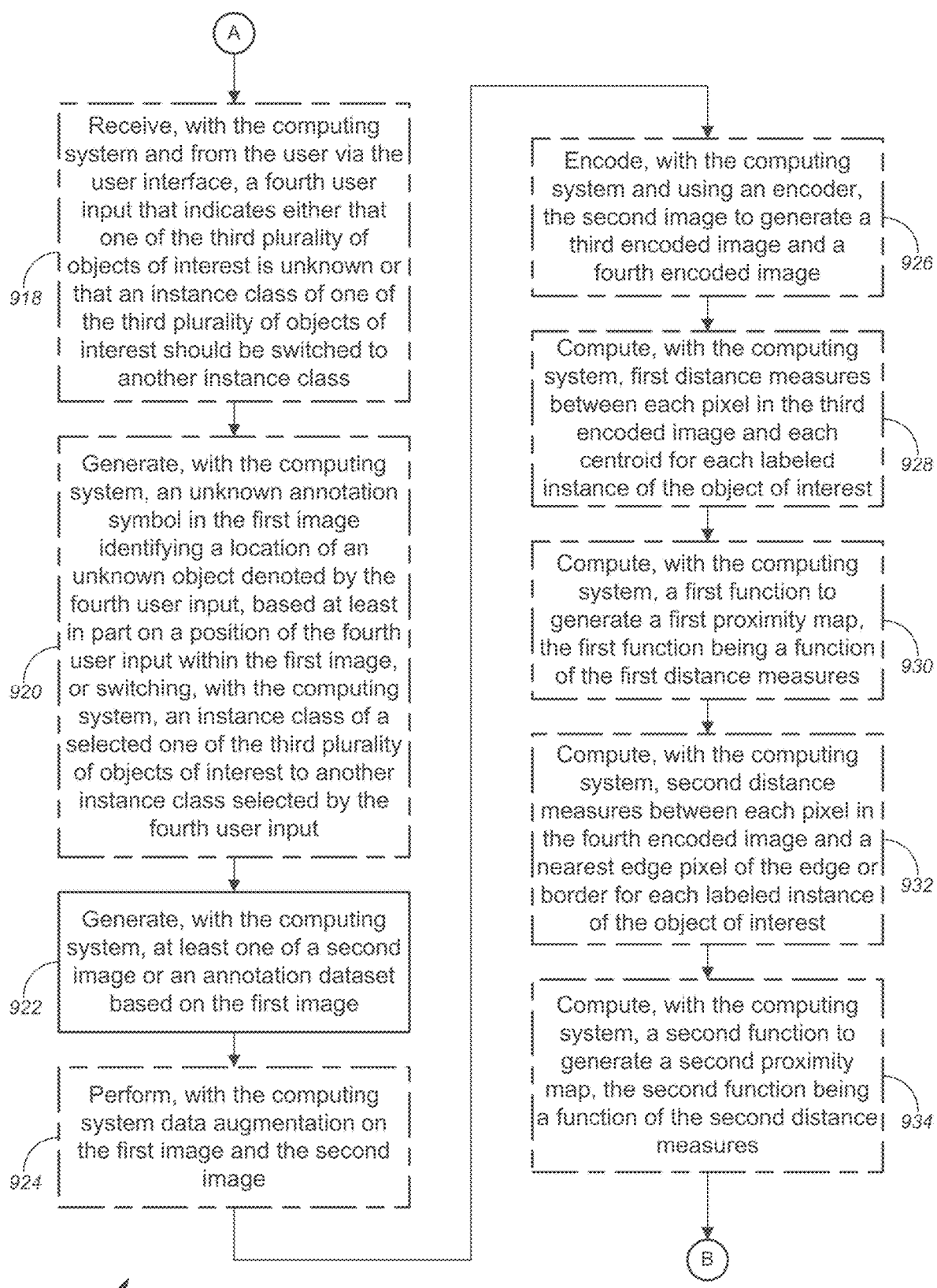
Figure 9D:
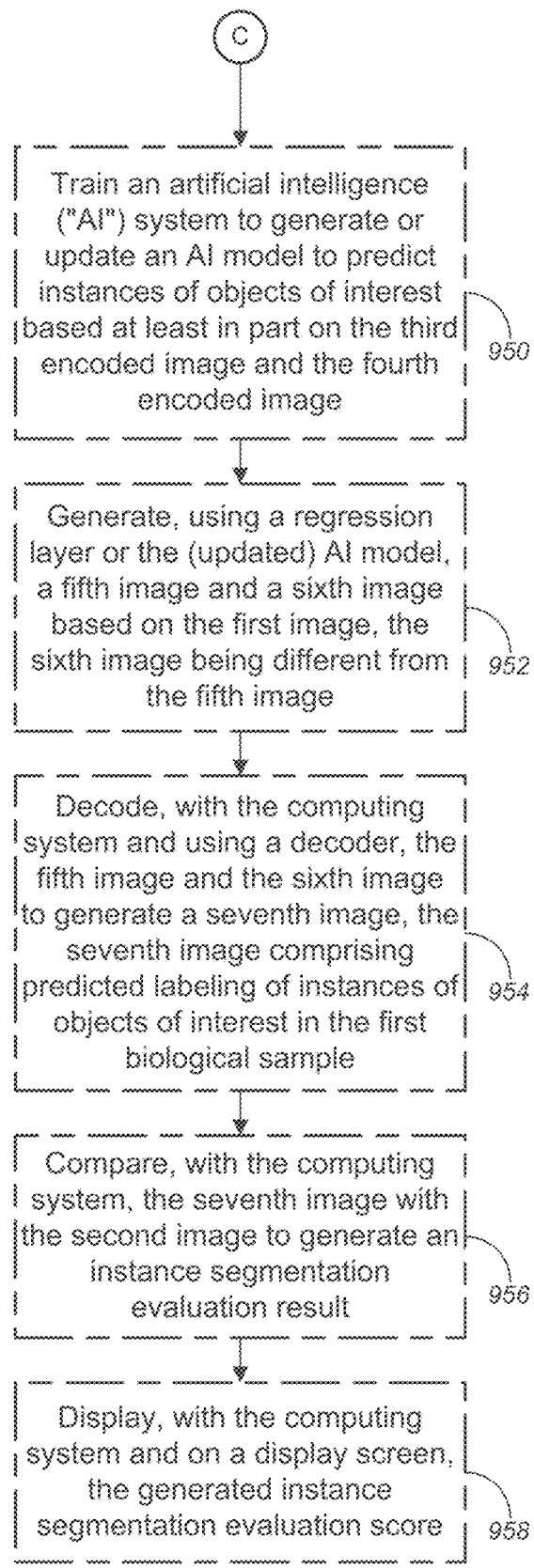

At optional block 918 in FIG. 9B (following the circular marker denoted, "A"), method 900 might comprise receiving, with the computing system and from the user via the user interface, a fourth user input that indicates either that one of the third plurality of objects of interest is unknown or that an instance class of one of the third plurality of objects of interest should be switched to another instance class (e.g., cancer, benign, etc.). Method 900 might further comprise, at optional block 920, generating, with the computing system, an unknown annotation symbol (i.e., a symbol or annotation denoting an unknown instance or object, etc.) in the first image identifying a location of an unknown object denoted by the fourth user input, based at least in part on a position of the fourth user input within the first image, or might switch an instance class of a selected one of the third plurality of objects of interest to another instance class selected by the fourth user input (e.g., switching between cancer and benign, switching between fully annotated to partially annotated, switching between partially annotated to unknown annotated, switching between fully annotated to unknown annotated, or the like).

According to some embodiments, the first user input might include, without limitation, one of a click input or a bounding region input. In some cases, the click input might define a location of a centroid of one first object among the first plurality of objects of interest identified by the click input, while the bounding region input might define an area within the first image that marks an outer limit of a border of one second object among the first plurality of objects of interest identified by the bounding region input. In some instances, the bounding region input might include, but is not limited to, one of a rectangular bounding region input, a circular bounding region input, a polygon placement input, or a line placement input, and/or the like. In some embodiments, the second user input might include, without limitation, a click and drag input. In some cases, the third user input might include, but is not limited to, a double-click input, where the third user input one of selection or deselection of a border around the one of the second plurality of objects of interest. In some instances, the fourth user input might include, without limitation, one of a shift plus mouse click input or a key plus mouse click input, where the fourth user input might include, but is not limited to, one of a toggling between full annotation and unknown annotation or a switch between instance classes from a list of instance classes, or the like. The various embodiments are not limited to these particular inputs, however, and these inputs can be any suitable inputs for indicating a full annotation, a partial annotation, and/or an unknown annotation, or the like.

At block 922, method 900 might comprise generating, with the computing system, at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

At optional block 924, method 900 might comprise performing, with the computing system, data augmentation on the first image and the second image. In some cases, data augmentation of the first image and the second image might include, without limitation, at least one of elastic augmentation or color augmentation (in some cases, configured to facilitate instance segmentation), and/or the like. Method 900 might further comprise, at optional block 926, encoding, with the computing system and using an encoder, the second image to generate a third encoded image and a fourth encoded image, the fourth encoded image being different from the third encoded image. In some cases, the third encoded image might contain the first user input for each of the first plurality of objects of interest, while the fourth encoded image might contain the second user input for each of the second plurality of objects of interest.

Method 900 might further comprise computing, with the computing system, first distance measures between each pixel in the third encoded image and each centroid for each labeled instance of the object of interest (optional block 928); computing, with the computing system, a first function to generate a first proximity map, the first function being a function of the first distance measures, the third encoded image comprising the first proximity map (optional block 930); computing, with the computing system, second distance measures between each pixel in the fourth encoded image and a nearest edge pixel of the edge or border for each labeled instance of the object of interest (optional block 932); and computing, with the computing system, a second function to generate a second proximity map, the second function being a function of the second distance measures, the fourth encoded image comprising the second proximity map (optional block 934). Method 900 might continue onto the process at optional block 939 in FIG. 9C following the circular marker denoted, "B."

According to some embodiments, labeling of instances of objects of interest in the second image might include, but is not limited to, at least one of full annotation of first instances of objects of interest that identify centroid and edge of the first instances of objects of interest, partial annotation of second instances of objects of interest that identify only centroid of the second instances of objects of interest, or unknown annotation of third instances of objects of interest that identify neither centroid nor edge, and/or the like. At optional block 936 in FIG. 9C (following the circular marker denoted, "B"), method 900 might comprise masking, with the computing system, the second instances of objects of interest with partial annotation in the fourth encoded image and corresponding pixels in the sixth image, without masking the second instances of objects of interest with partial annotation in the third encoded image or in the fifth image, and masking, with the computing system, the third instances of objects of interest with unknown annotation in the third encoded image and corresponding pixels in the fifth image and in the fourth encoded image and corresponding pixels in the sixth image. Method 900 might further comprise assigning, with the computing system, a first weighted pixel value for each pixel in the third encoded image, based at least in part on the computed first distance measures for each pixel, the first function, or the first proximity map (optional block 938); and assigning, with the computing system, a second weighted pixel value for each pixel in the fourth encoded image, based at least in part on at least one of the computed second distance measures for each pixel, the second function, or the second proximity map (optional block 940). Method 900 might further comprise determining, with the computing system, a first pixel loss value between each pixel in the third encoded image and a corresponding pixel in the fifth image (optional block 942); determining, with the computing system, a second pixel loss value between each pixel in the fourth encoded image and a corresponding pixel in the sixth image (optional block 944); and calculating, with the computing system, a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image (optional block 946). In some cases, the loss function might include, but is not limited to, one of a mean squared error loss function, a mean squared logarithmic error loss function, a mean absolute error loss function, a Huber loss function, or a weighted sum of squared differences loss function, and/or the like. Method 900, at optional block 948, might comprise updating, with the AI system, the AI model, by updating one or more parameters of the AI model based on the calculated loss value. Method 900 might return to the process at block 950 in FIG. 9D following the circular marker denoted, "C."

At optional block 950 (following the circular marker denoted, "C"), method 900 might comprise training an artificial intelligence ("AI") system to generate or update an AI model to predict instances of objects of interest based at least in part on the third encoded image and the fourth encoded image. Method 900 might further comprise generating, using a regression layer of the AI system or the (updated) AI model, a fifth image and a sixth image based on the first image, the sixth image being different from the fifth image (optional block 952); decoding, with the computing system and using a decoder, the fifth image and the sixth image to generate a seventh image, the seventh image comprising predicted labeling of instances of objects of interest in the first biological sample (optional block 954); comparing, with the computing system, the seventh image with the second image to generate an instance segmentation evaluation result (optional block 956); and displaying, with the computing system on a display screen, the generated instance segmentation evaluation result (optional block 958). According to some embodiments, generating the instance segmentation evaluation result (at block 956) might comprise evaluating instance segmentation performances using one or more metrics, which might include, without limitation, at least one of aggregated Jaccard index ("AJI") metrics, F1 metrics, dice metrics, average dice metrics, or joint-dice metrics, and/or the like. In some cases, the instance segmentation evaluation result might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like.

Exemplary System and Hardware Implementation

Figure 10:
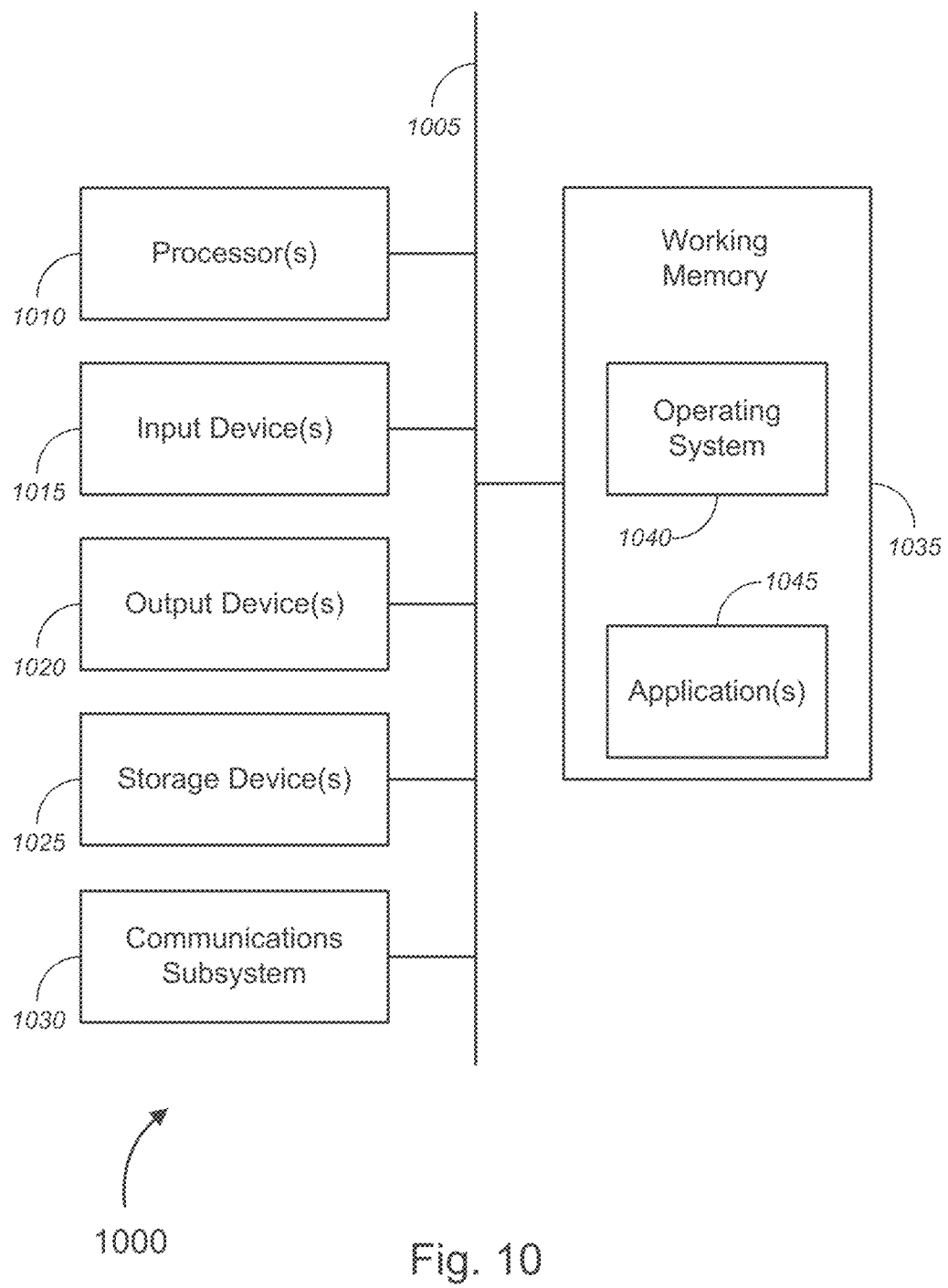
FIG. 10 is a block diagram illustrating an exemplary computer or system hardware architecture, in accordance with various embodiments.

FIG. 10 is a block diagram illustrating an exemplary computer or system hardware architecture, in accordance with various embodiments. FIG. 10 provides a schematic illustration of one embodiment of a computer system 1000 of the service provider system hardware that can perform the methods provided by various other embodiments, as described herein, and/or can perform the functions of computer or hardware system (i.e., computing systems 105*a*, 105*b*, 205, and 205', artificial intelligence ("AI") systems 110*a* and 110*b*, display device 120, user device(s) 130, encoder 210, U-Net system or architecture 215, loss function system 220, decoder 225, accuracy evaluation system 230, and data augmentation system 235, etc.), as described above. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer or hardware system 1000—which might represent an embodiment of the computer or hardware system (i.e., computing systems 105*a*, 105*b*, 205, and 205', AI systems 110*a* and 110*b*, display device 120, user device(s) 130, encoder 210, U-Net system or architecture 215, loss function system 220, decoder 225, accuracy evaluation system 230, and data augmentation system 235, etc.), described above with respect to FIGS. 1-9—is shown comprising hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as microprocessors, digital signal processing chips, graphics acceleration processors, and/or the like); one or more input devices 1015, which can include, without limitation, a mouse, a keyboard, and/or the like; and one or more output devices 1020, which can include, without limitation, a display device, a printer, and/or the like.

The computer or hardware system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1000 might also include a communications subsystem 1030, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer or hardware systems, and/or with any other devices described herein. In many embodiments, the computer or hardware system 1000 will further comprise a working memory 1035, which can include a RAM or ROM device, as described above.

The computer or hardware system 1000 also may comprise software elements, shown as being currently located within the working memory 1035, including an operating system 1040, device drivers, executable libraries, and/or other code, such as one or more application programs 1045, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1000 and/or might take the form of source and/or installable code, which, upon compilation and/or installation on the computer or hardware system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1000) to perform methods in accordance with various embodiments of the invention. According to a set of embodiments, some or all of the procedures of such methods are performed by the computer or hardware system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1000, various computer readable media might be involved in providing instructions/code to processor(s) 1010 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1025. Volatile media includes, without limitation, dynamic memory, such as the working memory 1035. In some alternative embodiments, a computer readable medium may take the form of transmission media, which includes, without limitation, coaxial cables, copper wire, and fiber optics, including the wires that comprise the bus 1005, as well as the various components of the communication subsystem 1030 (and/or the media by which the communications subsystem 1030 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1000. These signals, which might be in the form of electromagnetic signals, acoustic signals, optical signals, and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

Figure 11:
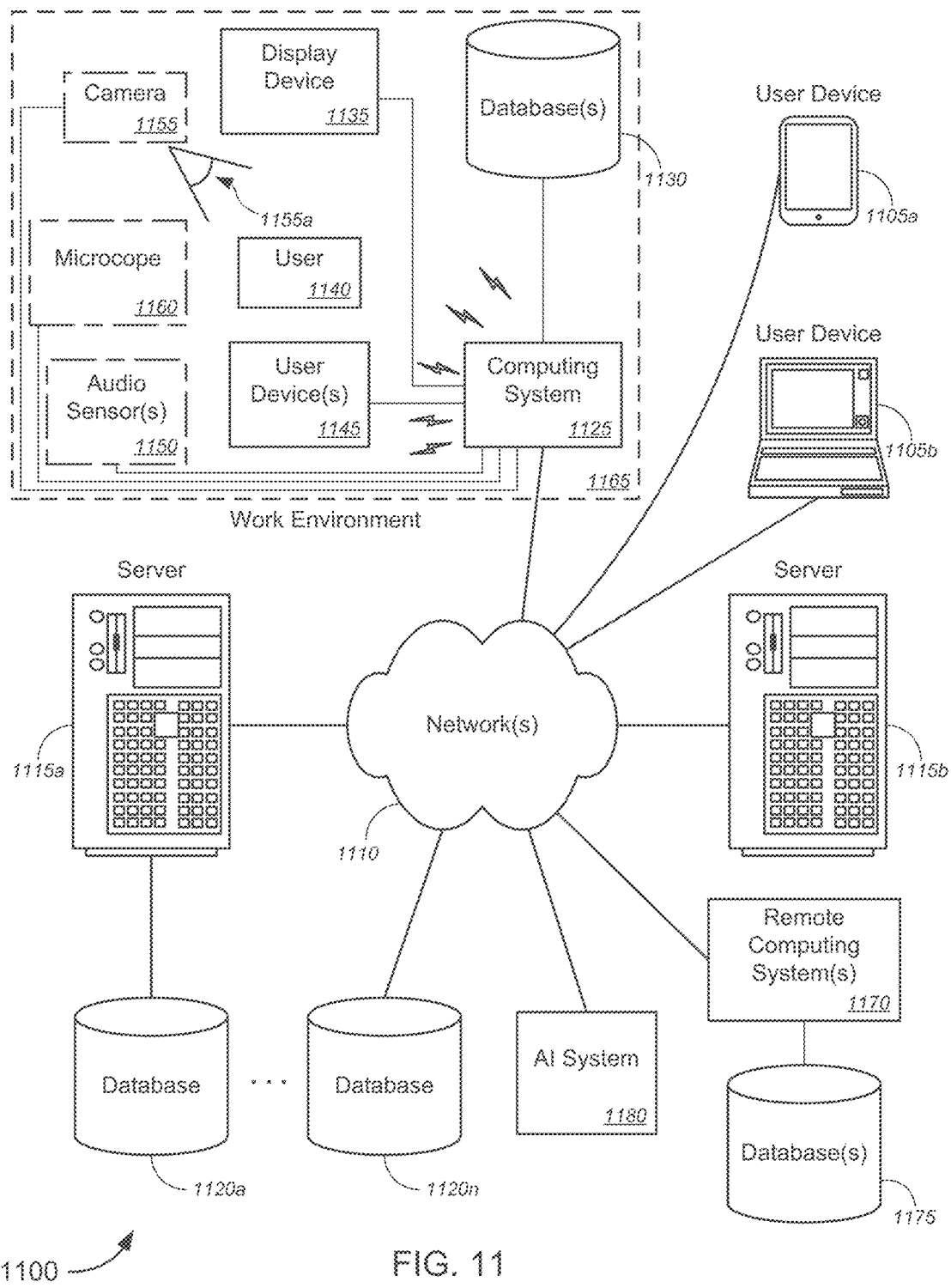
FIG. 11 is a block diagram illustrating a networked system of computers, computing systems, or system hardware architecture, which can be used in accordance with various embodiments.

As noted above, a set of embodiments comprises methods and systems for implementing digital microscopy imaging, and, more particularly, to methods, systems, and apparatuses for implementing digital microscopy imaging using deep learning-based segmentation, implementing instance segmentation based on partial annotations, and/or implementing user interface configured to facilitate user annotation for instance segmentation within biological samples. FIG. 11 illustrates a schematic diagram of a system 1100 that can be used in accordance with one set of embodiments. The system 1100 can include one or more user computers, user devices, or customer devices 1105. A user computer, user device, or customer device 1105 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1105 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1105 can be any other electronic device, such as a thin-client computer, Internet-enabled mobile telephone, and/or personal digital assistant, capable of communicating via a network (e.g., the network(s) 1110 described below) and/or of displaying and navigating web pages or other types of electronic documents. Although the exemplary system 1100 is shown with two user computers, user devices, or customer devices 1105, any number of user computers, user devices, or customer devices can be supported.

Certain embodiments operate in a networked environment, which can include a network(s) 1110. The network(s) 1110 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1110 (similar to network(s) 155 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1115. Each of the server computers 1115 may be configured with an operating system, including, without limitation, any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 might be a data server, a web server, a cloud computing device(s), or the like, as described above. The data server might include (or be in communication with) a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1105 and/or another server 1115. In some embodiments, an application server can perform one or more of the processes for implementing digital microscopy imaging, and, more particularly, to methods, systems, and apparatuses for implementing digital microscopy imaging using deep learning-based segmentation, implementing instance segmentation based on partial annotations, and/or implementing user interface configured to facilitate user annotation for instance segmentation within biological samples, as described in detail above. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases, a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer, user device, or customer device 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120a-1120n (collectively, "databases 1120"). The location of each of the databases 1120 is discretionary: merely by way of example, a database 1120a might reside on a storage medium local to (and/or resident in) a server 1115a (and/or a user computer, user device, or customer device 1105). Alternatively, a database 1120n can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1120 can be a relational database, such as an Oracle database, that is adapted to store, update, and retrieve data in response to SQL-formatted commands. The database might be controlled and/or maintained by a database server, as described above, for example.

According to some embodiments, system 1100 might further comprise a computing system 1125 (similar to computing systems 105*a* of FIG. 1, or the like) and corresponding database(s) 1130 (similar to database(s) 110*a* of FIG. 1, or the like). System 1100 might further comprise a display device 1135 (similar to display device 120 of FIG. 1, or the like) that are used to allow a user 1140 to look at an optical view of a first biological sample (e.g., as shown in the user interfaces of FIGS. 3A-3E, or the like) that is displayed on the display device 1135. The user 1140 might use one or more user devices 1145 (similar to user device(s) 130 of FIG. 1, or the like; including, without limitation, smart phones, mobile phones, tablet computers, laptop computers, desktop computers, keyboards, keypads, computer mice, or monitors, and/or the like). In some embodiments, system 1100 might further comprise one or more audio sensors 1150 (optional; similar to audio sensor(s) 135 of FIG. 1, or the like; including, but not limited to, one or more microphones, one or more voice recorders, or one or more audio recorders, and/or the like), a camera 1155 (optional; similar to camera 140 of FIG. 1, or the like; including, without limitation, one or more eye tracking sensors, one or more motion sensors, or one or more tracking sensors, and/or the like), and a microscope 1160 (optional; similar to microscopes 145 of FIG. 1, or the like). In some cases, the audio sensors 1150 might be used to record vocal or spoken annotations by the user 1140 while the user is viewing the FOV of the first biological sample either on the display device 1135 or through an eyepiece(s) of the microscope 1160. The camera 1155 might capture images of the user 1140 (in some cases, capturing images of at least one eye of the user 1140) while the user 1140 is within the field of view ("FOV") 1155*a* of camera 1155, as the user is viewing the FOV of the first biological sample either on the display device 1135 or through an eyepiece(s) of the microscope 1160. In some instances, two or more of computing system 1125, database(s) 1130, display device 1135, user device(s) 1145, audio sensor(s) 1150 (optional), camera 1155 (optional), and/or microscope 1160 (optional) might be disposed in work environment 1165, which might include, but is not limited to, at least one of a laboratory, a clinic, a medical facility, a research facility, a healthcare facility, or a room, and/or the like.

Alternative, or additional, to computing system 1125 and corresponding database(s) 1130, system 1100 might further comprise remote computing system 1170 (similar to remote computing system 105*b* of FIG. 1, or the like) and corresponding database(s) 1175 (similar to database(s) 110*b* of FIG. 1, or the like). In some embodiments, system 1100 might further comprise artificial intelligence ("AI") system 1180. In some embodiments, computing system 1125 and/or 1170 might include, without limitation, one of a computing system disposed in a work environment, a remote computing system disposed external to the work environment and accessible over a network, a web server, a web browser, or a cloud computing system, and/or the like. According to some embodiments, the AI system 1180 might include, but is not limited to, at least one of a machine learning system, a deep learning system, a neural network, a convolutional neural network ("CNN"), or a fully convolutional network ("FCN"), and/or the like.

In operation, computing system 1125, remote computing system(s) 1170, and/or AI system 1180 (collectively, "computing system" or the like) might perform data augmentation on a first image and on a second image (optional), the first image comprising a field of view ("FOV") of a first biological sample, and the second image comprising labeling of instances of objects of interest in the first biological sample. In some cases, the first biological sample might include, without limitation, one of a human tissue sample, an animal tissue sample, or a plant tissue sample, and/or the like, where the objects of interest might include, but is not limited to, at least one of normal cells, abnormal cells, damaged cells, cancer cells, tumors, subcellular structures, or organ structures, and/or the like. In some embodiments, data augmentation of the first image and the second image might include, but is not limited to, at least one of elastic augmentation or color augmentation, and/or the like (in some cases, configured to facilitate instance segmentation).

The computing system might receive the (augmented) first image and the (augmented) second image. The computing system might train the AI system 1180 to generate or update an AI model to predict instances of objects of interest based at least in part on a plurality of sets of at least two images that are generated based on the second image, each of the at least two images among the plurality of sets of at least two images being different from each other. In some embodiments, the at least two images might include, but are not limited to, at least a centroid layer image highlighting a centroid for each labeled instance of an object of interest in the second image and a border layer image highlighting an edge or border for each labeled instance of the object of interest in the second image. Alternatively, the at least two images might include, without limitation, at least a centroid layer image highlighting a centroid for each labeled instance of an object of interest in the second image, a border layer image highlighting an edge or border for each labeled instance of the object of interest in the second image, and a semantic segmentation layer image comprising semantic segmentation data for each labeled instance of the object of interest in the second image. In other alternative embodiments, the at least two images might include any number of images or surfaces highlighting different aspects of instances of objects of interest in the first biological sample.

In some embodiments, as part of the training of the AI system to generate or update the AI model to predict instances of objects of interest based at least in part on the plurality of sets of at least two images that are generated based on the second image, or the like, the computing system might encode, using an encoder (which either may be part of the software and/or hardware of the computing system or may be a separate device (in some cases, a dedicated encoder, or the like) in communication with the computing system, or the like), the (augmented) second image to generate a third encoded image and a fourth encoded image, the fourth encoded image being different from the third encoded image. In some embodiments, encoding the second image to generate the third encoded image might comprise computing, with the computing system, a centroid for each labeled instance of an object of interest in the second image; and generating, with the computing system, the third encoded image, the third encoded image comprising highlighting of the centroid for each labeled instance of an object of interest. In some instances, encoding the second image to generate the fourth encoded image might comprise computing, with the computing system, an edge or border for each labeled instance of an object of interest in the second image; and generating, with the computing system, the fourth encoded image, the fourth encoded image comprising highlighting of the edge or border for each labeled instance of the object of interest.

According to some embodiments, encoding the second image to generate the third encoded image might further comprise the computing system computing: first distance measures between each pixel in the third encoded image and each centroid for each labeled instance of the object of interest; and a first function to generate a first proximity map, the first function being a function of the first distance measures, the third encoded image comprising the first proximity map. Likewise, encoding the second image to generate the fourth encoded image might further comprise the computing system computing: second distance measures between each pixel in the fourth encoded image and a nearest edge pixel of the edge or border for each labeled instance of the object of interest; and a second function to generate a second proximity map, the second function being a function of the second distance measures, the fourth encoded image comprising the second proximity map. In some cases, the computing system might assign a first weighted pixel value for each pixel in the third encoded image, based at least in part on at least one of the computed first distance measures for each pixel, the first function, or the first proximity map; and might assign a second weighted pixel value for each pixel in the fourth encoded image, based at least in part on at least one of the computed second distance measures for each pixel, the second function, or the second proximity map.

In some embodiments, the computing system might determine a first pixel loss value between each pixel in the third encoded image and a corresponding pixel in the fifth image; and might determine a second pixel loss value between each pixel in the fourth encoded image and a corresponding pixel in the sixth image. The computing system might calculate a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image. In some instances, the loss function might include, without limitation, one of a mean squared error loss function, a mean squared logarithmic error loss function, a mean absolute error loss function, a Huber loss function, or a weighted sum of squared differences loss function, and/or the like.

In some embodiments, the AI system might update the AI model, by updating one or more parameters of the AI model based on the calculated loss value. In some cases, the one or more parameters might include, but are not limited to, a single parameter, a number of parameters between two and a hundred (inclusively), a number of parameters between a hundred and a thousand (inclusively), a number of parameters between a thousand and a million (inclusively), or more. The computing system might generate, using the updated AI model, a fifth image and a sixth image, based on the first image.

In some instances, labeling of instances of objects of interest in the second image might include, without limitation, at least one of full annotation of first instances of objects of interest that identify centroid and edge of the first instances of objects of interest, partial annotation of second instances of objects of interest that identify only centroid of the second instances of objects of interest, or unknown annotation of third instances of objects of interest that identify neither centroid nor edge (i.e., are otherwise denoted as being unknown), and/or the like. In some embodiments, the computing system might mask the second instances of objects of interest with partial annotation in the fourth encoded image and corresponding pixels in the sixth image, without masking the second instances of objects of interest with partial annotation in the third encoded image or in the fifth image, prior to calculating the loss value, and might mask the third instances of objects of interest with unknown annotation in the third encoded image and corresponding pixels in the fifth image and in the fourth encoded image and corresponding pixels in the sixth image, prior to calculating the loss value. In some cases, for partial annotation or for unknown annotation, masking the at least a portion of the second instance or the third of objects of interest might comprise masking out a circle in the third encoded image and/or the fourth encoded image, the circle representing the distance from the centroid or from a point within the partially annotated object denoted by user input (e.g., mouse click or the like). In some instances, the circle radius either might be pre-defined or might be calculated "on-the-fly" according to information from the full annotation of objects in the same area. Although a circular mask is described, other polygonal or geometrical shapes may be used as necessary or as desired. Alternatively, masking might comprise changing the weight of particular pixels in the third encoded image and corresponding pixels in the fifth image (or particular pixels in the fourth encoded image and corresponding pixels in the sixth image) to be the same value so that they cancel each other out when compared pixel-by-pixel.

The computing system might decode, using a decoder (which either may be part of the software and/or hardware of the computing system or may be a separate device (in some cases, a dedicated decoder, or the like) in communication with the computing system, or the like), the fifth image and the sixth image to generate a seventh image, the seventh image comprising predicted labeling of instances of objects of interest in the first biological sample, in some cases, by applying at least one of one or more morphological operations to identify foreground and background markers in each of the fifth image and the sixth image prior to generating the seventh image or one or more machine learning operations to directly decode the fifth image and the sixth image to generate the seventh image. In some instances, applying the at least one of the one or more morphological operations or the one or more machine learning operations might comprise applying the one or more morphological operations, where after decoding the fifth image and the sixth image by applying the one or more morphological operations to identify foreground and background markers in each of the fifth image and the sixth image, the computing system might apply a watershed algorithm to generate the seventh image. In some cases, the one or more morphological operations might include, but is not limited to, at least one of an open-with-reconstruction transform or a regional H-minima transform, and/or the like.

According to some embodiments, the computing system might compare the seventh image with the second image to generate an instance segmentation evaluation result. In some instances, generating the instance segmentation evaluation result might comprise evaluating instance segmentation performances using one or more metrics, which might include, without limitation, at least one of aggregated Jaccard index ("AJI") metrics, F1 metrics, dice metrics, average dice metrics, or joint-dice metrics, and/or the like. In some cases, the instance segmentation evaluation result might include, without limitation, at least one of an instance segmentation evaluation metric, an instance segmentation evaluation score in the form of one or more numerical values, or an instance segmentation classification (including, but not limited to, true positive ("TP"), true negative ("TN"), false positive ("FP"), false negative ("FN"), over-segmentation, or under-segmentation, or the like), and/or the like. The computing system might display, on a display screen, the generated instance segmentation evaluation result.

In some cases, training the AI system to generate or update an AI model to predict instances of objects of interest based at least in part on a plurality of sets of at least two images that are generated based on the second image might include at least the encoding of the second image to generate the third encoded image and the fourth encoded image, the training of the AI system to generate or update the AI model to predict instances of objects of interest based at least in part on the third encoded image and the fourth encoded image, the generation of the fifth image and the sixth image, the decoding of the fifth image and the sixth image to generate the seventh image, and the comparison of the seventh image with the second image, or the like. Although two images (in this case, the third encoded image and the fourth encoded image) are used for training the AI system, the various embodiments are not so limited, and more than two images (or surfaces) may be used.

According to some embodiments, the computing system might receive an eighth image, the eighth image comprising a FOV of a second biological sample different from the first biological sample; might generate, using the AI model that is generated or updated by the trained AI system, two or more images based on the eighth image, the two or more images being different from each other; and might decode, using the decoder, the two or more images to generate a ninth image, the ninth image comprising predicted labeling of instances of objects of interest in the second biological sample. In this manner, the trained AI system and/or the AI model may be used to predict labeling of instances of objects of interest in new biological samples—in some cases, where there is no ground truth image (or prior user-annotated image) corresponding to the new biological samples.

Alternatively, or additionally, the computing system might generate a user interface configured to collect training data using at least one of full annotation or partial annotation of objects of interest within images of biological samples, and might display, within a display portion of the user interface, the first image comprising the FOV of the first biological sample. The computing system might receive, from a user (e.g., a pathologist, a clinician, a doctor, a nurse, or a laboratory technician, etc.) via the user interface, a first user input that indicates a presence or location of each of a first plurality of objects of interest contained within the first image displayed in the display portion of the user interface. The computing system might generate a border around each of the first plurality of objects of interest, based at least in part on a location for each of the first plurality of objects within the first image identified by the first user input and based at least in part on analysis of pixels in or around the corresponding location using an algorithm (which might include, but is not limited to, an object detection algorithm, a pixel identification algorithm, an edge detection algorithm, and/or the like).

In some instances, the computing system might receive, from the user via the user interface, a second user input that indicates movement of a point within one of the first plurality of objects of interest from a previous position to a new position within the first image, and might generate a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest. In some cases, the computing system might receive, from the user via the user interface, a third user input that indicates partial annotation of one of a second plurality of objects of interest contained within the first image displayed in the display portion of the user interface, and might generate a partial annotation symbol in the first image identifying a location of a centroid without a border for the one of the second plurality of objects of interest, based at least in part on a position of the third user input within the first image. In some instances, the computing system might receive, from the user via the user interface, a fourth user input that indicates either that one of the third plurality of objects of interest is unknown or that an instance class of one of the third plurality of objects of interest should be switched to another instance class (e.g., cancer, benign, etc.), and might generate an unknown annotation symbol (i.e., a symbol or annotation denoting an unknown instance or object, etc.) in the first image identifying a location of an unknown object denoted by the fourth user input, based at least in part on a position of the fourth user input within the first image, or might switch an instance class of a selected one of the third plurality of objects of interest to another instance class selected by the fourth user input (e.g., switching between cancer and benign, switching between fully annotated to partially annotated, switching between partially annotated to unknown annotated, switching between fully annotated to unknown annotated, or the like).

According to some embodiments, the first user input might include, without limitation, one of a click input or a bounding region input. In some cases, the click input might define a location of a centroid of one first object among the first plurality of objects of interest identified by the click input, while the bounding region input might define an area within the first image that marks an outer limit of a border of one second object among the first plurality of objects of interest identified by the bounding region input. In some instances, the bounding region input might include, but is not limited to, one of a rectangular bounding region input, a circular bounding region input, a polygon placement input, or a line placement input, and/or the like. In some embodiments, the second user input might include, without limitation, a click and drag input. In some cases, the third user input might include, but is not limited to, a double-click input, where the third user input one of selection or deselection of a border around the one of the second plurality of objects of interest. In some instances, the fourth user input might include, without limitation, one of a shift plus mouse click input or a key plus mouse click input, where the fourth user input might include, but is not limited to, one of a toggling between full annotation and unknown annotation or a switch between instance classes from a list of instance classes, or the like. The various embodiments are not limited to these particular inputs, however, and these inputs can be any suitable inputs for indicating a full annotation, a partial annotation, and/or an unknown annotation, or the like.

The computing system might generate at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input. In this manner, the system provides a quick and efficient UI that allows the user (or annotator) to generate annotation in an efficient manner. In particular, there is no need for the user to open any menus or to follow a complex set of operations to interact with the UI for the annotation system. With a single operation (i.e., with a click input or a bounding region input, or the like), a full annotation can be generated (i.e., generation of a border around the location marked by the click input or the bounding region input, or the like). To change the auto-generated border, the user need only use a single operation (i.e., with a click drag input, or the like) to move a point within the instance or object, to cause the system to redraw or re-generate a new border around the instance or object. As such, the user need not waste time manually drawing around an edge or border of the instance or object, to obtain full annotation. Similarly, with a single operation (i.e., a shift plus mouse click input, a key plus mouse click input, or a mouse/keyboard combination, or the like), a full annotation can be changed to a partial annotation, or a class of an instance or object can be changed. The operation is not bound to specific mouse/keyboard operations; rather, any combination may be used or customized as appropriate or as desired.

In some embodiments, the computing system might train the AI system 1180 to generate or update the AI model to predict instances of objects of interest in the first biological sample based at least in part on a plurality of sets of at least two images that are generated based on the at least one of the second image or the annotation dataset, each of the at least two images among the plurality of sets of at least two images being different from each other. In some cases, training the AI system to generate or update the AI model to predict instances of objects of interest based at least in part on the at least two images might comprise: encoding, with the computing system and using an encoder (which either may be part of the software and/or hardware of the computing system or may be a separate device (in some cases, a dedicated encoder, or the like) in communication with the computing system, or the like), the at least one of the second image or the annotation dataset to generate a third encoded image and a fourth encoded image, the fourth encoded image being different from the third encoded image; training the AI system to generate or update the AI model to predict instances of objects of interest based at least in part on the third encoded image and the fourth encoded image; generating, using the AI model that is generated or updated by the AI system, a fifth image and a sixth image based on the first image and based on the training, the sixth image being different from the fifth image; decoding, with the computing system and using a decoder (which either may be part of the software and/or hardware of the computing system or may be a separate device (in some cases, a dedicated decoder, or the like) in communication with the computing system, or the like), the fifth image and the sixth image to generate a seventh image, the seventh image comprising predicted labeling of instances of objects of interest in the first biological sample; and (optionally) comparing, with the computing system, the seventh image with the second image to generate an instance segmentation evaluation result. Encoding of the second image and the training of the AI system 1180 may also be implemented as described above with respect to FIG. 9B, or the like.

These and other functions of the system 1100 (and its components) are described in greater detail above with respect to FIGS. 1-9.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

generating, with a computing system, a user interface configured to collect training data using at least one of full annotation or partial annotation of objects of interest within images of biological samples;

displaying, with the computing system and within a display portion of the user interface, a first image comprising a field of view ("FOV") of a first biological sample;

receiving, with the computing system and from a user via the user interface, a first user input that indicates a presence or location of each of a first plurality of objects of interest contained within the first image displayed in the display portion of the user interface;

generating, with the computing system, a border around each of the first plurality of objects of interest, based at least in part on a location for each of the first plurality of objects within the first image identified by the first user input and based at least in part on analysis of pixels in or around the corresponding location using an algorithm; and generating, with the computing system, at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

2. The method of claim 1, wherein the computing system comprises one of a computing system disposed in a work environment, a remote computing system disposed external to the work environment and accessible over a network, a web server, a web browser, or a cloud computing system, wherein the work environment comprises at least one of a laboratory, a clinic, a medical facility, a research facility, a healthcare facility, or a room.

3. The method of claim 1, wherein the first biological sample comprises one of a human tissue sample, an animal tissue sample, or a plant tissue sample, wherein the objects of interest comprise at least one of normal cells, abnormal cells, damaged cells, cancer cells, tumors, subcellular structures, or organ structures.

4. The method of claim 1, further comprising:
receiving, with the computing system and from the user via the user interface, a second user input that indicates movement of a point within one of the first plurality of objects of interest from a previous position to a new position within the first image; and
generating, with the computing system, a new border around the one of the first plurality of objects of interest contained within the first image displayed in the display portion of the user interface, based at least in part on the new position of the point within the one of the first plurality of objects of interest within the first image denoted by the second user input and based at least in part on analysis of pixels in or around the new position of the point within the one of the first plurality of objects of interest using the algorithm, the new border replacing the previously generated border around the one of the first plurality of objects of interest.

5. The method of claim 4, further comprising:
receiving, with the computing system and from the user via the user interface, a third user input that indicates partial annotation of one of a second plurality of objects of interest contained within the first image displayed in the display portion of the user interface; and
generating, with the computing system, a partial annotation symbol in the first image identifying a location of a centroid without a border for the one of the second plurality of objects of interest, based at least in part on a position of the third user input within the first image.

6. The method of claim 5, further comprising:
receiving, with the computing system and from the user via the user interface, a fourth user input that indicates either that one of the third plurality of objects of interest is unknown or that an instance class of one of the third plurality of objects of interest should be switched to another instance class; and
generating, with the computing system, an unknown annotation symbol in the first image identifying a location of an unknown object denoted by the fourth user input, based at least in part on a position of the fourth user input within the first image, or switching, with the computing system, an instance class of a selected one of the third plurality of objects of interest to another instance class selected by the fourth user input.

7. The method of claim 6, wherein the first user input comprises one of a click input or a bounding region input, wherein the click input defines a location of a centroid of one first object among the first plurality of objects of interest identified by the click input, wherein the bounding region input defines an area within the first image that marks an outer limit of a border of one second object among the first plurality of objects of interest identified by the bounding region input, wherein the bounding region input comprises one of a rectangular bounding region input, a circular bounding region input, a polygon placement input, or a line placement input, wherein the second user input comprises a click and drag input, wherein the third user input comprises a double click input, wherein the third user input comprises one of selection or deselection of a border around the one of the second plurality of objects of interest, wherein the fourth user input comprises one of a shift plus mouse click input or a key plus mouse click input, wherein the fourth user input comprises one of a toggling between full annotation and unknown annotation or a switch between instance classes from a list of instance classes.

8. The method of claim 1, further comprising:
training an artificial intelligence ("AI") system to generate or update an AI model to predict instances of objects of interest in the first biological sample based at least in part on a plurality of sets of at least two images that are generated based on the at least one of the second image or the annotation dataset, each of the at least two images among the plurality of sets of at least two images being different from each other, wherein training the AI system to generate or update the AI model to predict instances of objects of interest based at least in part on the plurality of sets of at least two images comprises:
encoding, with the computing system and using an encoder, the at least one of the second image or the annotation dataset to generate a third encoded image and a fourth encoded image, the fourth encoded image being different from the third encoded image;
training the AI system to generate or update the AI model to predict instances of objects of interest based at least in part on the third encoded image and the fourth encoded image;
generating, using the AI model that is generated or updated by the AI system, a fifth image and a sixth image based on the first image, the sixth image being different from the fifth image; and
decoding, with the computing system and using a decoder, the fifth image and the sixth image to generate a seventh image, the seventh image comprising predicted labeling of instances of objects of interest in the first biological sample.

9. The method of claim 8, wherein the AI system comprises at least one of a machine learning system, a deep learning system, a neural network, a convolutional neural network ("CNN"), or a fully convolutional network ("FCN").

10. The method of claim 8, wherein training the AI system to generate or update the AI model to predict instances of objects of interest based at least in part on the plurality of sets of at least two images further comprises:
comparing, with the computing system, the seventh image with the second image to generate an instance segmentation evaluation result.

11. The method of claim 8, wherein the third encoded image contains a centroid for each of the first plurality of objects of interest based on the first user input, wherein the fourth encoded image contains the generated border for each of the first plurality of objects of interest.

12. The method of claim 11, wherein:
encoding the second image to generate the third encoded image comprises:
computing, with the computing system, first distance measures between each pixel in the third encoded image and each centroid for each of the first plurality of objects of interest; and
computing, with the computing system, a first function to generate a first proximity map, the first function being a function of the first distance measures, the third encoded image comprising the first proximity map; and
encoding the second image to generate the fourth encoded image comprises:
computing, with the computing system, second distance measures between each pixel in the fourth encoded image and a nearest edge pixel of the edge or border for each of the first plurality of objects of interest; and
computing, with the computing system, a second function to generate a second proximity map, the second function being a function of the second distance measures, the fourth encoded image comprising the second proximity map.

13. The method of claim 12, further comprising:
assigning, with the computing system, a first weighted pixel value for each pixel in the third encoded image, based at least in part on at least one of the computed first distance measures for each pixel, the first function, or the first proximity map; and
assigning, with the computing system, a second weighted pixel value for each pixel in the fourth encoded image, based at least in part on at least one of the computed second distance measures for each pixel, the second function, or the second proximity map.

14. The method of claim 12, further comprising:
determining, with the computing system, a first pixel loss value between each pixel in the third encoded image and a corresponding pixel in the fifth image;
determining, with the computing system, a second pixel loss value between each pixel in the fourth encoded image and a corresponding pixel in the sixth image;
calculating, with the computing system, a loss value using a loss function, based on a product of the first weighted pixel value for each pixel in the third encoded image multiplied by the first pixel loss value between each pixel in the third encoded image and a corresponding pixel in the fifth image and a product of the second weighted pixel value for each pixel in the fourth encoded image multiplied by the second pixel loss value between each pixel in the fourth encoded image and a corresponding pixel in the sixth image, wherein the loss function comprises one of a mean squared error loss function, a mean squared logarithmic error loss function, a mean absolute error loss function, a Huber loss function, or a weighted sum of squared differences loss function; and
updating, with the AI system, the AI model, by updating one or more parameters of the AI model based on the calculated loss value;
wherein generating the fifth image and the sixth image comprises generating, using the updated AI model, the fifth image and the sixth image, based on the first image.

15. The method of claim 8, wherein decoding the fifth image and the sixth image to generate the seventh image comprises decoding, with the computing system and using the decoder, the fifth image and the sixth image to generate the seventh image, by applying at least one of one or more morphological operations to identify foreground and background markers in each of the fifth image and the sixth image prior to generating the seventh image or one or more machine learning operations to directly decode the fifth image and the sixth image to generate the seventh image.

16. The method of claim 8, wherein applying the at least one of the one or more morphological operations or the one or more machine learning operations comprises applying the one or more morphological operations, wherein the method further comprises:
after decoding the fifth image and the sixth image by applying the one or more morphological operations to identify foreground and background markers in each of the fifth image and the sixth image, applying a watershed algorithm to generate the seventh image.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
generate a user interface configured to collect training data using at least one of full annotation or partial annotation of objects of interest within images of biological samples;
display, within a display portion of the user interface, a first image comprising a field of view ("FOV") of a first biological sample;
receive, from a user via the user interface, a first user input that indicates a presence or location of each of a first plurality of objects of interest contained within the first image displayed in the display portion of the user interface;
generate a border around each of the first plurality of objects of interest, based at least in part on a location for each of the first plurality of objects within the first image identified by the first user input and based at least in part on analysis of pixels in or around the corresponding location using an algorithm; and
generate at least one of a second image or an annotation dataset based on the first image, the second image comprising data regarding location of each of the first plurality of objects of interest within the first image based on the received first user input and the generated border around each of the first plurality of objects of interest identified by the received first user input, the annotation dataset comprising at least one of pixel location data or coordinate data for each of the first plurality of objects within the first image based on the first user input and the generated border around each of the first plurality of objects of interest identified by the received first user input.

18. The system of claim 17, wherein the computing system comprises one of a computing system disposed in a work environment, a remote computing system disposed external to the work environment and accessible over a network, a web server, a web browser, or a cloud computing system, wherein the work environment comprises at least one of a laboratory, a clinic, a medical facility, a research facility, a healthcare facility, or a room.

19. The system of claim 17, wherein the first biological sample comprises one of a human tissue sample, an animal tissue sample, or a plant tissue sample, wherein the objects of interest comprise at least one of normal cells, abnormal cells, damaged cells, cancer cells, tumors, subcellular structures, or organ structures.

20. The system of claim 17, wherein the first user input comprises one of a click input or a bounding region input, wherein the click input defines a location of a centroid of one first object among the first plurality of objects of interest identified by the click input, wherein the bounding region input defines an area within the first image that marks an outer limit of a perimeter of at least one second object among the first plurality of objects of interest identified by the bounding region input, wherein the bounding region input comprises one of a rectangular bounding region input, a circular bounding region input, a polygon placement input, or a line placement input.

\* \* \* \* \*